United States Patent [19]

Meisner

[11] Patent Number: 4,471,435
[45] Date of Patent: Sep. 11, 1984

[54] COMPUTER-BASED SYSTEM FOR ACQUISITION OF NUCLEAR WELL LOG DATA

[75] Inventor: James E. Meisner, Sugarland, Tex.

[73] Assignee: Dresser Industries, Inc., Dallas, Tex.

[21] Appl. No.: 289,359

[22] Filed: Aug. 3, 1981

[51] Int. Cl.$^3$ ............................................. G01V 5/00
[52] U.S. Cl. .................... 364/422; 250/270; 250/262
[58] Field of Search ............... 364/422, 421; 250/270, 250/262, 269; 340/853

[56] References Cited

U.S. PATENT DOCUMENTS

| | | | |
|---|---|---|---|
| 3,609,366 | 9/1971 | Schwartz | 250/262 |
| 3,868,505 | 2/1975 | Jacobson et al. | 250/270 X |
| 4,055,763 | 10/1977 | Antkiw | 364/422 X |
| 4,152,590 | 5/1979 | Smith, Jr. et al. | 250/264 |
| 4,220,851 | 9/1980 | Whatley, Jr. | 250/252 |
| 4,223,218 | 9/1980 | Jacobson | 250/262 |
| 4,224,516 | 9/1980 | Johnstone | 250/262 |
| 4,271,356 | 6/1981 | Groeschel et al. | 250/262 |
| 4,297,879 | 11/1981 | Howells et al. | 364/422 X |
| 4,317,993 | 3/1982 | Hertzog, Jr. et al. | 250/270 |
| 4,328,567 | 5/1982 | Dodge | 364/422 X |
| 4,348,671 | 9/1982 | Nussbaum | 250/262 X |
| 4,348,748 | 9/1982 | Clavier et al. | 364/422 X |

OTHER PUBLICATIONS

Computers and Advanced Technology Applied to Uranium Borehole Logging Systems—by J. E. Meisner, pp. 1-12.
The Dual Detector Neutron Lifetime Log—Theory and Practical Applications—by Serpas et al.
A Borehole Gamma-Ray Spectrometer for Uranium Exploration GJBX-82-78—by George et al., pp. 4-13.

*Primary Examiner*—Edward J. Wise
*Attorney, Agent, or Firm*—Richard M. Byron; Patrick H. McCollum

[57] ABSTRACT

A computer-based well logging system is disclosed, for acquiring nuclear well log data, including gamma ray energy spectrum and neutron population decay rate data, and providing a real-time preentation of the data on an operator's display based on a traversal by a downhole instrument of a prescribed borehole depth interval.

For acquiring energy spectrum data, the system has a multichannel analyzer including a pulse height analyzer and a memory. After a spectral gamma ray pulse signal coming from a downhole instrument over a logging cable is amplified and conditioned, the pulse height analyzer converts the pulse height into a digital code by peak detection, sample-and-hold action, and analog-to-digital conversion. The digital code defines the address of a memory location, or channel, corresponding to a particular gamma ray energy and having a count value to be incremented. After a period of time, the memory channels contain a spectrum of counts per incremental energy band. The spectrum data is then accessed by the system central processing unit (CPU) for analysis, and routed to the operator's display for presentation as a plot of relative gamma ray emissions activity versus energy level.

For acquiring neutron decay rate data, the system has a multichannel scaling unit including a memory and a memory address generator. After a burst of neutrons downhole, thermal and epithermal neutron detector pulses build up and die away.

Using the neutron source trigger as an initializing reference, the address generator produces a sequence of memory address codes, each code addressing the memory for a prescribed period of time, so as to define a series of time slots. A detector pulse signal produced during a time slot results in the incrementing of the count value in an address memory location. The process is repeated for every trigger, resulting in the production of time histogram data. The data is accessed by the CPU and routed to the operator's display.

42 Claims, 32 Drawing Figures

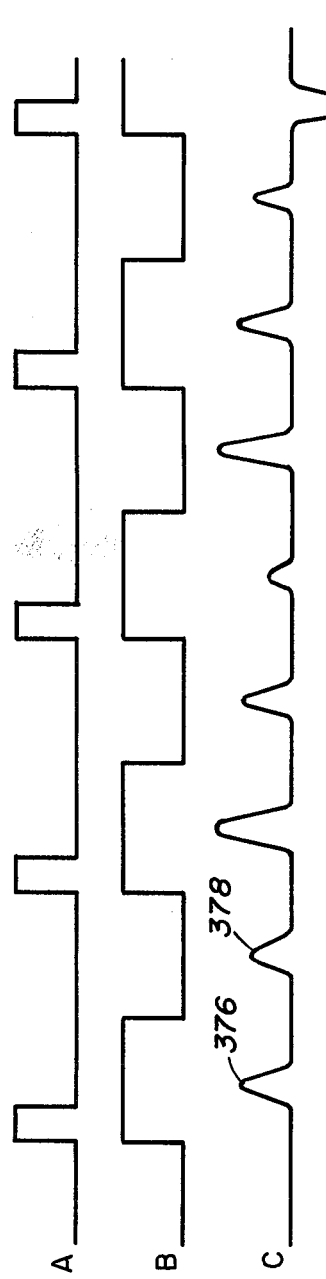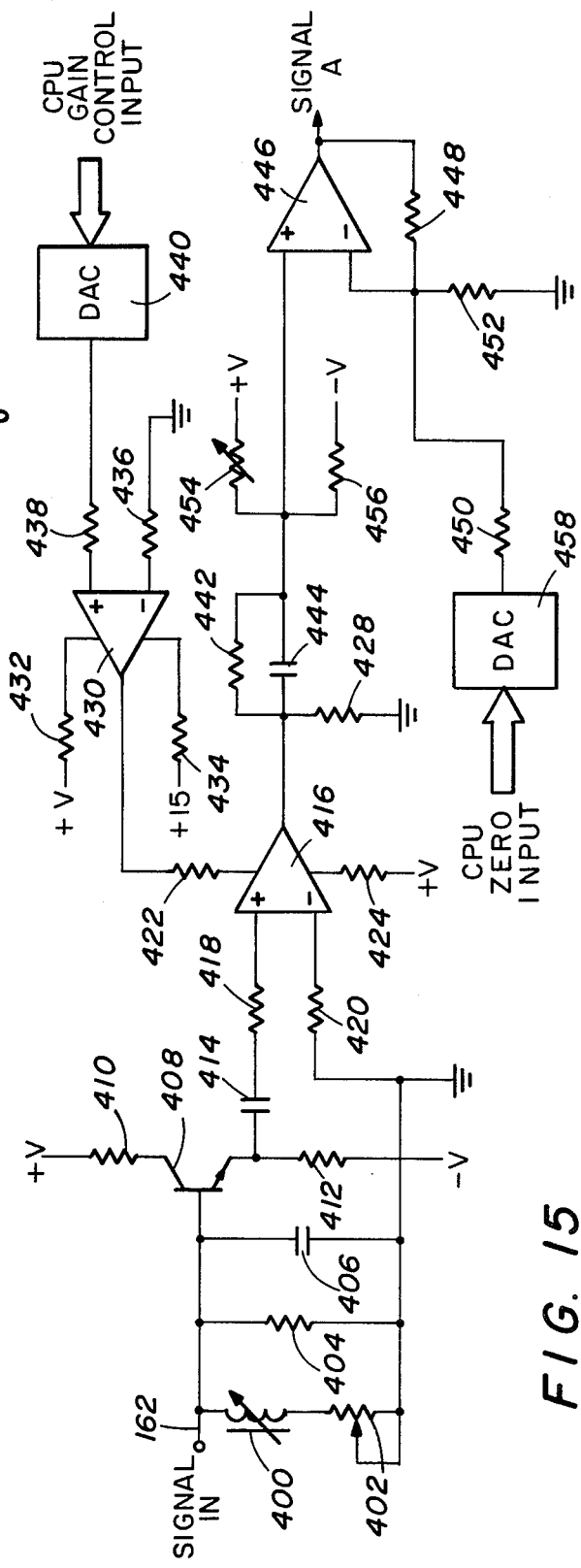

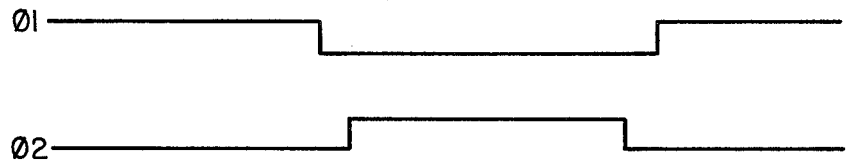
FIG. 19
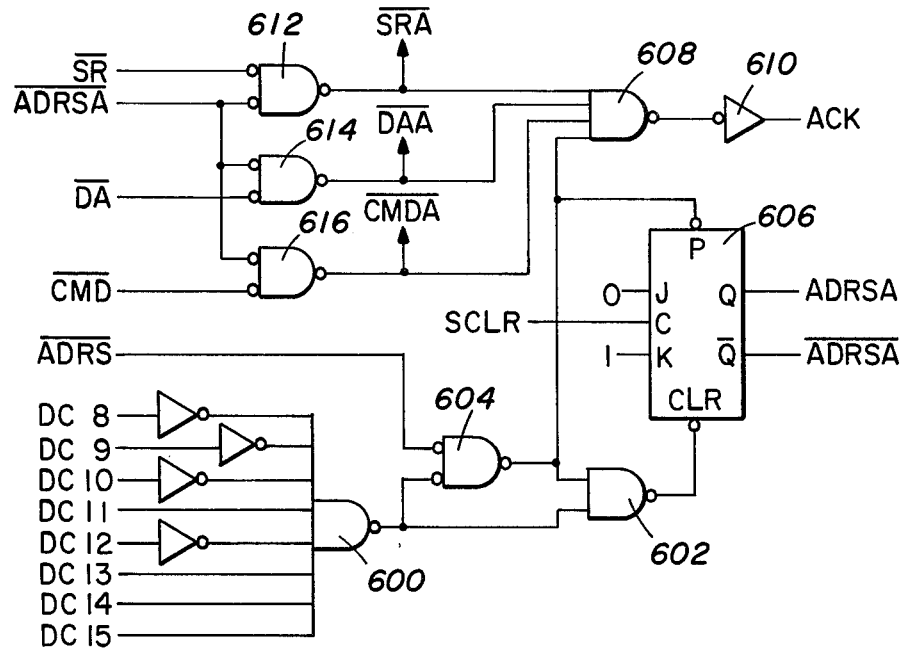
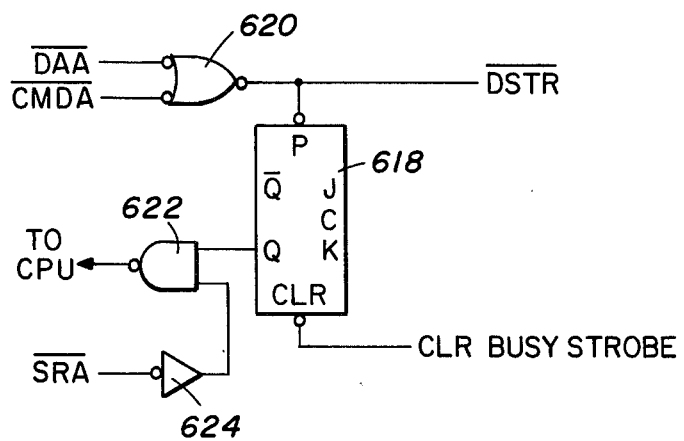
FIG. 20

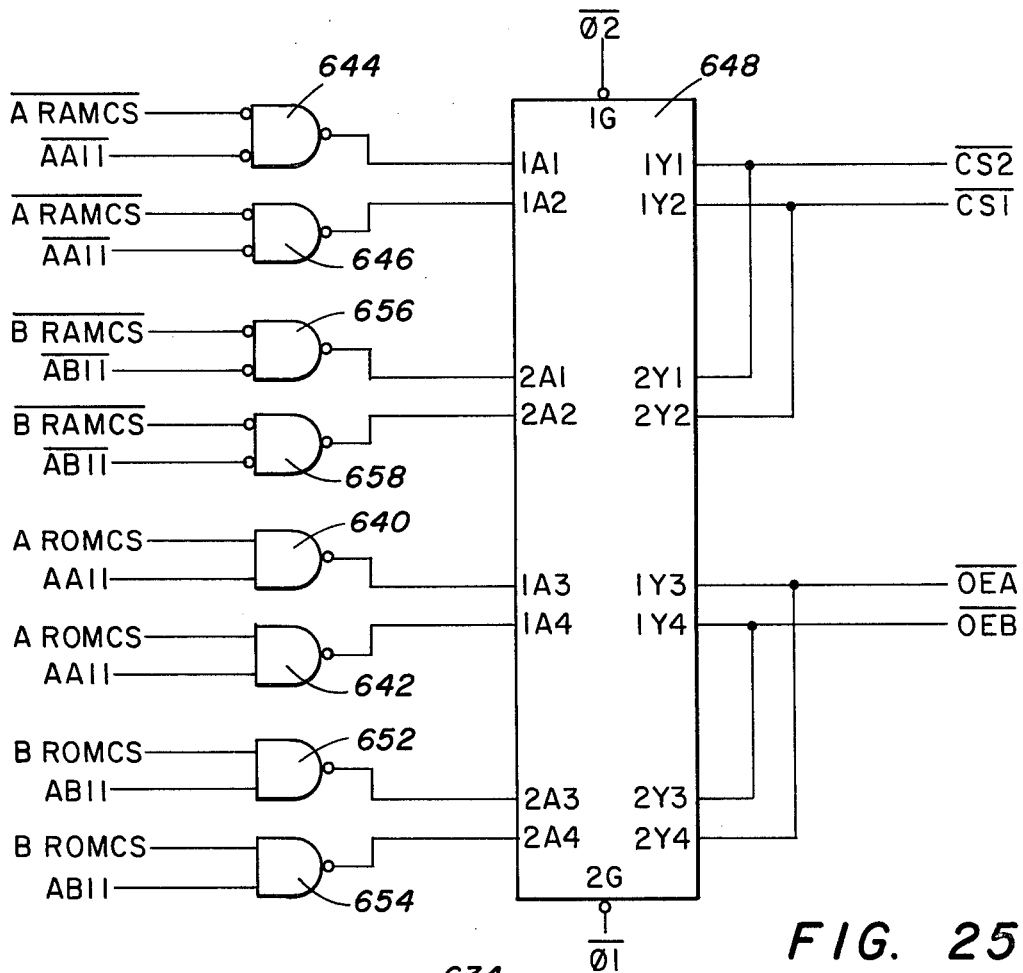
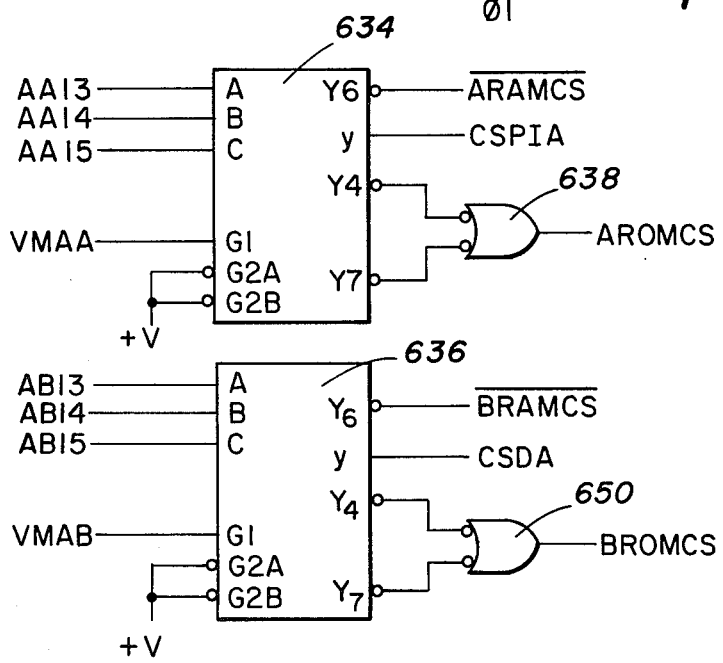
FIG. 25

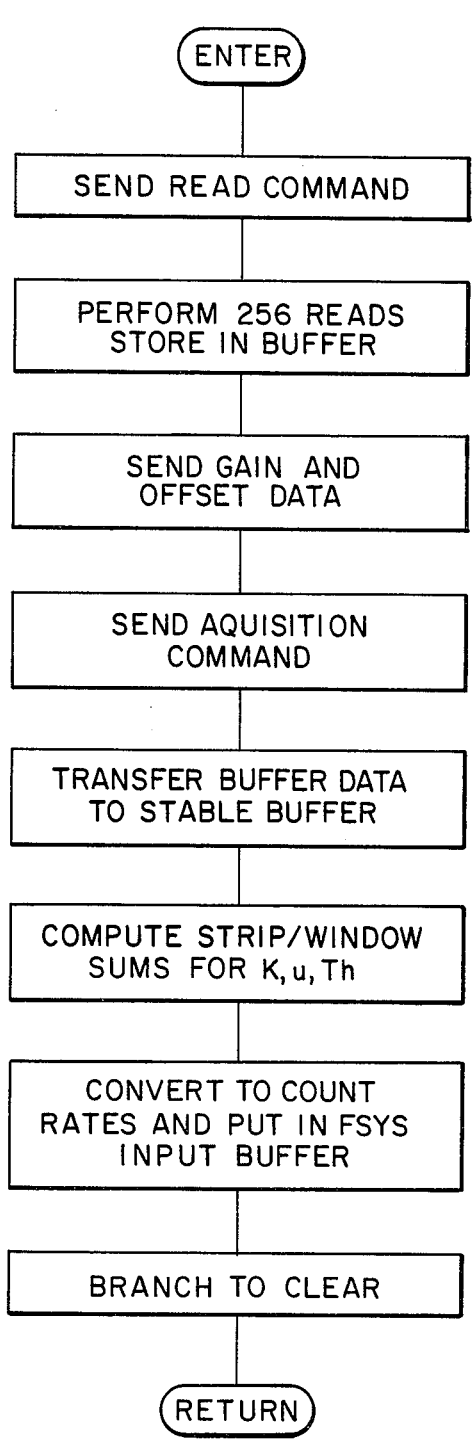
FIG. 28
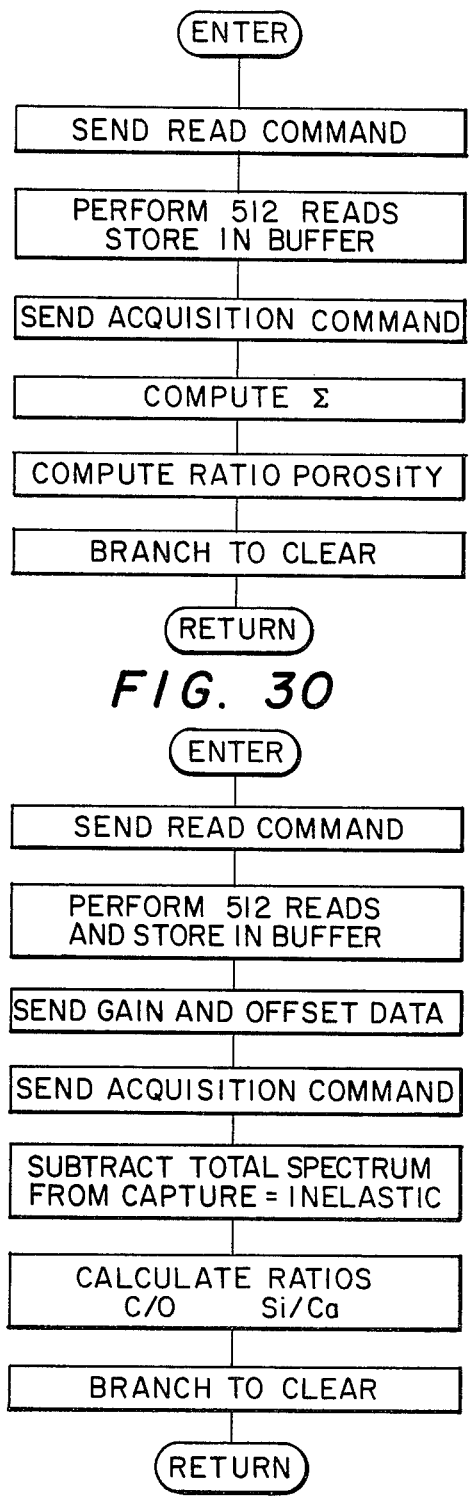
FIG. 30
FIG. 31

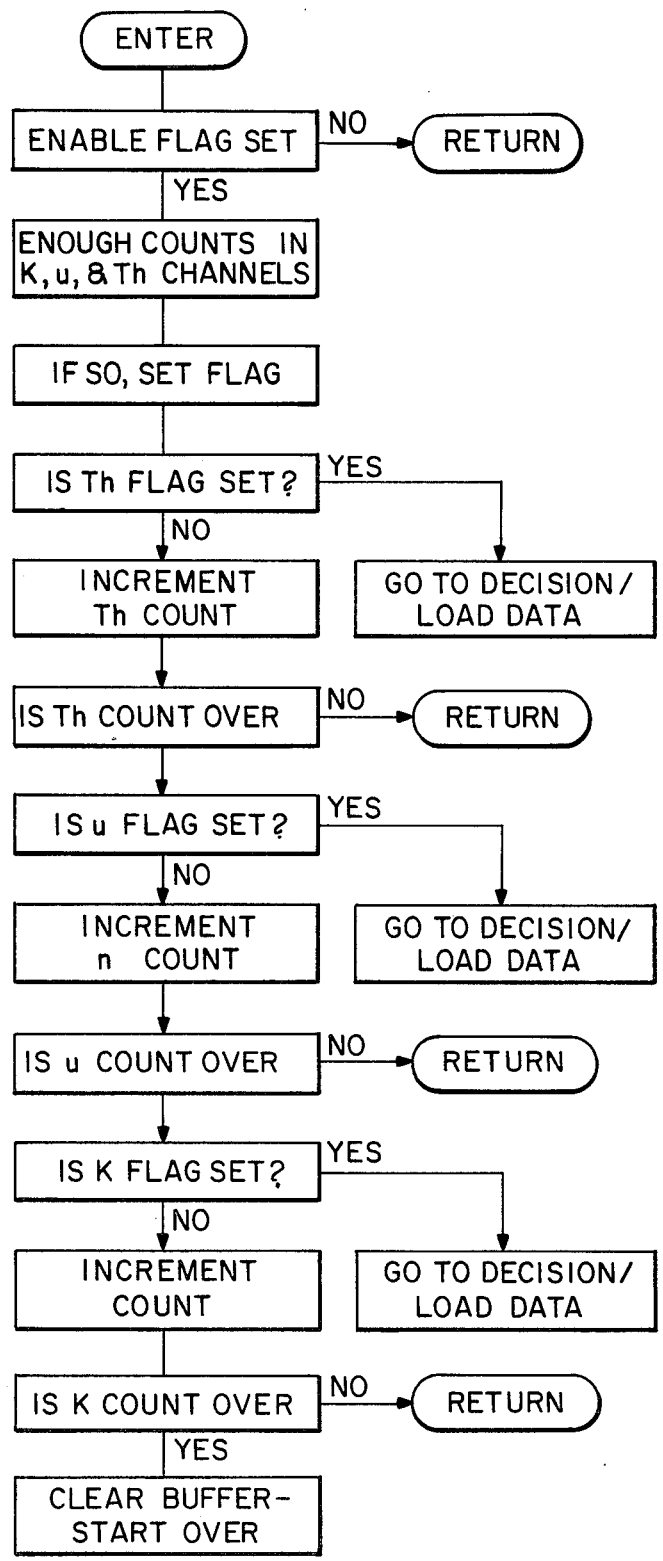
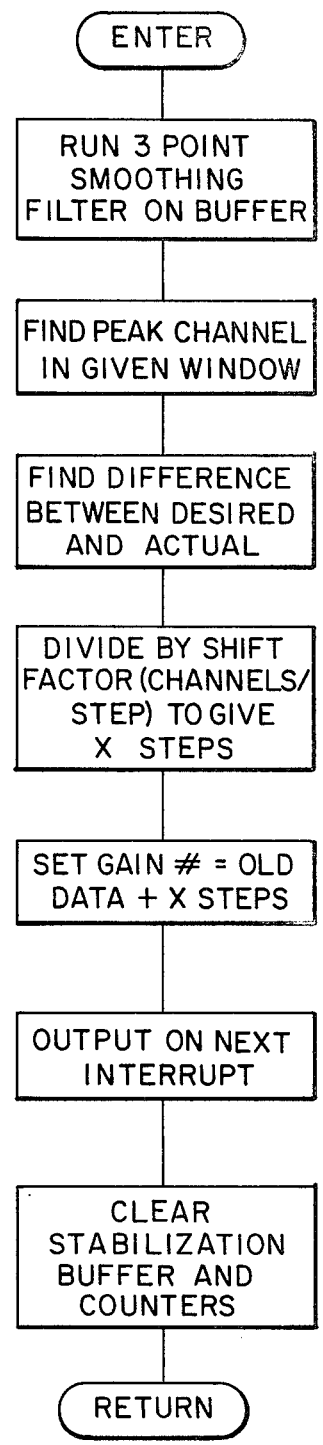
*FIG. 29A*   *FIG. 29B*

COMPUTER-BASED SYSTEM FOR ACQUISITION OF NUCLEAR WELL LOG DATA

BACKGROUND OF THE INVENTION

The present invention relates to hydrocarbon well logging systems; more particularly, it relates to a computer-based system for acquisition, presentation, processing and recording of nuclear hydrocarbon well logging data.

Well logging systems have been utilized in hydrocarbon exploration for many years. Well logging systems provide data for use by geologists and petroleum engineers in making many determinations pertinent to hydrocarbon exploration. In particular, well logging systems provide data for subsurface structural mapping, defining the lithology of subsurface formations, identifying hydrocarbon productive zones, and interpreting reservoir characteristics and content.

There are many types of well logging systems, each of which operates on the basis of some physical phenomenon. An induction logging system measures the conductivity of formations penetrated by a borehole. An acoustic well logging system measures the velocity at which a compressional wave traverses a formation immediately adjacent a borehole. A density logging system measures formation bulk density. A deviation logging system measures the magnitude and direction of dip of the formations encountered by a borehole.

In addition to the above well logging systems, there are also various types of nuclear well logging systems. These include gamma ray spectral logging systems which rely on the spectral analysis of natural and induced gamma rays. There is also a neutron absorption logging system which measures the decay rate of neutron population following a burst of neutrons into a formation from a pulsed neutron source. The Dresser Atlas Division of Dresser Industries, Inc. has offered nuclear well logging systems of these types under the trademarks SPECTRALOG, CARBON/OXYGEN LOG, and NEUTRON LIFETIME LOG.

Well logging methods involving the measurement of gamma rays, which are electromagnetic waves produced by unstable radioactive elements as their atoms undergo spontaneous or induced transformations, may be conducted in either cased or open boreholes. Spectral analysis of natural gamma rays is particularly useful in the identification of lithologies which could be potentially hydrocarbon productive. Also, spectral analysis of gamma rays is utilized in determining oil saturation in formations that contain a low or unknown salinity formation water. However, when fresh water is present, a spectral analysis of gamma rays resulting from neutron bombardment, i.e., induced gamma rays, provides an improved evaluation of formation lithology.

The three primary sources of natural radioactivity usually observed in reservoir rocks are thorium, uranium and potassium. Well logging involving spectral analysis of natural gamma rays provides a quantitative measurement of these elements. Both uranium and thorium are characterized by specific decay series. Potassium consists of three isotopes, of which the only unstable isotope is the nuclide potassium-40. Well logging systems providing spectral analysis of natural gamma rays measure the total gamma ray counts, the gamma rays emitted by potassium at 1.46 MeV, the uranium series nuclide bismuth emanating gamma rays at 1.764 Mev, and the thorium series nuclide thallium emanating gamma rays at 2.614 MeV.

Prior art well logging systems for conducting spectral analysis of natural gamma rays have included a subsurface well logging instrument to traverse a well borehole. The instrument includes a gamma spectrometer comprising a thallium-activated sodium iodide crystal optically coupled to a photomultiplier tube. A downhole electronic amplifier provides voltage amplification and transmits detector voltage pulse signals uphole through a logging cable to surface instrumentation. The surface instrumentation consists of an electronic amplifier, a multichannel analyzer, a digital panel, and a logging camera.

Pulse signals reaching the surface pass through an electronic amplifier to the multichannel analyzer and the digital panel. The multichannel analyzer provides for a total pulse count and selects pulses within prescribed energy windows for separate counting. The digital panel computes background radiation-corrected count rates from the raw logging data by means of a mathematical spectrum stripping technique. The energy windows of the multichannel analyzer are selected to correspond to the characteristic energies of potassium, uranium and thorium.

The digital panel includes four count rate meters (CRM). The counters accumulate the total number of gamma rays measured (total count rate, counts per minute) and the background corrected count rates in each of the multichannel analyzer energy windows for potassium, uranium and thorium. The outputs from each CRM, as a function of depth, are displayed by the logging camera on film. The logging film comprises four tracks. One track is the total counts in counts per minute. In adjacent tracks, a potassium curve is recorded by percentage, a uranium curve is recorded in parts per million, and a thorium curve is recorded in parts per million.

Well logging systems performing spectral analysis of induced gamma rays utilize a pulsed neutron source producing high energy neutrons. When carbon and oxygen are bombarded by high-energy neutrons, both emit gamma rays characteristic of the respective nuclei. The carbon gamma ray energy is 4.43 MeV and the predominant oxygen gamma ray is 6.13 MeV. The gamma rays are detected by a scintillation spectrometer, calibrated to count pulses in the energy ranges most indicative of carbon and oxygen. Information available in the spectrum analyzed includes measurements of the inelastic gamma rays of calcium and silicon. Also, after the inelastic reactions have ceased, measurements of the gamma rays of capture of silicon and calcium are made.

Neutrons of sufficient energy to excite a carbon or oxygen nucleus are found to exist in a subsurface formation for only a brief period of time. Accordingly, the detector is gated and synchronized to make a measurement while neutrons are being emitted from the source. A carbon/oxygen ratio is derived by taking a ratio of the gamma ray counts in the selected energy windows.

The gamma ray measurements are presented in a conventional well log format comprising continuous plotter tracks. One track is used to monitor the output of the neutron source. Adjacent tracks contain a carbon/oxygen ratio curve, a silicon/calcium ratio curve, and an inelastic calcium/silicon ratio curve.

Well logging systems for measuring neutron absorption in a formation uses a pulsed neutron source providing bursts of very fast, high-energy neutrons. Pulsing the neutron source permits the measurement of the macroscopic thermal neutron absorption capture cross-section $\Sigma$ of a formation. The capture cross-section of a reservoir rock is indicative of the porosity, formation water salinity, and the quantity and type of hydrocarbons contained in the pore spaces.

Neutrons leaving the pulsed source interact with the surrounding materials and are slowed down. In a well logging environment, hydrogen in the surrounding water and hydrocarbons act to slow the neutrons. After the neutrons have been slowed to the thermal state, they are captured by atoms in the surrounding matter. Atoms capturing neutrons are in an excited state; and after a short time, gamma rays are emitted as the atom returns to a stable state.

The number of gamma rays present at any time is directly proportioned to the number of thermal neutrons, i.e., the thermal neutron population. The decay rate of this neutron population is an exponential function, and is defined by specifying the time required for the thermal neutron population to decrease to one-half. This time is referred to as a neutron "half-lifetime". While it is actually the neutron lifetime that is measured, the more useful parameter is the capture cross-section. Capture cross-section and neutron lifetime are inversely related, with capture cross-section being a measure of the rate at which thermal neutrons are captured in the formation. Analysis of formations in this manner is referred to as "neutron decay analysis".

The measurement of neutron population decay rate is made cyclically. The neutron source is pulsed for 20–30 microseconds to create a neutron population. Since neutron population decay is a time-related function, only two timereferenced gamma ray count measurements are necessary. The capture gamma rays are normally detected from time intervals that are 400–600 microseconds and 700–900 microseconds after each neutron burst. As the neutron source is pulsed and the measurements made, the subsurface well logging instrument is continuously pulled up the borehole.

The recorded log consists of four curves or tracks on a plotter. The capture gamma rays measured during the first measurement time period are recorded on one track. The capture gamma rays measured during the second measurement time period are recorded on a second track. On the third and fourth tracks, there are recorded a monitor of the neutron source output and the calculated capture cross-section. Capture cross-section is continuously calculated from the measurements made during the two measurement time periods.

Along with the thermal neutron log, an epithermal neutron log may be simultaneously recorded. Also, casing collars may be recorded.

The prior art nuclear well logging systems, though proving to be a very valuable tool in oil and gas exploration, have required the attention of skilled operators in order to produce consistent operation. Without skilled, experienced operators, giving full and complete attention to operating the well logging system, results are inconsistent, requiring logging runs to be repeated over and over until uniform well log data is obtained. Since the logging of a well requires a cessation of all other well site operations, valuable time is lost and a substantial cost is incurred where well logging is not quickly concluded. Accordingly, it is desirable for a well logging system, particularly a nuclear well logging system, to be capable of producing accurate, reliable well log data on a consistent basis. The present invention is directed to achieving this end by promoting consistent, reproducible well logging data acquisition with less dependence upon interaction of the logging operation with an experienced operator.

SUMMARY OF THE INVENTION

In accordance with the present invention, a well logging system is provided for conducting spectral analysis of natural and neutron-induced gamma rays and conducting an analysis of neutron population decay rate in a formation, which system is computer-based and provides real-time presentation of the acquired well logging data.

The system is suitable for use with a conventional subsurface well logging instrument adapted to traverse a well borehole. Such an instrument includes a detector for detecting gamma ray emissions from subsurface formations and produces electrical pulse signals indicative of detected gamma rays. In a mode of well logging system operation, wherein gamma ray energy spectrum data is to be acquired, the instrument detector produces electrical pulse signals the amplitudes of which are indicative of the energies of the detected gamma rays. If the spectral analysis is with respect to neutron-induced gamma rays, the subsurface instrument includes a neutron source for repeatedly releasing bursts of neutrons directed toward the formation, with each neutron burst producing inelastic scattering gamma rays detected during a first time interval, and producing capture gamma rays detected during a second interval. A detector electrical pulse signal is transmitted during each of the two detection intervals, and a synchronizing signal pulse is sent periodically to the surface. In another mode of well logging operation, wherein neutron population decay rate data is to be acquired, a neutron source in the instrument is repeatedly pulsed by a source trigger to release bursts of neutrons. The instrument further includes first and second gamma ray detectors, one for detecting gamma rays produced by thermal neutron capture and the other for detecting gamma rays.

As the subsurface instrument traverses the well borehole, a depth odometer provides signals indicative of the velocity of movement of the instrument along the borehole and an indication of the depth of the instrument into the borehole. In particular, a signal is produced indicating the traversal by the instrument of a prescribed depth interval, which is suitably one-quarter foot.

The well logging system includes a signal recovery unit coupled to the logging cable to receive detector electrical pulse signals. For spectral analysis, the signal recovery unit preferably includes a signal conditioning circuit providing impedance matching and signal gain to compensate for cable attenuation losses. The conditioned pulse signals are applied to a multichannel analyzer producing digital data representative of the spectrum of detected gamma ray energies. A display unit coupled to the multichannel analyzer provides real-time presentation of the acquired spectral gamma ray well logging data in a plot of relative gamma ray emissions activity (i.e., counts) as a function of detected gamma ray energy level. Suitably, the display unit includes a cathode ray tube display medium. A central processing unit, operating in accordance with a set of program instructions, issues control commands to the multichannel analyzer and the display unit to sequence the acquisition and presentation of spectral gamma ray well logging data.

The central processing unit sequences the acquisition and presentation of data on a real-time basis in accordance with a primary interrupt corresponding to the traversal of a prescribed borehole depth interval by the subsurface instrument. That is, data acquired during traversal by the subsurface instrument of the prescribed well borehole interval is immediately provided to the display unit for display. In addition, however, the central processing unit acquires data from the multichannel analyzer for output to a mass storage unit.

The multichannel analyzer includes a pulse height analyzer responsive to detector electrical pulse signal, for producing a digital code representative of the peak amplitude of each pulse signal. The digital code is applied as an address code to a random access memory which accumulates counts of detected gamma rays according to energy level. That is, each memory location corresponds to a particular energy band, and maintains a count of the occurrence of detected gamma rays having energies within that energy level band. Accordingly, each memory address location corresponds to a "channel".

Upon a memory location being addressed, the digital count value stored therein is incremented by one. This is accomplished by control logic producing memory control commands in response to an indication from the pulse height analyzer that a digital code for addressing the memory is available. The control logic produces a memory control command to read the count value in the addressed memory location and write back into the addressed memory location an incremented count value. For incrementing the count value, a register is coupled to the memory, and under the direction of the control logic count value read out of memory is loaded into the register. The control logic then issues a command to the register to increment the loaded count value by one. The register contents are then written back into the addressed memory location.

On each predetermined depth interval interrupt to the central processing unit, the memory contents are read, channel by channel, out onto a buss line. The display unit, operating as a spectrum display, is interfaced to the buss to obtain the channel count values. The display unit has a first microprocessor for formatting the channel count values for display. A memory accessed by the first microprocessor stores the formatted count value data. The display unit also includes a second microprocessor which accesses the memory to obtain the formatted channel count data for display. The display unit presents the data as a plot of relative gamma ray emissions activity (i.e., counts) versus energy level (i.e., channel).

The display unit includes a cathode ray tube for displaying the plot. Accordingly, there must be provided a horizontal deflection signal and a vertical deflection signal. This is accomplished by the second microprocessor providing two blocks of data to two separate digital-to-analog converters which produce the horizontal and vertical deflection signals.

The count value data in the display unit memory accumulates as a logging run proceeds. That is, count value data obtained during traversal of a predetermined incremental depth of the well borehole is added to the count value data accumulated over the preceeding data acquisition intervals. Thus, as a logging run proceeds, the plot on the display unit cathode ray tube will build, and peaks will develop at those channels where gamma emissions activity is greatest.

Channel count values in the multichannel analyzer memory are read out of memory and placed onto the buss line under the control of the central processing unit. This is accomplished by providing an address generator in the signal recovery unit operable under control of the CPU to sequentially address the memory locations. The control logic under command from the CPU generates an output enable command to the memory to read data at an addressed location. A buss driver enabled by the CPU places the data read out of memory onto the buss line, which is accessed by the CPU.

If operation in the spectral analysis mode is with respect to neutron-induced gamma rays, the signal recovery unit includes a sync generator coupled to the logging cable responsive to synchronizing signal pulses transmitted thereover, for producing a squarewave signal to distinguish between electrical signal pulses attributable to inelastic gamma rays and electrical signal pulses attributable to capture gamma rays. The squarewave signal is used as a single bit digital code and applied to the random access memory along with the pulse height analyzer digital code to form the complete memory address code. In this manner, separate portions of the random access memory can be allocated to inelastic gamma ray count values and capture gamma ray count values.

Suitably, the synchronizing signal produced by the subsurface instrument is a negative-going pulse signal, which is repeated after each occurrence of a predetermined number of neutron bursts. The sync generator, therefore, includes means for detecting the synchronizing signal and producing a clock pulse signal in response. Suitably, the detecting means is a one-shot device. The clock pulse signal produced is applied to a phase-lock loop device which multiplies the clock pulse signal by a prescribed factor to produce a squarewave signal having one phase in time coincidence with inelastic detector signal pulses on the logging cable and the other phase in time correspondence with capture detector signal pulses on the logging cable.

For neutron population decay rate analysis, the signal recovery unit includes a multichannel scaling unit to count the occurrence of detected gamma rays in successive incremental time slots of prescribed duration. The multichannel scaling unit uses the neutron source trigger produced in the subsurface instrument as a start reference. An address generator produces a sequence of memory address codes following each source trigger to address successive memory locations. The time each memory location is addressed by the address generator code defines a time slot or "dwell". Upon the occurrence of a detector pulse, the control logic produces control commands for reading the stored count value from an addressed memory location, incrementing the count value by one, and writing the incremented count value back into the addressed memory location.

Because electrical pulse signals are produced from two detectors in the subsurface instrument, two separate portions of memory must be provided to accumulate two groups of count value data. Accordingly, a sync generator is included for producing a signal indicative of the detector which has produced the electrical pulse signal. The sync generator signal is utilized as an additional address code bit to designate one or the other of the portions of memory addressed by the address generator code. In this manner, two multiple dwells histograms representative of the thermal and epithermal neutron capture curves are produced.

The count value data obtained in the neutron population decay rate analysis mode of operation is accessed by the central processing unit and the display unit in the same manner as spectral analysis count value data.

The central processing unit executes several routines to obtain and process count value data. Under the direction of these routines, the central processing unit functions to obtain data from the signal recovery unit memory and place it in memory storage, send display control commands to the display unit, execute data processing of nuclear well logging data (i.e., windowing, stripping, ratioing, etc.), output processed nuclear well logging data to film and magnetic tape; and calibrate the signal recovery unit.

In performing spectral analysis, the central processing unit obtains nuclear well logging data on the basis of the subsurface tool traversing a prescribed depth interval designated by a depth interrupt signal. After nuclear well log data is obtained, the central processing unit executes various log data processing routines, including integrating counts between designated channels, normalizing the integrated counts, and applying stripping equations to the count value data. Finally, the central processing unit outputs the results to tape and film recording media.

In making a spectral analysis of neutron-induced gamma rays, the central processing unit functions to integrate count values for both the capture spectrum and the inelastic spectrum. Also, the central processing unit calculates ratios of integrated count value data, including the inelastic ratios of carbon/oxygen and calcium/silicon and the capture ratio of silicon/calcium. In addition, the central processing unit functions to normalize the silicon capture count.

An additional feature of the present invention is provision for adjusting the gain provided to an incoming electrical signal pulse by the signal conditioning circuit coupled to the logging cable, so as to correct for system gain drifts. In accordance with this aspect of the present invention, the central processing unit executes a routine in which selected peaks of the energy spectrum are evaluated for proper positioning within their respective spectrum. This involves locating the actual peak centroid for a given channel or channels, and comparing the actual peak location with the desired peak centroid location for the selected channel. Based upon the comparison, the central processing unit computes a gain setting which is sent to the gain control portion of the signal conditioning circuitry.

In performing a spectral analysis of naturally-occurring gamma rays, the three natural peaks of uranium, thorium, and potassium are suitably checked and the one having the highest energy level is used in the adjustment procedure. In a spectral analysis of neutron-induced gamma rays, the capture hydrogen peak is suitably used exclusively.

In implementing gain adjustment to compensate for system gain drifts, an operational transconductance amplifier may suitably be used in the electrical pulse signal path through the signal conditioning circuitry. An analog control signal obtained from a digital-to-analog converter is applied as the control input to the operational transconductance amplifier. The digital gain word computed by the central processing unit is output to the digital-to-analog converter to establish the desired analog control signal.

BRIEF DESCRIPTION OF THE DRAWINGS

A written description setting forth the best mode presently known for carrying out the present invention, and of the manner of implementing and using it, is provided by the following detailed description of a preferred embodiment which is illustrated in the attached drawings wherein:

FIG. 14 is a timing diagram illustrating the timing between a downhole neutron pulse trigger signal, a downhole multiplexer gating signal, and signal pulses from downhole capture and inelastic detectors;

FIG. 15 is a schematic diagram of circuitry for implementing the signal conditioning function block in FIG. 6;

FIG. 19 is a timing diagram illustrating the clock signals used in the display for basic timing of its operation;

FIG. 20 is a schematic diagram of circuitry for implementing the CPD interface in FIG. 18;

FIG. 25 is a schematic diagram of circuitry for performing the chip enable and output enable functions for the memories in FIG. 24;

FIG. 28 is a flowchart of a program routine executed by the CPU, for obtaining data in a spectral analysis mode of system operation;

FIGS. 29A and 29B are flowcharts of a program routine executed by the CPU, for computing a gain setting to be applied in the circuitry diagrammed in FIG. 15;

FIG. 30 is a flowchart of a program routine executed by the CPU, for obtaining data in a neutron population decay rate analysis mode of system operation; and FIG. 31 is a flowchart of a program routine executed by the CPU, for obtaining data in an induced gamma ray spectral analysis mode of system operation.

DETAILED DESCRIPTION OF ILLUSTRATIVE EMBODIMENTS

I. Nuclear Well Logging System Configurations

Figure 1:
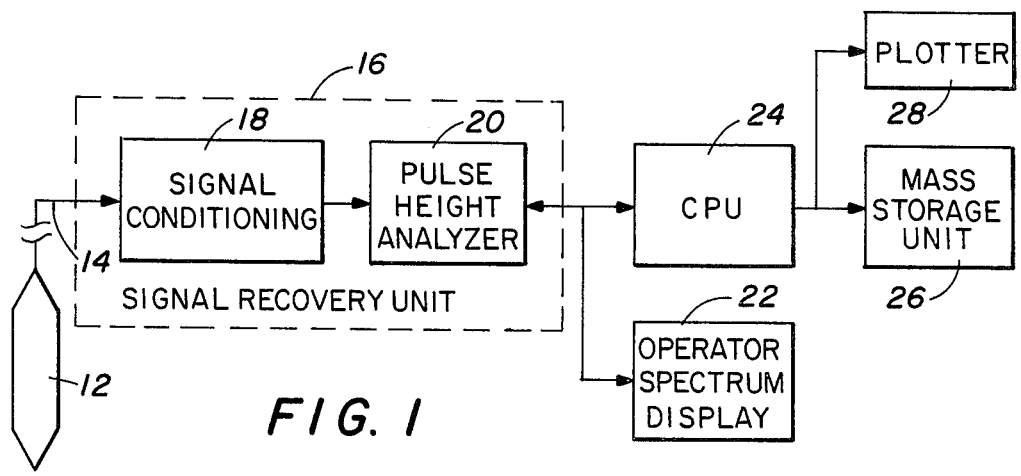
FIG. 1 is a block diagram of a computer-based nuclear well logging system for performing a spectral analysis of natural and induced gamma rays in a formation.
Figure 3:
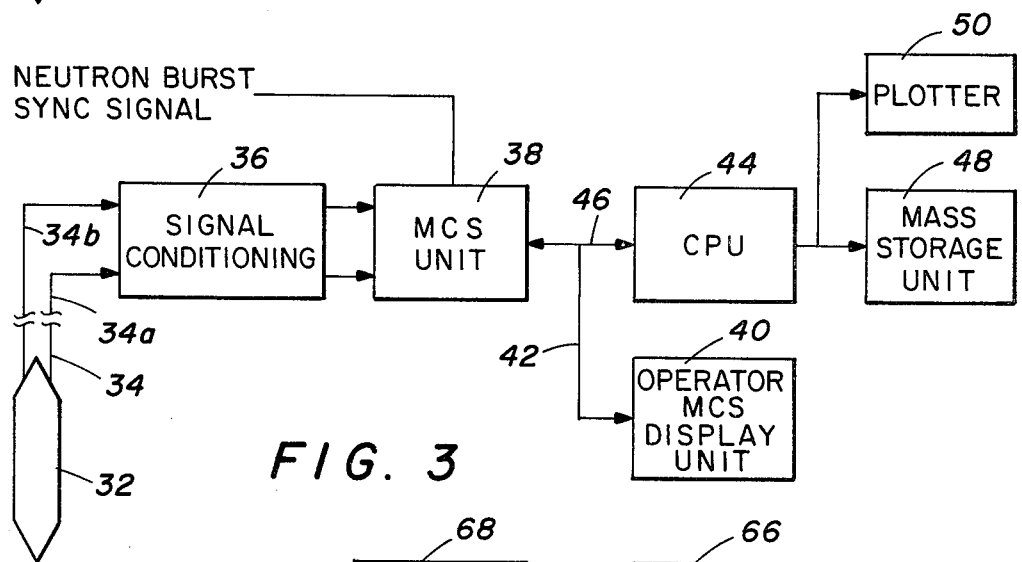
FIG. 3 is a block diagram of a computer-based nuclear well logging system for performing a neutron decay analysis of a formation.
Figure 5:
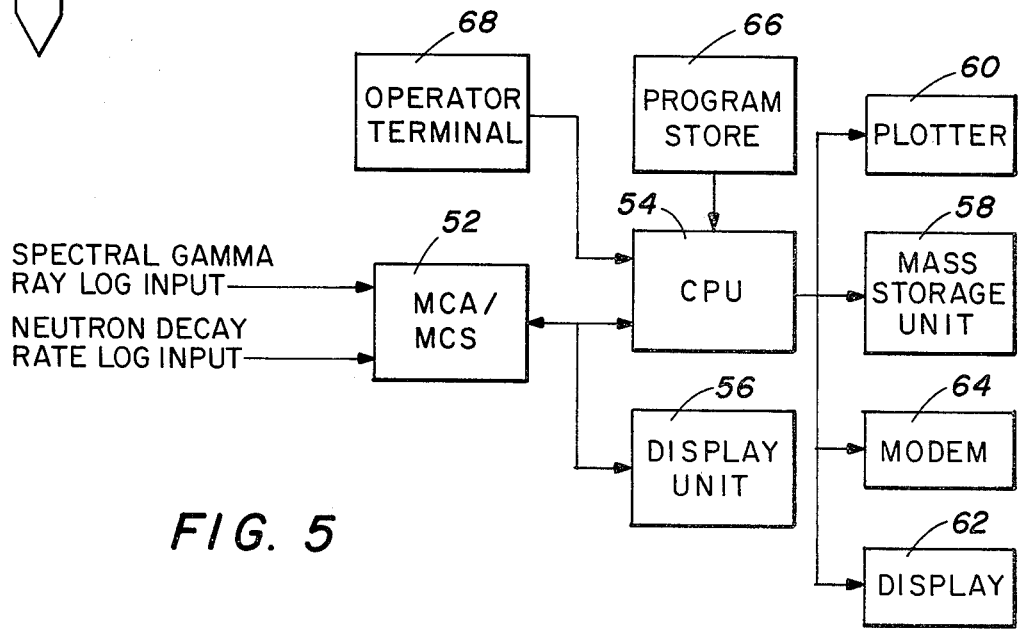
FIG. 5 is a block diagram of a general purpose computer-based nuclear well logging system providing for either spectral gamma ray analysis or neutron decay analysis of a formation when connected to an appropriate subsurface well logging instrument.

Referring to the drawings, FIGS. 1, 3 and 5 present three possible nuclear well logging system configurations in accordance with the present invention. The system diagrammed in FIG. 1 is a computer-based nuclear well logging system for spectral analysis of natural and neutron induced gamma rays. The system diagrammed in FIG. 3 is a computer-based nuclear well logging system for neutron decay analysis. The system diagrammed in FIG. 5 is a general purpose computer-based nuclear well logging system providing for either spectral gamma ray analysis or neutron decay analysis when connected to an appropriate subsurface well logging instrument.

With particular reference now to FIG. 1, the computer-based nuclear well logging system diagrammed therein includes a subsurface well logging instrument 12 to traverse a well borehole. The instrument includes a gamma spectrometer for detecting gamma ray emissions from subsurface formations and producing electrical pulse signals indicative of the energies of detected gamma rays. The gamma spectrometer electrical pulse signals are transmitted to the surface over a logging cable 14. There is also associated with subsurface instrument 12, of course, a depth odometer providing signals indicative of the velocity of movement of the instrument along the borehole and an indication of the depth of the instrument into the borehole.

A signal recovery unit 16 is coupled to the logging cable to receive gamma spectrometer electrical pulse signals. The signal recovery unit includes a signal conditioning circuit 18 providing impedance matching and signal gain to compensate for cable attenuation losses. It is to be noted, that as used herein, "gamma spectrometer electrical pulse signals" refers not only to the direct output of the gamma spectrometer, but also refers to processed versions thereof, including amplified and filtered versions.

The signal recovery unit also includes a multichannel analyzer (MCA) 20 for producing digital data representative of the spectrum of detected gamma ray energies. MCA 20 produces digital data in blocks, i.e., multiple bit words. Each block of data represents the relative gamma ray emissions activity at a certain energy level. After a period of time, MCA 20 develops several blocks of data which together represent the spectrum of gamma ray emissions activity as a function of incremental energy levels.

A display unit 22 is coupled to the multichannel analyzer and provides real-time presentation of the acquired spectral gamma ray well logging data in a plot of relative gamma ray emissions activity as a function of detected gamma ray energy level. In display unit 22, the digital data is formatted and processed into a form compatible with the display medium. Suitably, display unit 22 includes a cathode ray tube (CRT) as the display medium. Accordingly, display unit 22 formats and processes the spectral gamma ray well logging data to generate horizontal deflection and vertical data signals for driving the CRT beam deflection circuits.

Figure 2:
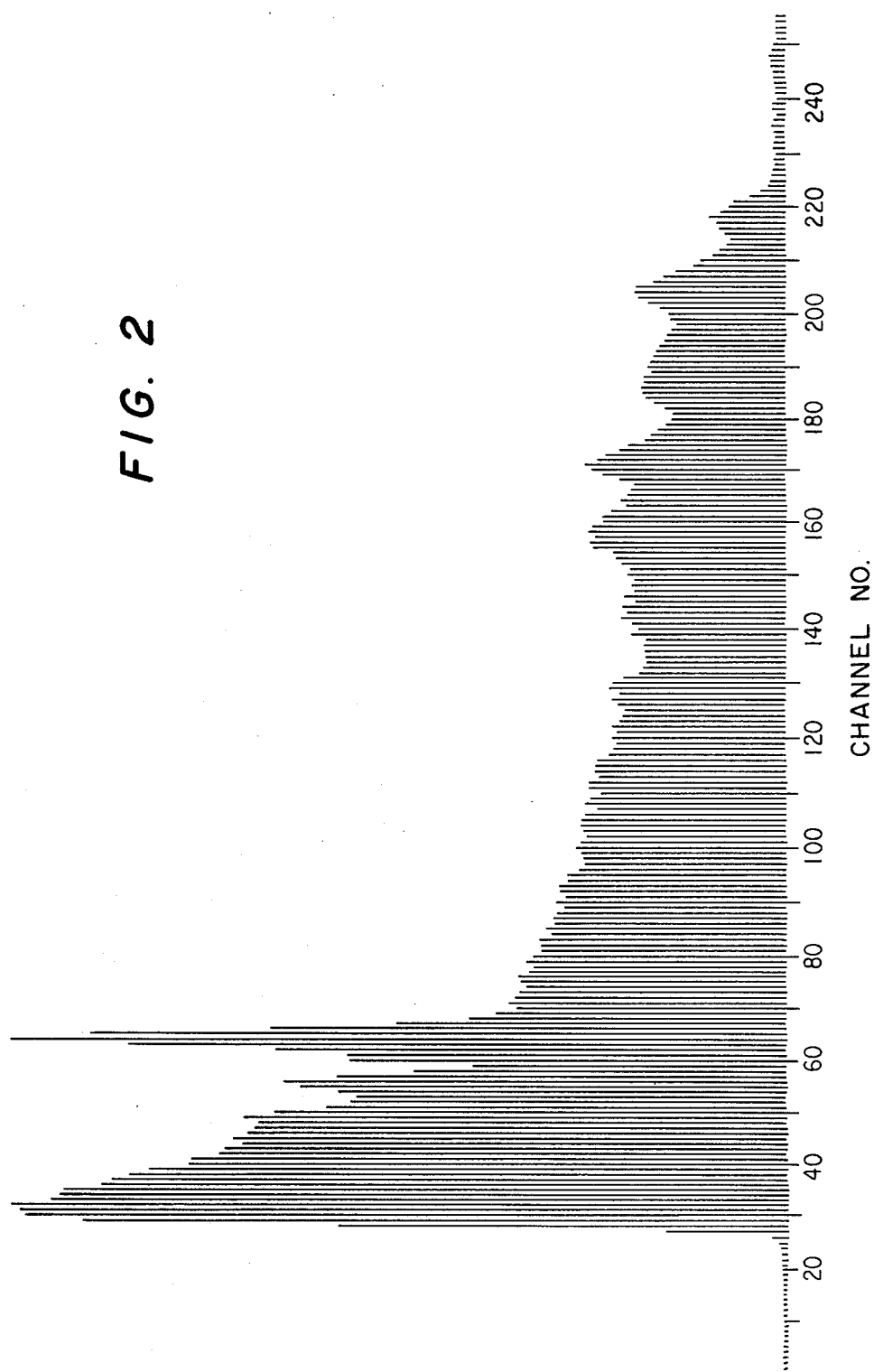
FIG. 2 is a representative display of a spectral analysis of naturally-occurring gamma rays provided by a system in accordance with that diagrammed in FIG. 1.

Referring briefly to FIG. 2, there is shown a representative spectrum display unit 22 display of a spectral analysis of acquired spectral gamma ray well logging data where gamma rays are induced by neutron bombardment of a subsurface formation comprising predominately carbon and oxygen materials.

A central processing unit 24 (CPU), operating in accordance with a set of program instructions, issues control commands to the multichannel analyzer 20 and spectrum display unit 22 to sequence the acquisition and presentation of spectral gamma ray well logging data. In addition, the CPU may acquire data from MCA 20 for output to mass storage unit 26. CPU 24 may directly transfer the raw spectral gamma ray well logging digital data to mass storage unit 26, or process the data into a desired format for storage. Also, CPU 24 may engage in certain data processing operations to develop qualitative information about the subsurface formations, which information is thereafter output to a mass storage unit.

If desired, peripheral devices may be interfaced to CPU 26. For example, plotter 28 for developing conventional multitrace recordings and presentations of acquired raw or processed spectral gamma ray well logging data may be included.

Referring now to FIG. 3, the nuclear well logging system diagrammed therein includes a subsurface well logging instrument 32 adapted to traverse a well borehole. Instrument 32 includes a pulsed neutron source for repeatedly producing a burst of neutrons directed into the surrounding formation. In addition, there is included in the instrument a gamma ray detector for producing electrical pulse signals indicative of neutron population around the instrument following each neutron burst. A logging cable 34 is coupled to the subsurface well logging instrument to provide a transmission medium to the surface for gamma ray detector electrical pulse signals.

Instrument 32 may comprise a single gamma ray detector for producing electrical pulse signals indicative of thermal neutron population around the instrument, by detecting "capture" gamma rays. If desired, however, instrument 32 may comprise first and second, spaced-apart gamma ray detectors, both of which detect gamma rays produced by thermal neutron absorption. Alternatively, one detector may be a thermal detector and the other detector an epithermal detector. The first detector produces electrical pulse signals indicative of thermal neutron population; whereas the second detector produces electrical pulse signals indicative of the population of neutrons having energies above the thermal level.

A logging cable 34 coupled to the subsurface well logging instrument provides a transmission medium to the surface for detector electrical pulse signals. In the system diagrammed in FIG. 3, logging cable 34 includes first and second signal paths 34A, 34B. This, of course, provides for transmission of electrical pulse signals from first and second detectors in instrument 32.

Electrical pulse signals transmitted to the surface via logging cable 34 are shaped-up by signal conditioning circuits 36. Typically, the subsurface well logging instrument includes downhole telemetry circuits which produce electrical pulses having a "square wave" waveform. Logging cable capacitance and inductance characteristics, however, distort the square wave pulse signals as they travel to the surface. Accordingly, surface signal conditioning of the distorted square wave pulses arriving at the surface is desirable to restore the shape of the pulse and translate each to appropriate signal levels. Suitably, the signal conditioning circuits will produce square wave pulses at levels compatible with conventional logic circuits, such that the signals may be utilized as digital signals.

The signals resulting from signal conditioning will be referred to as detector pulse signals. As used herein, therefore, the term "detector pulse signal" will be used to refer to the signals produced by the detectors in instrument 32, transmitted and signal-conditioned versions thereof.

The signal-conditioned detector pulse signals are applied to a multichannel scaling unit (MCS) 38. A neutron burst sync signal is also provided as an input to multichannel scaling unit 38 to synchronize its operation with pulsing of the neutron source in instrument 32. Multichannel scaling unit 38 is responsive to detector pulse signals and produces digital data representative of neutron population decay rate.

Following each neutron burst from the pulse neutron source in the subsurface instrument, MCS unit 38 registers detector pulses occurring in successive time slots. The process involves a scan through a plurality of equal duration time slots following each neutron burst. Suitably, the neutron source is pulsed approximately 1000 times per second as the well logging instrument traverses the borehole. Accordingly, the MCS unit over time accumulates in association with each time slot a value representative of the capture gamma ray emissions activity taking place during that time. These values will, of course, be functionally related to the neutron population decay rate.

MCS 38 produces digital data in blocks, i.e., multiple bit words. Each block of data represents the accumulated gamma ray detection count for a particular time slot in the scan. After a period of time, during which there are several neutron bursts issued by the subsurface instrument, MCS 38 develops several blocks of data which together represent the neutron population decay rate. Thus, the nuclear well logging data produced by MCS unit 38 may be referred to as neutron population decay rate data.

Real-time presentation of neutron population decay rate data produced by MCS unit 38 is made on MCS display unit 40 in a plot of gamma ray counts per incremental unit of time versus time following a neutron burst. The blocks of digital data representative of neutron population decay rate are provided to display unit 40 over bus 42. The data is formatted and processed in a manner compatible with the display medium. Suitably, display unit 40 may include a cathode ray tube (CRT) display. In that case, display unit 40 formats and processes the neutron population decay rate data to generate horizontal sweep and vertical signal data compatible with a cathode ray tube display.

Figure 4:
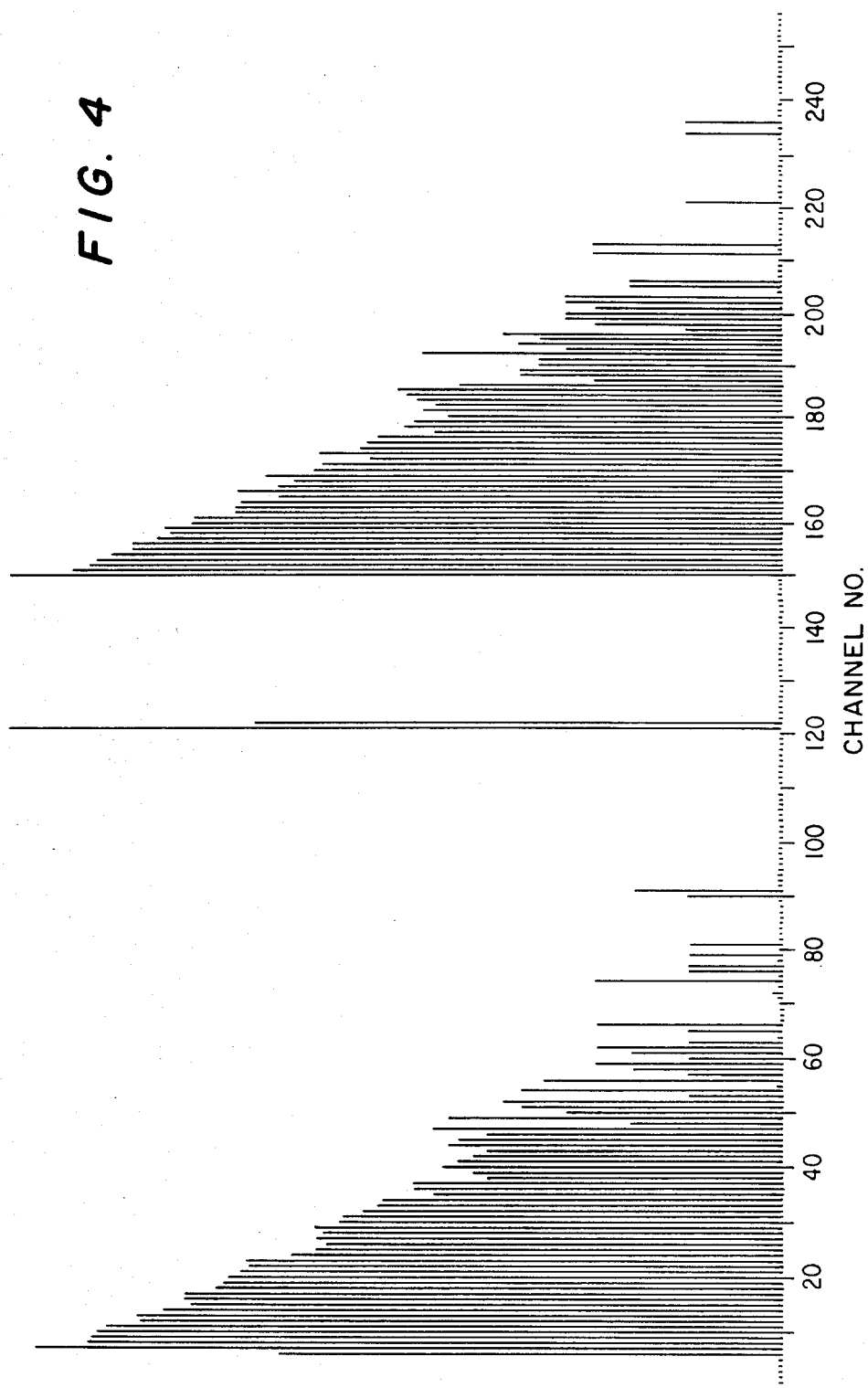
FIG. 4 is a representative display of neutron decay analysis data acquired by a system in accordance with that diagrammed in FIG. 3.

With reference briefly to FIG. 4, there is presented a representative MCS display unit 40 display of neutron population decay rate in a plot of gamma ray counts per incremental unit of time versus time. It is in this manner of display that neutron population decay rate data produced by MCS unit 38 is displayed by MCS display unit 40.

Central processing unit 44 operating in accordance with a set of program instructions issues control commands to the MCS unit 38 and display unit 40 to sequence to the production and presentation of neutron population decay rate data as the subsurface well logging instrument traverses the well borehole. CPU 44 sends display commands to display unit 40 to initiate the display of the neutron population decay rate data. The display command is sequenced with commands to the MCS unit which controls the production of neutron population decay rate data.

Production and display of neutron population decay rate data may suitably be made on the basis of a primary interrupt to CPU 44. Suitably, the interrupt may be made on the basis of the subsurface well logging instrument traversing a preselected depth interval, preferably one quarter foot. The interrupt may be generated by the depth odometer providing the depth of the subsurface well logging instrument. Such a depth odometer may suitably comprise an encoder attached to a calibrated wheel traveling with the logging cable and producing pulses which are accumulated in a counter. The counter output is made available to the CPU for acquisition.

The digital data produced by MCS unit 38 is also available for acquisition by CPU 44 via buss 46. CPU 44 may directly output the raw data to mass storage unit 48. Alternatively, digital data acquired by CPU 44 from MCS unit 38 may be formatted and output to mass storage unit 48. In addition, raw digital data samples formatted data may be processed by CPU 44 to obtain qualitative information concerning the subsurface formations traversed by the well borehole, with the processed data being output to mass storage unit 48. Also, if desired, neutron population decay data produced by MCS unit 38 may be acquired and processed by CPU 44 for output to a plotter 50.

With regard to the processing of the raw neutron population decay rate data, several usable outputs may be developed. Among these are the decay time constant, the macroscopic capture cross-section, and various measurement ratios. Such computational outputs may be stored, recorded on plotter 50, or output through a display unit such as a CRT.

Referring now to FIG. 5, the general purpose nuclear well logging system diagrammed therein is adapted for connection to any one of three different nuclear well logging subsurface instruments, including an instrument providing for a spectral analysis of naturally-occurring gamma rays, an instrument providing a spectral analysis of induced gamma rays, and an instrument for neutron decay analysis. To provide a computer-based nuclear well logging system of such versatility, there is provided a signal recovery unit 52 which receives either a spectral gamma ray logging input or a neutron decay rate logging input. Signal recovery unit 52 is a composite structure for separately providing the functions of a multichannel analyzer and a multichannel scaling unit. A central processing unit (CPU) 54 sends control commands to signal recovery unit 52 to select between multichannel analyzer and multichannel scaling modes of operation. In addition, CPU 54 issues control commands which direct signal recovery unit 52 to output raw data produced thereby while operating in either the MCA or the MCS mode. The CPU may suitably be a minicomputer system, such as, for example, a Perkin-Elmer Model 716.

A display unit 56 is coupled to signal recovery unit 52 to receive produced digital display information. Display unit 56 based upon display commands from CPU 54 formats and processes data from signal recovery unit 52 into a form suitable for display in the manner desired. When signal recovery unit 52 is operating in a MCA mode, the unit is producing spectral gamma well logging data. Accordingly, display unit 56 displays the data as a plot of relative gamma ray emissions activity versus energy level. When signal recovery unit 52 is operating in a MCS mode, the unit is producing neutron population decay rate logging data. The display of this data is as a plot of gamma ray counts per incremental unit of time versus time.

CPU 54 issues control commands to signal recovery unit 52 and display commands to display unit 56 in a manner so as to provide for real-time presentation of the nuclear well logging data produced by unit 52.

When CPU 54 puts signal recovery unit 52 in an output mode, the data produced by the unit, whether in an MCA or MCS mode, is available for acquisition by the CPU. The acquired raw data may be directly output to mass storage unit 58, or the data may be formatted as output to mass storage unit 58. CPU 54 may also engage in processing of the raw or formatted data to produce qualitative data of interest. Processed raw data may be stored or output in some fashion. For example, qualitative data generated by the processing operations conducted by CPU 54 may be output to a plotter 60 for display. Qualitative data, for example, calculations based on raw well logging data produced by signal recovery unit 52 may be output to a second data display 62.

If desired, additional peripherals may be interfaced to the CPU. These may include a modem unit 64 for transmission of nuclear well logging data over a communication link to a remote data processing center. Also, a program storage unit 66 in the form of a tape drive or a disk containing a plurality of operating programs may be included. Furthermore, in the case of a universal computer-based nuclear well logging system, for operation in accordance with a plurality of operating programs, an operator terminal 68 would likely be interfaced to the CPU providing for system operator input to select appropriate operating programs for the logging operation to be performed by the system.

It is to be understood that operation of the signal recovery unit 52 in a MCA mode effectively provides a nuclear well logging system in accordance with the configuration of the system diagrammed in FIG. 1. Similarly, operation of the signal recovery unit 52 in a MCS mode effectively provides a nuclear well logging system in accordance with the configuration of the system diagrammed in FIG. 3. As will be appreciated, however, a universal computer-based well logging system as diagrammed in FIG. 5 is definitely advantageous and preferable in view of the fact that a series of logging tests of different types are typically performed at a well site.

As used herein, "real time" presentation of nuclear well logging data on the operator's display refers to a display of data as it is being acquired on intervals by the signal recovery unit, as opposed to off-line display operation wherein data for an entire well logging run is acquired before display. The data acquisition intervals are preferably determined by movement of the subsurface instrument along the borehole and traversing a predetermined distance, suitably one quarter foot.

II. MCA/MCS Signal Recovery Unit Implementation

Figure 6:
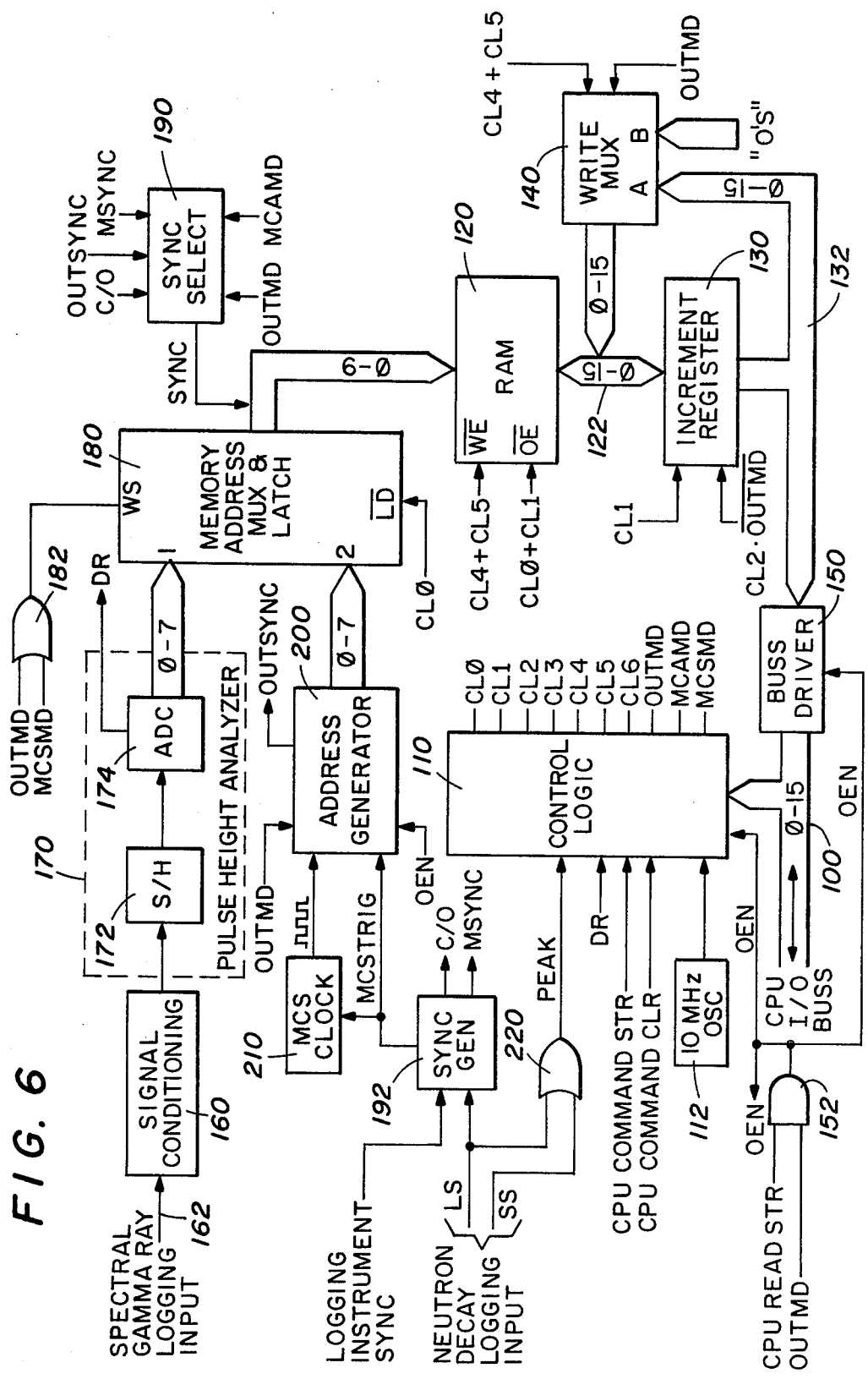
FIG. 6 is a function block diagram of an implementation of a signal recovery unit operable as either a multichannel analyzer (MCA) or a multichannel scaling (MCS) unit.

In FIG. 6, there is presented a general block diagram representation of an implementation of a signal recovery unit operable as either a multichannel analyzer or a multichannel scaling unit. The diagrammed functional implementation bears direct correspondence to signal recovery unit 52 in the computer-based nuclear well logging system diagrammed in FIG. 5. However, with minor modification by way of deletion of certain functional blocks, as will be explained, the diagrammed implementation will correspond to the signal recovery unit 16 shown in the system of FIG. 1, or correspond to the MCS unit 38 shown in the system diagrammed in FIG. 3.

Control commands from a central processing unit are supplied to the signal recovery unit via CPU I/O buss 100. Although buss 100 is a 16-bit buss, only bits 12–15 are used to designate CPU control commands. These four buss lines are applied to control logic 110 in the signal recovery unit.

The CPU control commands are summarized in the following table.

TABLE I

| CPU Control Command Summary | | | | |
| --- | --- | --- | --- | --- |
| Command | PAB12 | PAB13 | PAB14 | PAB15 |
| Set Output Mode | X | 1 | X | 1 |
| Set MCA Mode | X | 1 | 0 | 0 |
| Set MCS Mode | X | 1 | 1 | 0 |
| Set Inhibit Mode | X | 0 | X | X |
| Set Operate Mode | X | 1 | X | X |

As indicated in Table I, there are three primary control commands: output mode (OUTMD), multichannel analyzer mode (MCA), and multichannel scaling mode (MCS). Depending upon the particular nuclear well logging test to be conducted, the CPU will output the appropriate control command code to control logic 110. Control command codes are decoded in control logic 110, and the appropriate control logic output line is set. CPU control command codes are entered in control logic 110 by a CPU command strobe signal issued after the control command code is appropriately set up on buss 100. CPU control command codes are cleared by a CPU command clear signal applied to control logic 110.

A portion of the block diagram of FIG. 6 common to both the MCA and MCS functional portions is that comprising random access memory 120, increment register 130 and write multiplexer 140. These elements operate in a timed sequence with the contents of a particular memory location being read and incremented, if appropriate, and then written back into the memory location. The memory cycle timing is controlled by a series of clock signals, CL0–CL6, generated by control logic 110. A memory cycle is initiated, as will be explained more fully herein, by a signal input to control logic 110 from the MCA portion or from the MCS portion of the signal recovery unit.

Figure 7:
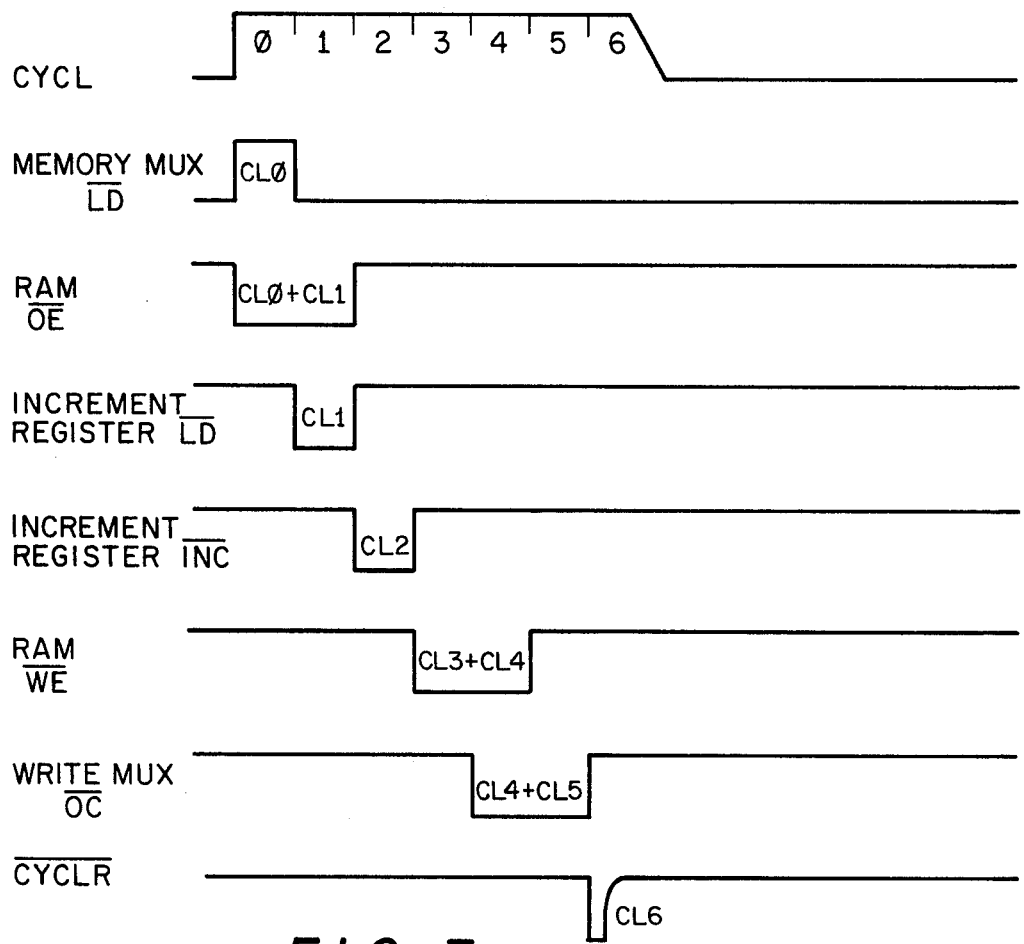
FIG. 7 is a timing diagram illustrating memory cycle timing in the apparatus diagrammed in FIG. 6.

A better understanding of the memory cycle may be had by reference to the memory cycle timing diagram of FIG. 7. With reference to the block diagram of FIG. 6 and the timing diagram of FIG. 7, when a memory cycle is initiated, a memory cycle bit within control logic 110 is set. This initiates the sequence of clocks CL0–CL6. Clock signal CL0 is used, as will be explained, to obtain the ten bit memory location address for RAM 120. Clock signals CL0 and CL1 are combined to generate a memory output enable signal and result of the contents of a particular memory location being read out over 16 bit bidirectional buss 122. Clock CL1 is used to load into increment register 130 the data read out of memory. Clock signal CL2 is applied to increment register 130 to increment the value loaded therein by a count of one. The increment register contents are made available over 16-bit buss 132 to one group of selectable inputs to write multiplexer 140. Clock signals CL3 and CL4 are combined to produce a memory write enable signal, $\overline{WE}$, and clock signals CL4 and CL5 are combined to produce a multiplexer output control signal. The memory write enable signal, of course, results in the incremented value from increment register 130, which is routed through write multiplexer 140, being written into the addressed memory location.

The memory cycle is followed when the signal recovery unit is operating in either the MCA mode or the MCS mode. When the signal recovery unit is being operated in the output mode, wherein the memory 120 contents are being acquired over buss 100 by the central processing unit, buss 132 is coupled to buss 100 by buss driver 150. The memory cycle proceeds as described; however, in the output mode of operation, clock CL2 is prohibited from incrementing the value in increment register 130. Instead, the value loaded into increment register 130 from memory 120 is output directly onto buss 132 for acquisition by the central processing unit. Also, selection of the output mode switches the selection of write multiplexer 140 from input A to input B. As indicated in FIG. 6, the change in write multiplexer selection results in all zeros being written back into memory 120 at each location there. This, of course, has the effect of establishing a zero value in all memory locations.

To operate the signal recovery unit in the multichannel analyzer mode, the central processing unit outputs the appropriate code indicated in Table I over I/O buss 100 to control logic 110. In response, control logic 110 generates an MCA mode signal MCAMD. This signal is applied to various portions of the signal recovery unit circuitry to set up operating conditions for multichannel analyzer handling of spectral gamma ray logging input signals from a subsurface well logging instrument.

Spectral gamma ray logging input analog signals are applied to signal conditioning circuits 160 over an input signal line 162 coupled to the logging cable. As discussed previously in connection with the description of the diagrammed system of FIG. 1, signal conditioning primarily involves impedance matching and signal gain to compensate for cable attenuation losses. The conditioned pulse signals are next applied to a pulse height analyzer (PHA) 170, which comprises sample and hold circuit 172 and analog-to-digital converter 174. The sample and hold circuit determines whether a pulse is present; and if so, captures the peak signal amplitude value of the pulse as an analog voltage. The peak voltage is applied to analog-to-digital converter 174 for conversion to a digital representation. It will, of course, be readily apparent to those skilled in the art that the digital value resulting from the analog-to-digital conversion is representative of the energy level of the gamma ray producing the analog pulse signal input over line 162. By calibration of the multichannel analyzer, the digital value available from the pulse height analyzer can be determined to be representative of particular gamma ray energies.

The analog-to-digital converter 174 utilized in pulse height analyzer 170 may suitably be a successive approximation type of analog-to-digital converter. Pulse processing time in the pulse height analyzer suitably is four-five microseconds, which is more than adequate since input pulses will typically be spaced not closer than ten microseconds apart. When the conversion is complete, pulse height analyzer 170 provides eight bits of digital data and a data ready signal DR.

In the scheme of the present invention for accumulating data representative of the spectrum of detected gamma ray energies, the digital value produced by pulse height analyzer 170 is utilized as an address input for random access memory 120. That is, each memory location will be made to correspond to a particular gamma ray energy level; and as gamma rays of particular energy levels are detected, the memory location corresponding to those energy levels will accumulate a count of their occurrence. Accordingly, after a period of operation in the MCA mode, memory 120 will contain a plurality of spectral gamma ray well logging digital data words indicative of the relative gamma ray emissions activity as a function of energy level.

In the implementation shown in FIG. 6, the digital word output by pulse height analyzer 170 is routed to RAM 120 through memory address multiplexer and latch 180. When the signal recovery unit is not being operated in either the MCS mode or the output mode, OR gate 182 supplies a word select input to multiplexer 180 to select input word A, which is the pulse height analyzer output word. An additional signal routed through multiplexer 180 is a sync signal generated by sync select logic 190. The sync signal is combined with the pulse height analyzer output word to form the address for RAM 120. In the MCA mode of operation, sync select 190 selects the C/O sync (i.e., carbon-oxygen log sync). If the multichannel analyzer is analyzing naturally-occurring gamma rays, there will be no C/O sync input, and the sync signal to multiplexer 180 will be a logic zero. However, if the multichannel analyzer is analyzing signals produced by induced gamma rays, the C/O sync signal will be generated in response to a synchronizing signal generated by the subsurface well logging instrument.

To digress momentarily, a subsurface well logging instrument for conducting spectral analysis of induced gamma rays, primarily for carbon/oxygen logging, includes a detector which produces signal pulses in response to inelastic gamma rays and signal pulses in response to gamma rays of capture of silicon and calcium. Since neutrons of sufficient energy to excite a carbon or oxygen nucleus exists in a formation for only a very short period of time, the detector is gated and synchronized so that detections are made while neutrons are being emitted from the neutron source. After the inelastic reactions have ceased, gamma rays of capture may be detected. Detector pulses occur randomly, but in accordance with conventional detector signal processing, the detector pulses are de-randomized downhole prior to transmission to the surface. In order to distinguish detector electrical signal pulses on the logging cable as being from either the inelastic detector or the capture detector, however, a signal synchronized in some fashion to the transmitted signal pulses must accompany the signal pulses to the surface. It is this synchronizing signal which is utilized to derive the C/O sync signal.

The inclusion of the SYNC signal as an address bit provides for pulse height analyzer digital data produced in response to inelastic signal pulses to be placed in a portion of memory 120 separate and apart from data produced in response to capture signal pulses. Thus, when the central processing unit is accessing the signal recovery unit to acquire the data stored in memory 120, there will be two spectrums read out of memory. One spectrum will be that of the inelastic gamma ray energies, and the other spectrum will be that of the capture gamma ray energies.

Figure 8:
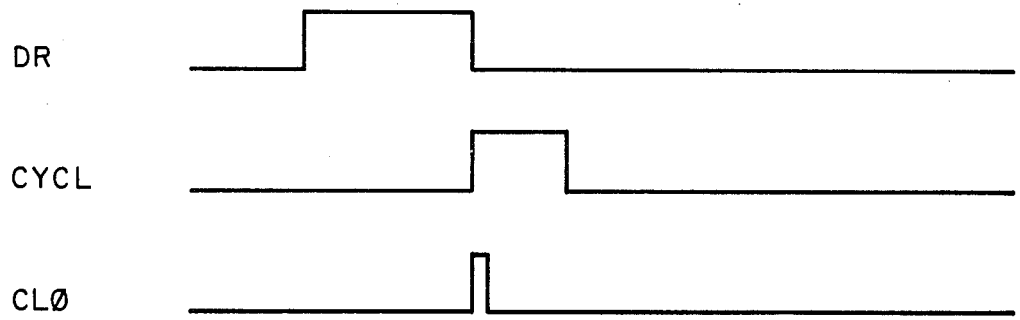
FIG. 8 is a timing diagram illustrating memory cycle timing when the apparatus of FIG. 6 is in the MCA mode of operation.

A memory cycle is initiated in the MCA mode by pulse height analyzer 170. The data ready signal is applied as an input to control logic 110 to initiate the sequence of clocks shown in FIG. 7. To more specifically depict the memory cycle timing sequence when in the MCA mode of operation, there is presented in FIG. 8 a timing diagram illustrating the sequence. As shown, the data ready signal DR is issued, and at the occurrence of its falling edge, the CYCL signal is initiated. The CYCL signal shown in FIG. 8 corresponds to that shown in the memory cycle timing diagrammed in FIG. 7. In addition, in FIG. 8 there is shown clock signal CL0, which corresponds to the CL0 signal shown in FIG. 7. For a complete understanding of the memory cycle timing in the context of a MCA mode of operation, the timing diagrams of FIGS. 7 and 8 should be considered in conjunction.

Referring again now to FIG. 6, when the signal recovery unit is operating in the multichannel scaling mode, the memory address for RAM 120 is obtained from an address generator 200. Eight bit words are generated by address generator 200 and applied to input B of multiplexer 180. The signal MCSMD produced by control logic 110 in response to the appropriate control command code from the central processing unit, acts through OR gate 182 to change the word select input of multiplexer 180, such that the input B word is selected for output to RAM 120. The SYNC signal, which serves as one bit of the memory address, is the MSYNC signal, as selected by sync select logic 190. The MSYNC signal is obtained from sync generator 192, as will be more fully explained herein.

Address generator 200 scans through a number of address values, suitably 128 in number. To repeatedly scan through the addresses, address generator 200 is driven by MCS clock 210. The frequency of the clock signal produced by MCS clock 210 establishes the time period during which each address value is output to RAM 120. Suitably, the frequency is 100 kHz, providing for an address time duration of ten microseconds. Each ten microseconds time period will occasionally be referred to herein as a "dwell time". Accordingly, each scan comprises 128 dwell times, and takes 1,280 microseconds to complete.

A scan through the 128 address channels is initiated by a trigger signal, MCS TRIG, which is generated by sync generator 192. MCS TRIG is generated in response to a logging instrument sync signal input indicating a pulsing of the neutron source in the subsurface well logging instrument.

The signal recovery unit is suitable for multichannel scaling operation in conjunction with a subsurface well logging instrument having first and second gamma ray detectors, and providing two separate neutron decay logging input signals. The two logging input signals are brought in on separate cable paths and are designated as LS and SS in FIG. 6. These two signals are applied as inputs to OR gate 220 to generate a PEAK signal. Additionally, the LS input signal is applied to sync generator 192 to generate the MSYNC signal applied to sync select logic 190.

OR gate 220 will generate a pulse at its output whenever either a LS or a SS logging input signal is received. However, the MSYNC signal will be generated only in response to the occurrence of a LS detector pulse signal. Accordingly, the MSYNC signal indicates whether the detector pulse signal producing a PEAK signal pulse is one from the detector producing LS signal pulses or the detector producing SS signal pulses.

The occurrence of a PEAK signal input to control logic 110 starts a memory cycle. It is to be appreciated that a memory cycle is conducted independently of the address scanning conducted by address generator 200. That is, a memory cycle is initiated on the basis of the occurrence of a signal pulse from either detector in the subsurface well logging instrument, whereas dwell time scanning by address generator 200 is carried out on the basis of neutron source pulsing. It is, of course, the case that detector signal pulses are produced only after pulsing of the neutron source.

Before going further into a discussion of the MCS mode of operation of the signal recovery unit, it would be helpful to summarize the time periods involved for a memory cycle and for dwell time scanning. From initiation, a memory cycle takes only 1.4 microseconds to execute. Each dwell time in the dwell time scan takes 10 microseconds, and the entire scan of 128 dwell times takes 1,280 microseconds. Scanning is conducted at the rate of neutron source pulsing, which is 1,000 times per second.

In operation following a neutron burst, sync generator 192 issues the MCS TRIG signal to address generator 200 starting a dwell time scan. Address generator 200 steps through the 128 different address codes, with each address code being set up at input B of multiplexer 180. However, until a detector signal pulse is received, control logic 110 is held in an inactive state and there is no initiation of a memory cycle. When a memory cycle is not initiated, the address code output by address generator 200, though set up at the multiplexer, is passed by. When a detector signal pulse does occur, thereby producing the PEAK signal, control logic 110 immediately initiates and executes a memory cycle.

Figure 9:
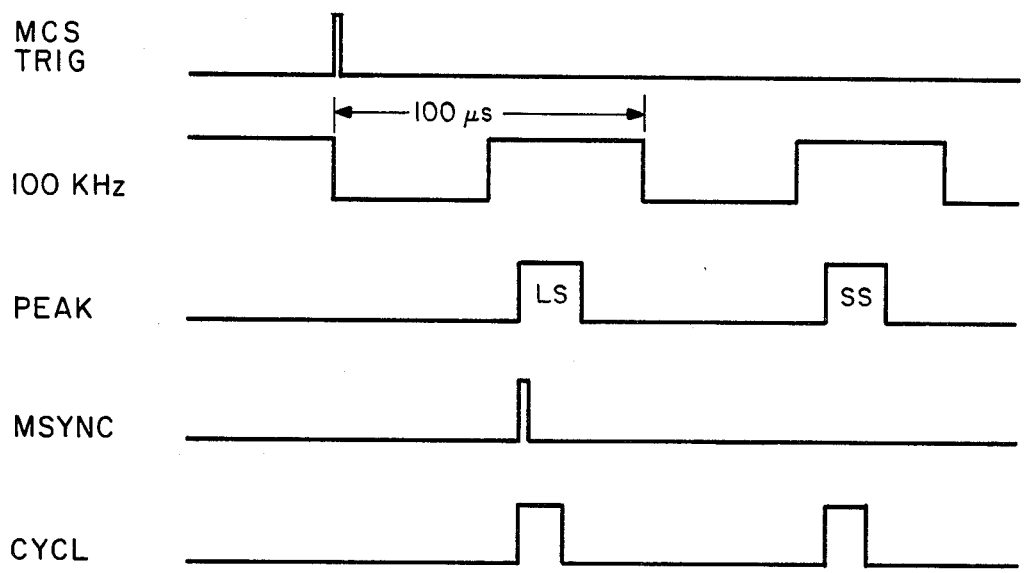
FIG. 9 is a timing diagram illustrating memory cycle timing when the apparatus of FIG. 6 is in the MCS mode of operation.

Operation of the signal recovery unit in the MCS mode, when detector signal pulses are occurring, is illustrated in the timing diagram of FIG. 9. As shown, operation is initiated by the MCS TRIG signal. The 100 kHz MCS clock pulses define the 10 microsecond-wide dwell times of each scan. When a detector pulse occurs from either detector, a PEAK signal pulse is produced. If the detector signal is LS signal pulse, then an MSYNC pulse is produced to so indicate. With the occurrence of a PEAK signal pulse, a memory cycle is initiated, which is defined in duration by the CYCL signal. The CYCL pulse shown in FIG. 9 corresponds to the CYCL pulse shown in FIG. 7, except, of course, the time scale is different for the two timing diagrams.

As will be appreciated, the MSYNC signal which is routed through sync select logic 190 and serves as one of the address bits applied to RAM 120, will cause one portion of memory 120 to register LS detector signal pulses, and another portion of memory 120 to register SS detector signal pulses. Thus, in one portion of memory 120 there will be contained data regarding the occurrence of LS detector signal pulses following a neutron burst, and in a separate portion of memory 120 there will be contained data regarding the occurrence of SS detector signal pulses.

To briefly overview the MCS mode of operation, after a burst of neutrons, the thermal and epithermal neutron detector signal pulses at the surface build up and die away exponentially. Using the neutron source pulse trigger as a start reference, the thermal and epithermal detector signal pulses which occur are registered in 128 successive 10 microsecond time slots. Each time slot, or dwell time, corresponds to successive locations in memory, with there being separate memory portions for registering thermal and epithermal detector signal pulse occurrences.

As noted previously, the diagrammed apparatus in FIG. 6 is an implementation of a signal recovery unit providing for either multichannel analyzer (i.e., spectral logging data acquisition) or multichannel scaling (i.e., neutron decay rate logging data). However, the implementation may be resolved into a purely multichannel analyzer unit, thereby providing a system configuration corresponding to that diagrammed in FIG. 1, or resolved into a purely multichannel scaling unit, thereby providing a system configuration corresponding to that diagrammed in FIG. 3.

To provide a purely multichannel analyzer signal recovery unit, multiplexer 180 may be deleted and pulse height analyzer 170 coupled directly to RAM 120. There would also be no requirement for address generator 200, MCS clock 210, or OR gate 220. Sync generator 192 may be simplified to provide for production of only C/O sync; and sync select logic 190 would not be required to accommodate the MSYNC signal.

Correspondingly, to provide a purely multichannel scaling signal recovery unit, multiplexer 180 may be deleted and address generator 200 coupled directly to RAM 120. Obviously, signal conditioning circuit 160 and pulse height analyzer 170 would no longer be required. Sync generator 192 could be simplified to require only the signals MCS TRIG and MSYNC to be generated, and sync select logic 190 would not be required to accommodate the C/O sync signal.

When the signal processing unit is placed in the output mode by the central processing unit, for acquisition by the CPU of the data contained in RAM 120, memory addressing is under control of the CPU. Address generator 200 is utilized to generate the address code applied to RAM 120. Sync select logic 190 is set-up to select the OUT sync signal for output as the SYNC bit of the memory address. Issuance of the CPU read strobe signal is effective through AND gate 152 to enable buss driver 150 to coupled I/O buss 100 to buss 132. Also, the output of AND gate 152 is applied as an input to control logic 110 to initiate a memory cycle. When the signal recovery unit is placed in the output mode, address generator 200 is cleared to zero; and thereafter, the address codes are stepped through on command by the OEN output signal from AND gate 152. As each memory location is addressed and the contents are read out on buss 132 and passed to buss 100, the central processing unit accepts the data. After all the data contained in RAM 120 has been acquired by the central processing unit, the program instruction set under which the CPU is operating returns the central processing unit to the mode in which it was operating. As noted previously, the central processing unit will acquire data from the signal recovery unit in response to an interrupt signal applied to the CPU. Typically, this interrupt will be issued for each preselected incremental unit of borehole depth traversed by the subsurface well logging instrument. Suitably, the interrupt will be issued each time the instrument traverses one quarter foot.

The data accumulated in the memory of the signal recovery unit is also routed to the display unit. However, prior to discussing the functional operation of the display unit, specific circuit implementations for the various functional blocks diagrammed in FIG. 6 will be described.

III. Specific Circuit Implementations for MCA/MCS Signal Recovery Unit

Figure 10:
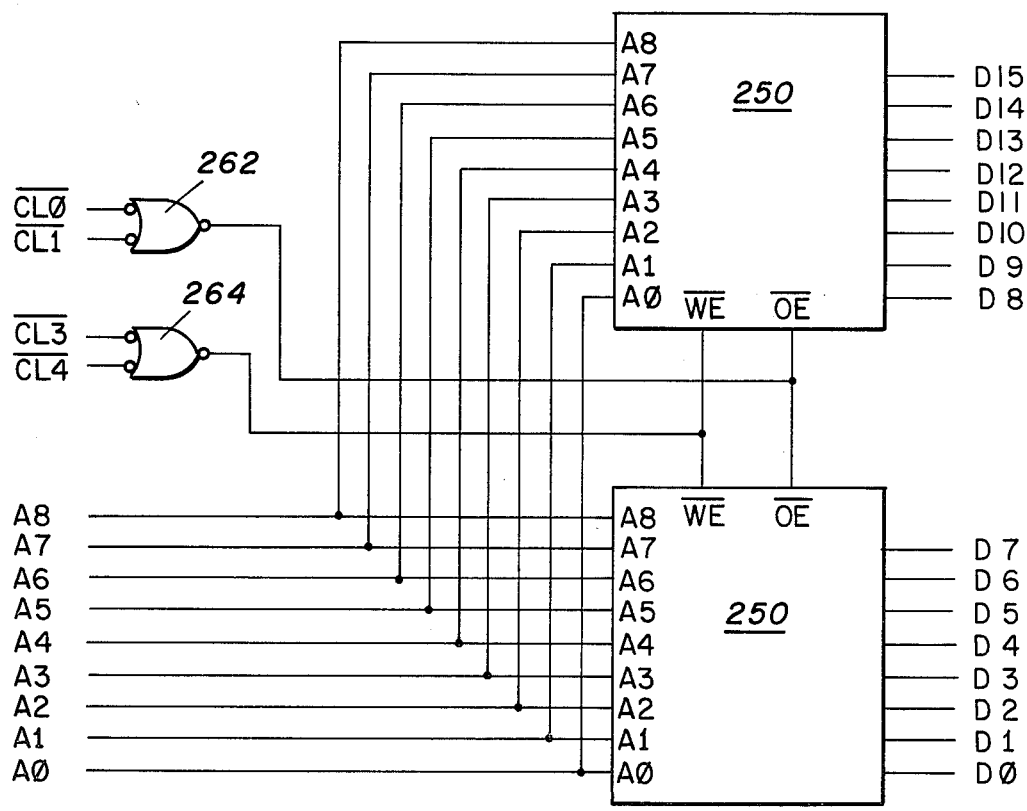
FIG. 10 is a schematic diagram of circuitry for implementing the memory diagrammed in FIG. 6.

In FIG. 10, a circuit implementation of RAM 120 is diagrammed. To provide suitable random access memory capacity, two memories 250, 260 are utilized. Each memory is a 1K×8 random access memory chip. Both memories are simultaneously addressed by address lines A0–A8. So combined, the two memories provide memory for 512 16-bit words. However, since pulse height analyzer 170 and address generator 200 generate only 8-bit words, and memory address bit A8 is used as the ninth memory address bit, memories 250 and 260 actually provide for two separate memory blocks, each of which contains 256 16-bit words.

The memory output enable signal, for reading data out of an address to memory location, is obtained from gate 262. Input signals to gate 262 are the control logic clock signal $\overline{CL0}$ and $\overline{CL1}$. Similarly, the memory write enable signal, for writing data into an addressed memory location, is obtained from gate 264. The input signals to gate 264 are the control logic clock signals $\overline{CL3}$ and $\overline{CL4}$.

Figure 11:
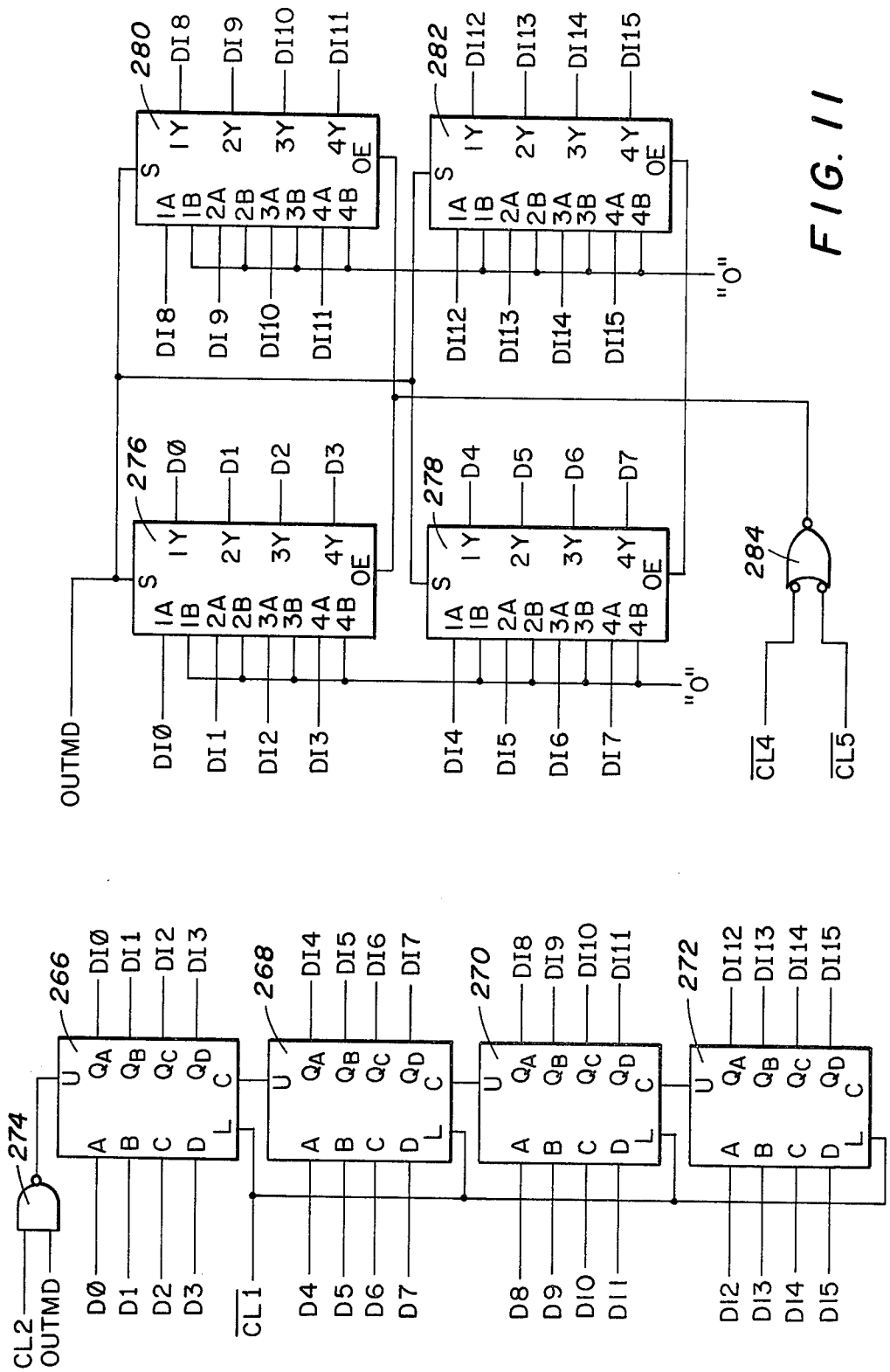
FIG. 11 is a schematic diagram of circuitry for implementing the increment register and the write multiplexer in FIG. 6.

Referring now to FIG. 11, the 16-bit digital data words read out of memory and made available over lines D0–D15 are applied to counters 266, 268, 270, and 272. Together, these four counters implement increment register 130 in FIG. 6. The clock signal $\overline{CL1}$ is applied to each counter to load into each the respective four bits of the data word read out of memory. A count pulse to counter 266 is generated by NAND gate 274 upon the occurrence of clock signal CL2. A count pulse to counter 266, is operative to increment the digital value loaded into the four counters by a value of 1. The incremented value is then available as a 16-bit word over lines DI0–DI15.

With continued reference to FIG. 11, the incremented digital value is applied as indicated to four quadruple line-to-one-line data selector/multiplexer devices 276, 278, 280, and 282. These devices implement write multiplexer 140 in FIG. 6. As indicated, the incremented value from counters 266, 268, 270, and 272 are applied to the word A inputs of the data multiplexer devices. The word B inputs to the multiplexer devices are connected together and have established thereon a logic "0" input. The output mode signal OUTMD is applied to the word select input of each device. When the signal recovery unit is not operating in the output mode, OUTMD is a logic "0", which selects the word A inputs of each multiplexer device for output. When, however, OUTMD is a logic "1", the word B inputs are selected. The multiplexer devices output lines, designated D0–D15, are routed back to memories 250 and 260. As will be appreciated, the multiplexer device outputs are tri-state outputs permitting a direct interface to the memory buss 122. Output control is provided by a signal generated by logic comprising NOR gate 284. The output control signal is based upon the condition of memory cycle timing clock signals $\overline{CL4}$ and $\overline{CL5}$.

Figure 12:
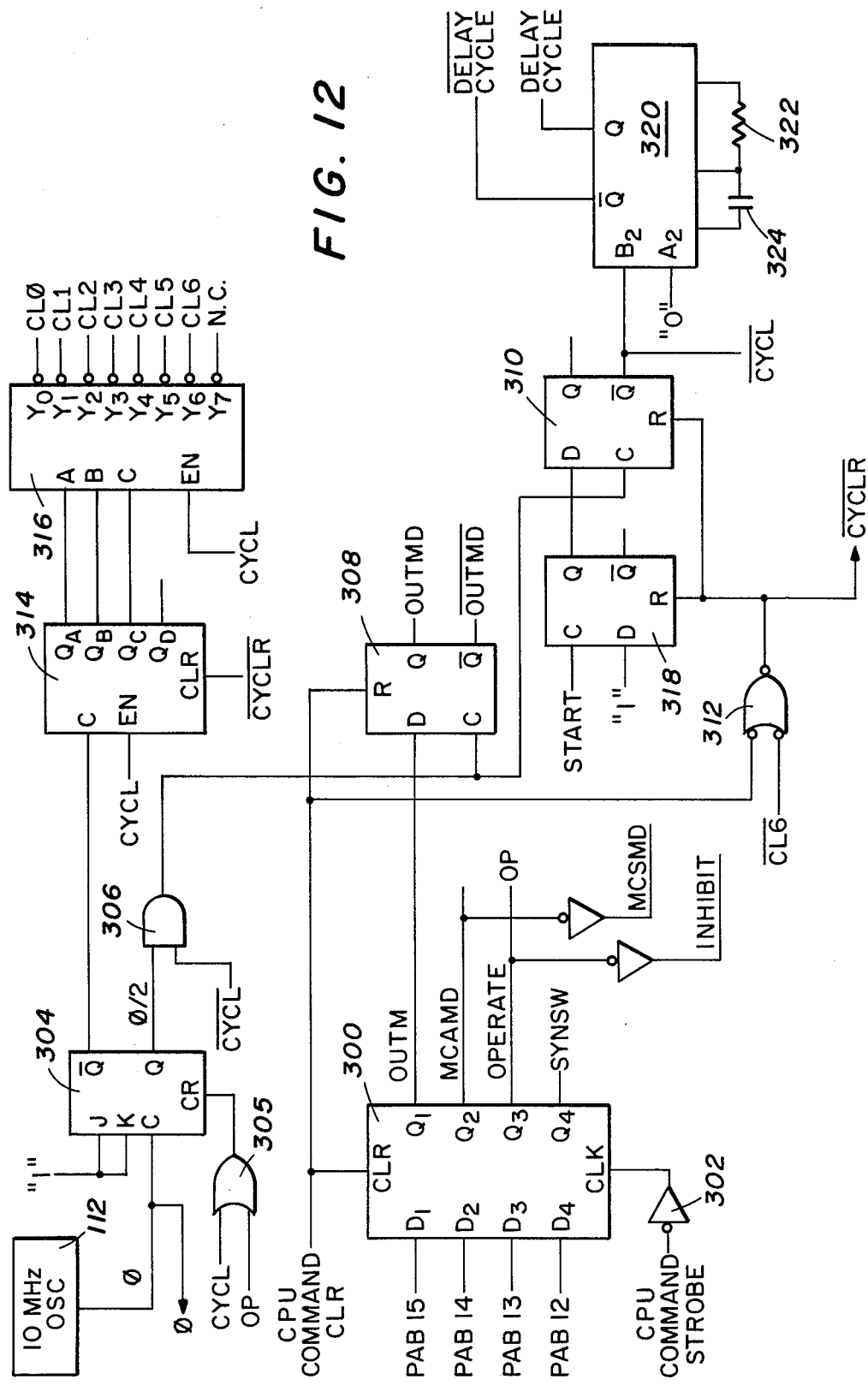
FIG. 12 is a schematic diagram of circuitry for implementing the control logic diagrammed in FIG. 6.

Referring next to FIG. 12, circuitry for implementing control logic 110 is diagrammed. As noted previously, CPU control commands are brought in over the CPU I/O buss. Of the 16 buss lines, four lines PAB12-15, are applied to control logic 110. In FIG. 12, these four buss lines are shown being connected to a quad D-type flip-flops device 300. Information at the D inputs to device 300 is transferred to the Q outputs on the positive-going edge of a clock pulse applied thereto. The clock input to device 300 is provided by inverter 302, which receives the CPU command strobe signal. Device 300 is cleared by the CPU command clear signal.

In accordance with the CPU control command summary set forth in Table I, the Q outputs of device 300 provide the signal recovery unit mode control command signals of: OUTMD, MCAMD, and MCSMD. In addition, a signal designated OPERATE is generated at the $Q_3$ outputer device 300. Note that the MCSMD signal is merely the inverted form of the $Q_2$ output providing the MCAMD signal. Similarly, the INHIBIT signal is merely the inverted form of the $Q_3$ output providing the OPERATE signal.

The clock for driving the control logic circuitry is the 10 MHz oscillator 112. The output of oscillator 112 is applied to the clock input of a J-K flip-flop 304. As shown, the J and K inputs to flip-flop 304 are tied "high". Accordingly, the oscillator 112 output frequency is divided in half. The Q output of flip-flop 304 is applied as one input to AND gate 306. The output of gate 306 is applied as a clock input to D-type flip-flop 308 and D-type flip-flop 310. The second input to gate 306, which serves as an enabling input, is the $\overline{CYCL}$ signal obtained from the $\overline{Q}$ output of flip-flop 310. When flip-flop 310 is cleared, $\overline{CYCL}$ is a logic 1. Accordingly, the output of gate 306 is the clock signal from the Q output of flip-flop 304. Flip-flop 310 is initially cleared by the CPU command clear signal, which is applied as one input to OR-function gate 312.

The $\overline{Q}$ of flip-flop 304 is applied as a clock input to a synchronous 4-bit counter 314. Counter 314 is enabled by the CYCL signal from the Q output of flip-flop 310. When enabled, counter 314 counts up, with the Q outputs indicating the count state. Counter 314 is cleared by the $\overline{CYCLR}$ signal.

The $Q_A$, $Q_B$ and $Q_C$ outputs of counter 314 are applied to a decoder device 316. The three Q outputs from counter 314 are applied as three binary input bits to inputs A, B, and C of device 316. The binary code represented by the three input bits is decoded and the one output line corresponding to the binary input values goes "low". Device 316 is enabled by the CYCL signal from flip-flop 310. As will be appreciated, as clock pulses are applied to counter 314, causing it to step through a binary up-counting sequence, the outputs of decoder 316 will sequentially go low beginning with output $Y_0$.

The Q output of flip-flop 310 is set, thereby producing the CYCL signal which enables counter 314 and decoder 316, when the D input has a logic "1" condition set-up thereon and a clock pulse from gate 306 is received. A logic "1" condition is set-up at the D input of flip-flop 310 when a START signal pulse is applied to the clock input of flip-flop 318. When the Q output of flip-flop 310 is set, further clocking of the device is inhibited by reason of the connection of the $\overline{Q}$ output to an input of gate 306. Also, when the Q output of flip-flop 310 is set, one-shot 320 is triggered producing a narrow DELAY CYCLE pulse of approximately 120 nanoseconds. The pulse width is established by the values of resistor 322 and capacitor 324, which serve as the timing components. Flip-flop 310 is reset by $\overline{CYCLR}$ from OR-function gate 312 in response to the issuance of clock signal $\overline{CL6}$ from the $Y_6$ output of decoder 316.

As further shown in FIG. 12, the OUTMD signal used in the signal recovery unit is produced when the Q output of D-type flip-flop 308 is set. This occurs when the central processing unit sends the control command for the output mode, which results in the $Q_1$ output of device 300 being set to a logic "1". The condition of the $Q_1$ output of device 300 is applied to the D input of flip-flop 308. Accordingly, when $Q_1$ is set, the next occurrence of a clock pulse from gate 306 will set the Q output of flip-flop 308, producing the OUTMD signal.

Figure 13:
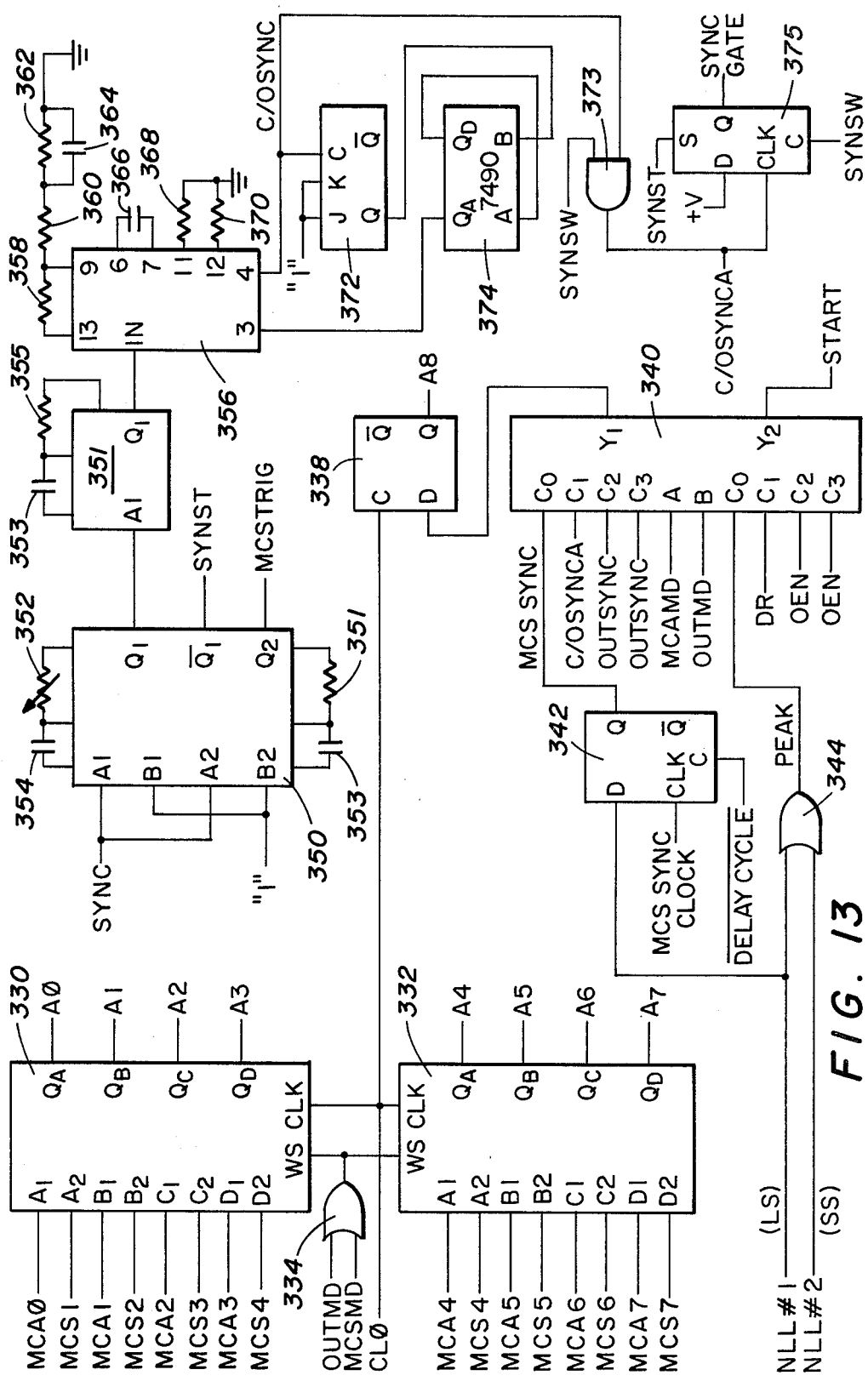
FIG. 13 is a schematic diagram of circuitry for implementing the memory address multiplexer and latch, the sync select logic, and the sync generator diagrammed in FIG. 6.

Referring now to FIG. 13, there is diagrammed circuitry for implementing memory address multiplexer and latch 180. In addition, circuitry for implementing sync select logic 190 and sync generator 192 is diagrammed.

As described in connection with the block diagram of FIG. 6 and further elaborated upon in the discussion of FIG. 10, a 9-bit address code is applied to the random access memory which stores nuclear well logging digital data. In the multichannel analyzer mode, the address code is obtained from pulse height analyzer 170; and in the multichannel scaling mode, the address code is obtained from address generator 200. Selection between the digital output of pulse height analyzer 170 and address generator 200 is made by memory address multiplexer and latch 180. As diagrammed in FIG. 13, this functional block is implemented by quad 2-input multiplexers 330, 332. Together multiplexer devices 330, 332 provide for selection between two 8-bit words. The multichannel analyzer data words available from pulse height analyzer 170 are applied as Word 1 to the A1, B1, C1, and D1 inputs to each device. The multichannel scaling digital data words are input as Word 2 to the A2, B2, C2, and D2 inputs of the devices. When the word-select input WS is low, Word 1 (i.e., MCA data) is applied to the internal flip-flops of each device. A high input to the word-select input will cause the selection of Word 2 (i.e., MCS data). The word select input is provided by OR gate 334, which receives OUTMD and MCSMD as the input signals. Thus, when the signal recovery unit is in the MCA mode, devices 330, 332 select Word 1, and when the signal recovery unit is in either the MCS mode or the output mode, Word 2, that is the output of address generator 200, is selected. The selected word is clocked to the Q outputs of each device on the positive-going edge of the clock pulse applied to the devices. The clock signal is CL0.

Devices 330, 332 provide eight bits of the nine address bits required. The ninth address bit is obtained from D-type flip-flop 338. Flip-flop 338 is also clocked by CL0. The input to the D input of flip-flop 338 is obtained from sync select logic implemented by a four-line-to-one-line data selector 340. The various available synchronizing inputs of MCS sync, C/O sync, and OUT sync are applied as selectable inputs to data selector 340. Selection between the various synchronizing signal inputs is made by the select inputs A and B of the device. Applied to input A is the MCAMD signal, and applied to the B input is the OUTMD signal.

When both MCAMD and OUTMD are "low", the MCS sync signal is selected for output to flip-flop 338. This, of course, corresponds to operation of the signal recovery unit in the MCS mode. When MCAMD is "high" and OUTMD is "low", C/O sync is selected for output to flip-flop 338. When MCAMD is "low" and OUTMD is "high", the OUT sync signal is selected for output to flip-flop 338. The condition where both MCAMD and OUTMD are both "high" should not occur.

Continuing with reference to FIG. 13, the MCS sync signal is generated by the sync generator logic which includes D-type flip-flop 342. Data input to the D input of flip-flop 342 is from a designated one of the neutron decay logging input signals. As shown in FIG. 13, the signal chosen is neutron log signal NLL#1 which is also designated by the letters LS. Flip-flop 342 is clocked by the MCS SYNC CLOCK signal generated by flip-flop 318 in FIG. 12. The $\overline{\text{STORE}}$ signal is produced in response to the occurrence of the START signal, and is maintained until flip-flop 318 is reset. Flip-flop 342 is reset by the $\overline{\text{DELAYYCLE}}$/ signal produced by one-shot 320 in FIG. 12.

Before going further with the discussion of the generation of MCS sync, it should be noted that data selector 340 is also utilized to produce the START signal applied to flip-flop 318. The START signal is selected by data selector 340 from among the signals of: PEAK, data ready DR, and output enable OEN. The PEAK signal is produced by OR gate 344, and it indicates the occurrence of a neutron decay logging input pulse signal from either the thermal or epithermal detector in the subsurface logging instrument. The DR signal is produced by the analog-to-digital converter in pulse height analyzer 170 (see FIG. 6). Finally, the OEN signal, which is also applied to buss driver 150 is, as shown in FIG. 6, generated by AND gate 152.

Selection among the signals of PEAK, DR, and OEN is made by data selector 340 on the basis of the A and B inputs thereto. When MCAMD and OUTMD are both "low", the PEAK signal is selected for output as START. When MCAMD is "high" and OUTMD is "low", the data ready signal DR is selected as START. Finally, when OUTMD is "high" and MCAMD is "low", the output enable signal OEN is selected as the START signal.

Returning now to the discussion of the generation of MCS sync, when the START signal from device 340 is applied to flip-flop 318 in FIG. 12, the MCS sync clock signal is produced. This signal clocks flip-flop 342; and if an input signal exists on the LS line, flip-flop 342 is set. This produces the MCS sync signal. Then, at the conclusion of a memory cycle, when clock CL6 resets flip-flop 310, and one-shot 320 generates the $\overline{\text{DELAYY-CLE}}$/ signal, flip-flop 342 is reset, removing MCS sync.

The C/O sync signal is generated by the remaining circuitry diagrammed in FIG. 13. As explained previously, in acquiring carbon/oxygen well logging data, two pulses are produced in the subsurface well logging instrument following a neutron burst, with both pulses being multiplexed onto the same signal line. To distinguish between the two detector signal pulses, a synchronizing signal is produced downhole and transmitted to the surface. This synchronizing signal, a narrow pulse is applied as SYNC to dual one-shot device 350. At the occurrence of SYNC, a pulse is produced from the $Q_1$ output and has a duration established by the timing components of resistor 352 and capacitor 354. Since SYNC is a repeating 1 kHz pulse signal, the output from $Q_1$ of device 350 will also be a stream of pulses. One-shot 350 provides for phase adjustment of the synchronizing signal so that it properly corresponds in time to the detector pulses.

The $Q_1$ output pulse from one-shot 350 is applied to a second one-shot 355. Upon the occurrence of a pulse from device 350, one-shot 355 produces a pulse at its $Q_1$ output, which is approximately 500 microseconds wide, as established by capacitor 357 and resistor 359. This square wave singal is then applied to phase-lock loop device 356, which is suitably a CD4046 integrated circuit device. A low pass filter network is connected between pins 9 and 13 of device 356, and comprises resistors 358, 360, 362 and capacitor 364. An internal voltage-controlled oscillator (VCO) produces an output signal at pin 4, the frequency of which is determined by the voltage at pin 9 and the values of capacitor 366 and resistors 368, 370. The values for the VCO frequency control components are selected to provide a nominal output frequency at pin 4 of 20 kHz. This output signal is fed back through a frequency divider chain comprising flip-flop 372 and decade counter 374 to the comparator input at pin three. The divider chain of flip-flop 372 and counter 374 divide the output signal frequency by a factor of 20. Flip-flop 372 divides the frequency by a factor of two, and counter 374 divides the signal frequency from the Q output of flip-flop 372 by a factor of ten.

Phase-lock loop 356 and the circuitry associated therewith serves to multiply the incoming sync signal by a factor of 20, as well as to lock onto and track the input signal on pin 14. To understand the reason for frequency multiplication of the incoming synchronizing signal, it is helpful to have an understanding of the nature of the synchronizing signal generated downhole by the subsurface well logging instrument.

As will be recalled, a subsurface nuclear well logging instrument for making a spectral analysis of induced gamma rays, particularly for acquiring carbon/oxygen log data, a neutron source is pulsed ten thousand times per second. The source neutrons immediately undergo a continuous de-energizing process as a result of elastic and inelastic collisions with nuclei of borehole and formation elements. A neutron thermal energy level is in a state of equilibrium with the surrounding atoms, and undergoes random collisions until captured, whereupon gamma rays of capture will be emitted by the absorbing nucleus. However, during the brief time during which the neutron source emits neutrons, very few fast neutrons are slowed to thermal energy, so inelastic neutron scattering reactions predominate over capture reactions. Accordingly, immediately following neutron source pulsing, there is a predominance of gamma rays produced by inelastic neutron scattering.

The gamma ray detector in the subsurface instrument detects inelastic gamma rays first following pulsing of the neutron source, and produces a first detector signal pulse. Then, slightly later in time, capture gamma rays produce a second detector signal pulse. These two pulses are both transmitted serially over the same logging cable signal path. Since the neutron source is pulsed at a rate of ten thousand times per second, and two pulses come after each pulsing, the resulting signal being transmitted over the logging cable during operation appears to be at 20 kHz.

To distinguish between signal pulses attributable to inelastic gamma ray detection and capture gamma ray detection, a synchronizing signal must be generated. Because of the timing of the neutron source pulsing and detector signal pulse production, it is not possible to insert a sync pulse. Accordingly, every twentieth neutron source trigger pulse, a sync signal in the form of a negative pulse is transmitted over the logging cable. The sync pulse signal thus appears as a 1 kHz signal on the logging cable. This results in a blanking-out of the detector pulses every twentieth neutron source burst.

To perhaps make the foregoing discussion more meaningful, reference is made briefly to FIG. 14, wherein a C/O log timing diagram is shown. Trace A is the downhole neutron source trigger signal which pulses the neutron source. Trace B is a signal for gating a downhole multiplexer for multiplexing capture detector signal pulses onto a conductor to the surface. Trace C is the signal which goes to the surface. As shown, after a neutron source trigger signal pulse, an inelastic signal pulse 376 first occurs, and by appropriate gating of the downhole multiplexer, inelastic pulse 376 is transmitted to the surface for processing. Approximately 100 microseconds later, a capture signal pulse 378 occurs and is routed by the multiplexer for transmission to the surface. As shown in the diagram, the signal pulse occurrences repeat after each neutron source trigger pulse, except at each twentieth trigger pulse, a negative-going sync pulse 380 is sent to the surface and applied as SYNC to one-shot device 350 in FIG. 13.

Because the sync signal generated downhole by the subsurface instrument is insufficient to correlate directly with the detector signal pulses, it is necessary to convert the downhole sync signal to a signal locked in frequency and time with the detector signal pulses in order to identify signal pulses as inelastic or capture. If the sync signal generated downhole is viewed as being the actual synchronization rate divided by a factor of 20, the signal may be rate multiplied to produce a signal at the synchronization rate. This is readily accomplished using the phase-lock looped circuit with the VCO section tuned for approximately 20 times the frequency of the input signal. By dividing down the VCO output signal by a factor of 20, the reference phase output signal is the same frequency as the input signal to the phase-lock loop. There is then produced a synchronizing signal which is a square wave, that is "high" in time correspondence with inelastic signal pulses and "low" in time correspondence with capture signal pulses.

Referring again now to FIG. 13, the C/O SYNC signal from device 356 is applied along with the signal SYNSW to AND gate 373, to generate C/O SYNCA. This signal is applied as an input to data selector 340 and also as a clock signal to flip-flop 375. The signal SYNSW is obtained from latch 300 in FIG. 12. Flip-flop 375 provides a SYNC GATE signal to NAND gate 476 in FIG. 16.

SYNC GATE disables analog-to-digital converter 174 of the PHA when the SYNC signal is on the logging cable. SYNC GATE flip-flop 375 is controlled by SYNSW which is a signal indicating operation in a C/O mode. When SYNSW is "high", C/O SYNC is allowed to generate C/O SYNCA for clocking flip-flop 375. Flip-flop 375 is initially set by sync start signal SYNST, which sets the $\overline{Q}$ output "low". When C/O SYNCA clocks flip-flop 375, the $\overline{Q}$ output goes back "high".

Figure 16:
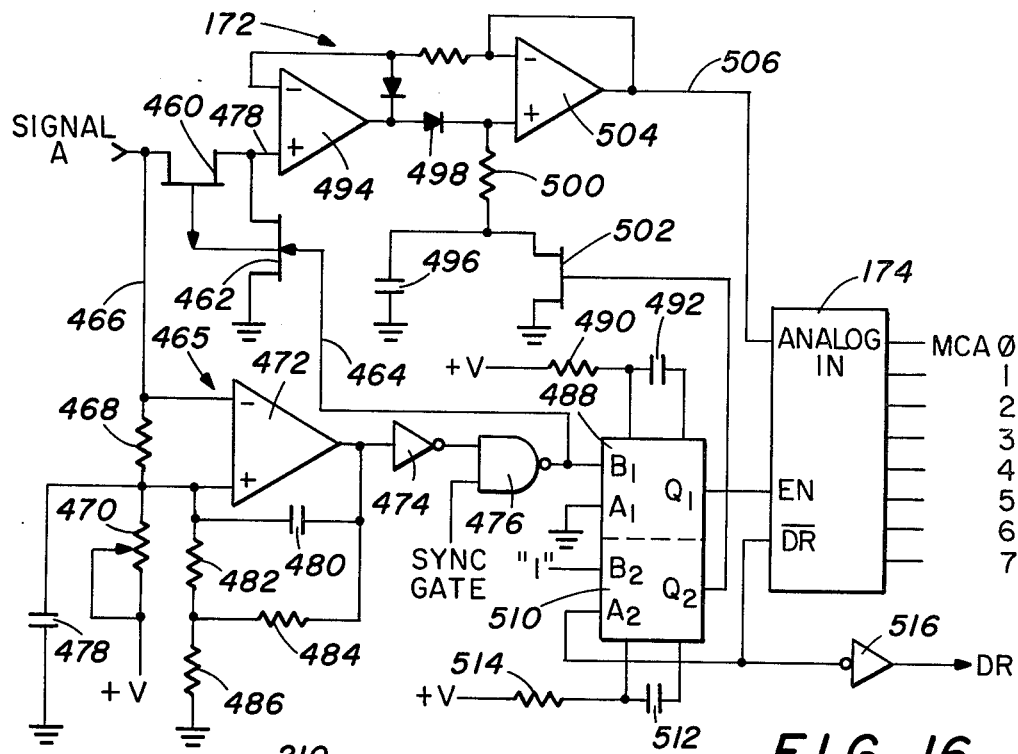
FIG. 16 is a schematic diagram of circuitry for implementing the pulse height analyzer in FIG. 6.

Referring now to FIGS. 15 and 16, circuitry for implementing signal conditioning block 160 and pulse height analyzer 170 in FIG. 6 is presented. As indicated in FIG. 15, the signal input, SIGNAL IN is the spectral gamma ray logging input 162. The signal is applied to a pulse-shaping and impedance-matching network comprising inductor 400, potentiometer 402, resistor 404 and capacitor 406. This network matches the cable impedance, and by variation in the inductor and resistor values, adjusts the shape of the pulse. The shaped pulse is next applied to an emitter-follower transistor circuit for converting the low impedance of the front-end network to a high impedance. The emitter-follower circuit comprises transistor 408, collector resistor 410 and emitter resistor 412. The resulting signal pulse at the output of the emitter-follower transistor circuit is ac coupled by capacitor 414 to the following circuitry. It can be seen that the front-end network and emitter-follower transistor circuit provide a pulse of desired shape regardless of variations in the signal input shape which occur by reason of the lengthy cable over which the signal pulses are transmitted.

Typically, signals from the subsurface instrument will comprise a broad range of signal amplitudes, for example, from about 50 millivolts to 1½ volts peak amplitude. Such a broad range of signals would be difficult for pulse height analyzer 170 to process. Accordingly, means is provided for applying variable gain to the signal pulse coupled through capacitor 414 such that the amplitude of the pulse signal applied to the pulse height analyzer is within a range of acceptable input signal amplitudes for the analyzer. Suitably, the signal amplitude is gain-adjusted or attenuation-adjusted to a nominal one volt peak amplitude.

Preferably, the means for performing the signal amplitude adjustment function comprises an operational transconductance amplifier 416. Suitably, this device may be a CA3280 device available from RCA. Device 416 is connected in a differential mode with fixed resistors 418, 420 of equal value being connected to the non-inverting and inverting inputs, respectively. Resistor 420 is connected to ground, and resistor 418 is connected to capacitor 414 to receive the pulse signal coupled therethrough.

Device 416 includes a front-end network of current-driven linearizing diodes. Changes in current to the linearization diodes, referred to as the "programming current" changes the device transfer function characteristics. Specifically, by varying the programming current to the linearization diodes, the voltage versus current transfer characteristics, i.e., resistance, of device 416 can be made to change. The combination of resistors 418, 420 and the linearization network, which is essentially a current controlled resistance $r_d$, form a voltage divider network. By using the current control input $I_D$ on device 416 to which resistor 422 is connected, the voltage applied across the inputs of device 416 may be controlled. Another adjustment input for device 416 is the amplifier bias current ($I_{ABC}$). In the manner in which device 416 is being used, the amplifier bias current is fixed. This is accomplished by connecting the $I_{ABC}$ input on device 416 to the resistor network comprising fixed resistor 424 and potentiometer 426.

In the circuit arrangement diagrammed, signal gain is varied by adjusting the voltage drop across the linearization diode network. By increasing the resistance transfer characteristic, more of the input voltage is dropped across the device 416 input. However, if the resistance transfer characteristic is decreased, more voltage would be dropped across the input resistors 418, 420, and less voltage would be applied across the device 416 input. Thus, by controlling the diode current, $I_D$, the voltage applied across the device 416 input can be varied.

Gain is generally defined as a ratio of output voltage versus input voltage. However, with respect to a transconductance device, gain is defined as current output versus input voltage. To get a voltage on the output, a load need only be provided. Then, gain can be defined for the device as output voltage versus input voltage, with the output voltage being the product of current output and load resistance. For device 416, the load is resistor 428.

It will be appreciated that by introduction of an appropriate programming current to device 416, the peak amplitude of a signal pulse coupled through capacitor 414 will be given gain or attenuated to a desired nominal output voltage level across load resistor 428. The programming current, or control current, is provided by device 430, which is also an operational transconductance amplifier. The RCA-CA3280 device consists of two variable operational amplifiers; accordingly, one amplifier can be used for device 416 and the other used for device 430. Device 430 has both the diode current input and the amplifier bias current input fixed in magnitude. This is accomplished by connection of the diode current input through resistor 432 to +V, and by connection of the amplifier bias current input through resistor 434 to +V volts. The inverting input of device 430 is connected to ground through resistor 436, and the non-inverting input is connected through resistor 438 to an input voltage source. As will be explained more fully later, the voltage input is provided by a digital-to-analog converter (DAC) 440. Based upon the voltage input to device 430, a programming current for device 416 is produced.

The voltage output across load resistor 428 is in a zero to one volt range. The pulse signal is applied to a pole-zero network comprising resistor 442 in parallel with capacitor 444. This network shapes the pulse signal and ac couples the signal to the next stage. The second stage is a non-inverting amplifier providing gain to convert the pulse signal to a higher voltage level. Suitably, a gain of 10 may be provided, such that the one volt peak output level is converted to a 10 volt peak output level. The gain stage comprises an operational amplifier 446 having a feedback resistor 448 and an input voltage-divider network comprising resistors 450 and 452. The non-inverting input of op-amp 446 has a biasing network in the form of a resistor 454 connected to +V and a resistor 456 connected to −V. This network holds the base line at zero volts. Variable resistors may be used instead of fixed resistors to provide for adjustment of the base line, or zero level, of the signal pulses.

Resistor 450 in the input network to the inverting input of op-amp 446 is connected to digital-to-analog converter (DAC) 458. By altering the voltage supplied to the inverting input of op-amp 446, variations in the base line can be effected. This is primarily utilized as a calibration mechanism to adjust for variations in offset which occur between different nuclear well logging subsurface instruments. By appropriate voltage output from DAC 458, the proper "zero" A base line to get the signal amplitudes at the appropriate level, and consequently the nuclear well logging spectrum peaks in the correct position in the spectrum, is attained. Suitably, DAC 458 has a 0–5 volts output range, and accepts a 12-bit digital word as the ZERO INPUT word.

With reference once again to DAC 440, the input digital word thereto is a GAIN CONTROL INPUT word from the CPU. In accordance with a routine executed by the CPU, referred to as the STABL routine, a gain setting for device 416 is computed. By varying the gain through device 416, the amplitude of the signal pulses is varied, which will have the effect of shifting the energy spectrum position corresponding to the pulse. Generally, the CPU operating in accordance with the STABL routine, after determining that a sufficient number of spectrum measurements or "counts"- 'have been made, attempts to locate the peak centroid of each channel and makes a comparison with the desired centroid for the channel. Based upon the relative positioning between the desired centroid and the peak centroid, a gain setting for device 416 is computed. In making measurements of naturally occurring gamma rays, the STABL routine may check all three natural peaks, (i.e., uranium, thorium, and potassium), but only uses the highest energy peak available. For a carbon/oxygen log, the capture hydrogen peak is preferably used exclusively. Desirably, operator commands may take control of the STABL routine for initial set-up of the gain and zero base line adjustments.

Referring now to FIG. 16, the pulse height analyzer circuitry receives the signal output from op-amp 446 in Fig. 15. The signal is designated as SIGNAL A. At the point of input to the pulse height analyzer circuitry, SIGNAL A is a pulse having a gaussian shape. The signal is applied to a pair of FET switches 460, 462. One of the FET switches 460 is connected in series with the signal input path and the other FET switch 462 is connected between the signal input path and ground. FET switches 460, 462 are controlled by a signal on line 464 which is generated by a slope detector circuit generally indicated by the reference numeral 465.

The slope detector circuit also receives SIGNAL A, the signal being applied over line 466 to a voltage divider network comprising resistor 468 connected between the inverting and non-inverting inputs of comparator 472 and potentiometer 470 connected to +V. The inverting input of comparator 472 is at virtual ground when there is no signal input. Accordingly, resistor 468 may be viewed as going to ground on one end, and having a small voltage drop across it which puts the non-inverting input of comparator 472 at a slightly higher potential. As a result, comparator 472 is placed into a "high" output state. The output terminal of comparator 472 is connected to inverter 474, which is in turn connected to NAND gate 476. The high output state of comparator 472 causes inverter 472 to place a logic zero input to NAND gate 476, thereby establishing the output of gate 476 in a "low" condition. Thus, when there is no signal input, line 464 is "low" and FET switch 460 is open and FET 462 is closed.

A capacitor 478 is also connected to the non-inverting input of comparator 472, and it provides a slight delay in the rise time of a signal applied to the non-inverting input. Thus, although both the inverting and non-inverting inputs of comparator 472 will have a signal applied thereto when an input signal pulse occurs, the inputs will be offset from each other and the voltage rise at the non-inverting input will lag slightly behind the voltage rise at the inverting input.

When a signal pulse comes through over line 466, there will be a rise in voltage at the inverting input when the voltage level on the inverting input becomes larger than the voltage level on the non-inverting input, the comparator will change its output condition to a "low" state. As the pulse signal reaches its peak and just starts to go down in amplitude, the lagging voltage rise on the non-inverting input will overtake the voltage on the inverting input. When the voltage on the non-inverting input is again larger than the voltage on the inverting input, the output of comparator 472 will again go high.

A comparator transition from high to low indicates the onset of an incoming signal pulse. If the SYNC GATE input to NAND gate 476 is a logic one, the output of gate 476 will go low, which in turn closes FET switch 460 and opens FET switch 462. This permits the incoming signal pulse to be passed through to conductor 478. SYNC GATE is a signal which is always a logic one if the nuclear well logging system is measuring naturally occurring gamma radiation. If, however, the system is operating to obtain carbon/oxygen log data, SYNC GATE will occasionally be required to become a logic "zero", in order to blind the pulse height analyzer to the downhole sync pulse signal which occurs every twentieth neutron source trigger pulse.

Comparator 472 is also provided with a hysteresis network comprising capacitor 480 and resistors 482, 484, 486. The hysteresis network makes the comparator more stable and obviates it assuming an indeterminate condition wherein the comparator output condition flickers between states. Because of the rapid switching action of comparator 472, noise riding on the incoming signal has the potential to cause the comparator to rapidly flicker between states.

The output of NAND gate 476 is also applied to the positive-transition-trigger input of one-shot device 488. When the output of comparator 472 makes a transition from low to high, thereby causing the output of NAND gate 476 to go from a low to a high state, one-shot 488 produces a pulse at the Q1 output. The duration of the pulse is a function of the values of a RC timing network comprising resistor 490 and capacitor 492. Suitably, the pulse duration may be about 150 nanoseconds.

A pulse signal passed through the FET switches to conductor 478 is applied to the non-inverting input of an operational amplifier 494 connected as a voltage follower circuit. Op-amp 494 serves as a signal buffer and is utilized to charge capacitor 496 to the peak voltage of the pulse signal. Capacitor 496 is charged through diode 498 and resistor 500. As will be more fully explained, FET switch 502 is, during the charging of capacitor 496, an open circuit. The non-inverting input of operational amplifier 504, a voltage follower circuit, is also connected to diode 498. Op-amp 504, however, has a very high input impedance and draws very little current. Op-amp voltage follower 504 produces an output voltage on line 506 which tracks the voltage on capacitor 496. Diode 498, of course, prevents capacitor 496 from discharging after the voltage output from op-amp 494 passes the peak of the signal pulse and beings to follow the pulse amplitude back down to zero voltage.

Thus, when a signal pulse is detected by slope detectors 465, the sample and hold circuit 172 obtains on capacitor 496 a voltage equal to the peak amplitude of the signal pulse and maintains the voltage thereon, and produces a voltage output equal to the voltage value stored on the capacitor. The voltage will be maintained on capacitor 496 until FET switch 502 is closed, thereby discharging capacitor 496 back to zero voltage level.

The voltage output on line 506 from sample and hold circuit 172 is applied to the analog input of analog-to-digital converter 174. The A/D converter is enabled by the pulse output from the $Q_1$ output of one-shot 488. As explained previously, the $Q_1$ output of one-shot 488 issues the enable pulse when slope detector 465 detects that the peak amplitude of the incoming signal pulse has been reached. Preferably, A/D 174 has a twelve bits resolution, of which only eight bits are used. The A/D converter will convert the voltage on its analog input into a 12-bit digital code in 2.8 microseconds and provide the 8-bit data word on output MCA0–7. When the conversion is complete, the A/D converter will issue a data ready signal ($\overline{DR}$). The $\overline{DR}$ signal is applied as an input to the negative-transition-trigger of one-shot 510. The occurrence of a negative transition of $\overline{DR}$ causes a pulse to be produced from the $Q_2$ output of one-shot 510, which pulse is applied to FET switch 502 to close the switch and discharge capacitor 496. The duration of the pulse from the $Q_2$ output is determined by the values of a RC network comprising capacitor 512 and resistor 514. Suitably, the pulse duration is 1.6 microseconds.

The 8-bit MCA digital code is applied to multiplexers 330, 332 in FIG. 13 and utilized as described previously. The $\overline{DR}$ signal is inverted by inverter 516 to produce the DR signal applied to the $C_1$ input of data selector 340 in FIG. 13.

Figure 17:
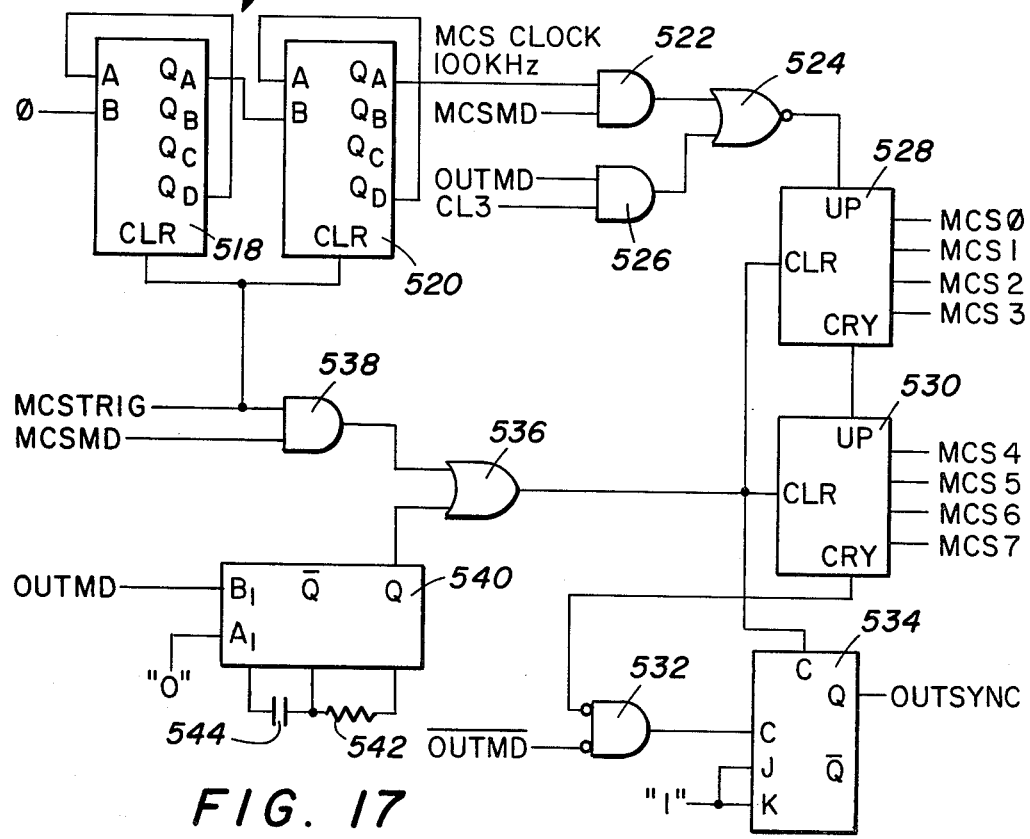
FIG. 17 is a schematic diagram of circuitry for implementing the address generator in FIG. 6.

Referring next to FIG. 17, there is presented a schematic diagram of circuitry for implementing address generator 200. Also included in FIG. 17 is circuitry for implementing MCS clock 210. Both address generator 200 and MCS clock 210 are shown in the block diagram of FIG. 6.

The MCS clock is a 100 kHz clock signal derived from the 10 MHz clock signal produced by oscillator 112 in FIG. 12. To divide down the 10 MHz signal to a 100 kHz signal, two decade counters 518 and 520, both connected in a divide-by-ten mode, are utilized. The CLR input on each decade counter is connected to receive the MCSTRIG signal produced at the $Q_2$ output of one-shot 350 in FIG. 13. As explained previously, MCSTRIG is generated in response to a logging instrument sync signal input indicating a pulsing of the neutron source in the subsurface well logging instrument. Clearing of the decade counters with MCSTRIG serves to "synchronize"the MCS clock.

The MCS clock signal from decade counter 520 is applied as an input to AND gate 522. The other input to gate 522 is the MCSMD signal, which serves as an enabling signal. That is, only when the nuclear well logging system is operating in the multichannel scaling mode will the MCS clock signal pulses be passed through gate 522. MCS clock pulses pass through gate 522 and are applied as an input to NOR gate 524. The second input to gate 524 is from AND gate 526, which receives as inputs OUTMD and OEN. A pulse from either gate 522 or gate 526 will produce a low output condition for gate 524. Thus, either the occurrence of a MCS clock pulse or a pulse output from gate 526 will produce a low output condition for gate 524. Gate 526 can produce a pulse output when the system is operating in the output mode and CL3 is generated. The OUTMD signal is produced by control logic 110, the implementation of which is shown in FIG. 12, and the OEN signal is generated by gate 152 in FIG. 6 in response to a CPU read strobe input.

The output signal from gate 524 is utilized as the clock input to the first of two cascaded synchronous 4-bit up/down counters 528 and 530. Counter 528 receives directly the clock pulses from gate 524 and provides a carry output to the count up input of counter 530. The carry output of counter 530 is applied to gate 532. When the system is in the output mode, and in response to a carry output from counter 530, gate 532 will produce a clock signal to flip-flop 534 in turn generating the OUT SYNC signal.

Counters 528, 530 are cleared to zero, and flip-flop 534 is reset, by a clear signal produced by OR gate 536. A clear signal can be produced in response to an input from AND gate 538. This occurs when the system is in the multichannel scaling mode, such that MCSMD is high, a clear pulse will be generated upon the occurrence of MCSTRIG. Alternately, a clear pulse can be generated in response to a pulse from the Q output of one-shot 540. A pulse is issued from oneshot 540 when the system enters the output mode. Upon that occurrence, OUTMD is set, triggering one-shot 540. A pulse of a duration dependent upon the values of resistor 542 and capacitor 544, constituting a RC timing network, is produced.

IV. Operator's Spectrum Display Implementation

Figure 18:
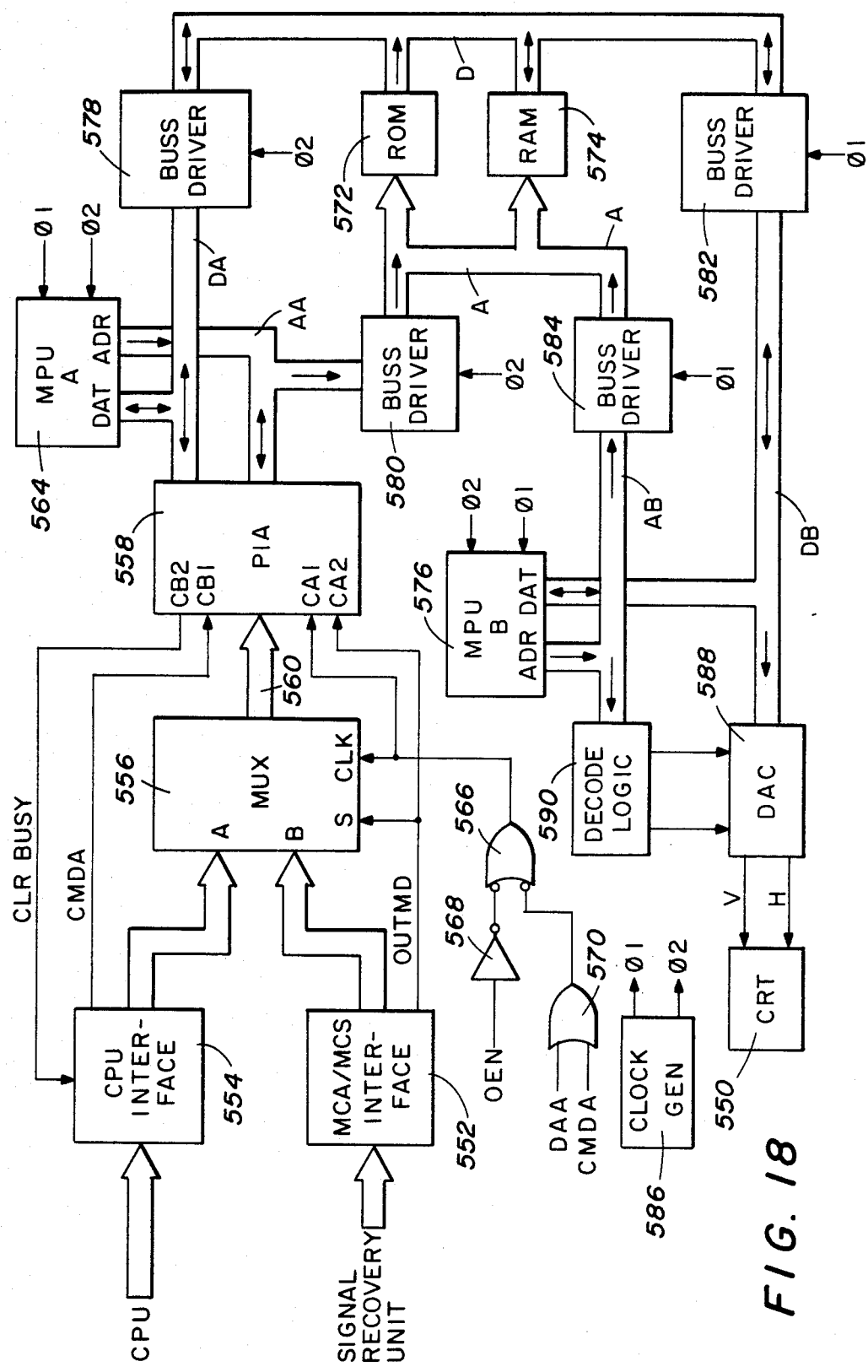
FIG. 18 is a block diagram of an implementation of an operator's display for use in the systems of FIGS. 1, 3, and 5.

In FIG. 18, there is presented a block diagram of an implementation of the operator's spectrum display 22 in Fig. 1. The implementation will also suffice for MCA display unit 40 in FIG. 3 and display unit 56 in FIG. 5.

As described previously, the display unit in each nuclear well logging system configuration receives display commands from the CPU and monitors the data lines from the signal recovery unit to obtain data for display. As indicated in FIG. 18, the display presentation to the well logging system operator is by means of a cathode ray tube (CRT) 550 in a format of channel number on the horizontal axis of the CRT versus counts in a vertical direction of the CRT. That is, the data is arranged in an X-Y display format.

Data from the signal recovery unit for formatting and display is brought in through the MCA/MCS interface 552. Display control commands from the CPU are brought in to the display through the CPU interface 554. In addition to supplying operational commands to the display, the CPU can load data into the display for use in executing certain display functions. However, in normal operation of the system, the CPU merely commands a particular display. Table II below summarizes the CPU display commands.

TABLE II

| CPU Display Commands Summary | |
|---|---|
| Command | Byte (Hex) |
| Display low 256 data channels | 08 |
| Display high 256 data channels | 09 |
| Set channel intensification points (data to follow for setting vertical scale) | 02 |
| Set region of low data channels (data to follow) | 05 |
| Set region of high data channels (data to follow) | 06 |
| Clear display | 0A |
| Set flashing cursor | 0B |
| Reset MPU A & B | 0C |
| Display log scale | A0 |
| Accept and display data from CPU | A1 |
| Set vertical scale = | |
| 256 | 10 |
| 512 | 20 |
| 1024 | 30 |
| 2048 | 40 |
| 4096 | 50 |
| 8128 | 60 |
| 16K | 70 |
| 32K | 80 |
| 64K | 90 |

A selection between interfaces 552 and 554 is made by multiplexer/latch 556. The output mode signal OUTMD from the signal recovery unit is utilized as the multiplexer select control input. If the signal recovery unit is not in the output mode, the multiplexer selects the CPU interface for output. On the other hand, if the signal recovery unit is in the output mode, multiplexer 556 selects data from interface 552. The selected interface output code word is applied by multiplexer 556 to peripheral interface adapter (PIA) 558. PIA 558 may suitably be a Motorola MC6821 device to provide for interfacing of pheripheral equipment to a Motorola MC6800 microprocessing unit MPU A. PIA 558 is capable of interfacing an MPU to peripherals through two 8-bit bidirectional peripheral data busses and four control lines. The peripheral data busses are designated jointed by reference numeral 560 in FIG. 18, and the four control lines are labeled CMDA, BUSY, CLK and OUTMD.

Display commands and signal recovery unit data words are latched into multiplexer 556 upon the occurrence of a clock input CLK from negative-true input OR gate 566. A clock pulse will be generated by 566 upon the occurrence of OEN which is inverted by inverter 568 and applied as an input to gate 566. OEN is an output enable signal generated in the signal recovery unit (gate 152 in FIG. 6). A clock pulse produced in response to OEN serves to latch data from interface 552. Gate 566 will also produce a clock pulse when NOR gate 570 outputs a logic zero. Gate 570 produces a logic zero output when a display command is available from the computer, as indicated by the signal $\overline{DAA}$ and a display command strobe signal $\overline{CMDA}$ is output by the CPU. A CLK pulse to multiplexer 556 in response to the signals $\overline{DAA}$ and $\overline{CMDA}$ serves to latch a display command from interface 554.

CMDA is applied to CB1 of PIA 558 causing it to generate an interrupt to MPU A. PIA 558 will also generate an interrupt to MPU A when the signal recovery unit enters the output mode by reason of the connection of OUTMD to CA2 of PIA 558.

Because MPU A is interrupted when there is either a display command or a change of the signal recovery unit to the output mode, MPU A must determine which has occurred. To do so, MPU A checks the status of the CA2 input to PIA 558. If CA2 is set, it is indicated that signal recovery data transfer is about to begin. On the other hand, if CA2 has not been set, then MPU A knows that the word latched in multiplexer 556 is a display command. MPU A checks CA1, after finding CA2 is set, and if CA1 is set, data is read. MPU A acknowledges that it has read a display command or data from multiplexer 556 by sending a CLEAR BUSY STROBE from CB2 of PIA 558 to a status flip-flop (See FIG. 20). In the case of data taken from interface 552, there is no acknowledgement sent.

Signal recovery unit data is taken by MPU A and handled in accordance with a set of program instructions contained in ROM 572. This involves, generally, formatting the 16-bit words and setting-up the data in RAM 574. To acquire the data, MPU A continuously executes read cycles to take data output from the signal recovery unit from location zero to location 512 of the memory therein (RAM 120 in FIG. 6). A counter in MPU A counts each data word that comes in and keeps track of the channel number. Each data word is placed in an internal buffer memory while MPU A reads the previously acquired and stored data from RAM 574. The data read out of RAM 574 is added to the data stored in the buffer memory and stored back in a buffer location in RAM 574. After data for all channel locations have been read, MPU A will apply computer-commanded scaling factors to the data and place the scaled data into output locations in RAM 574. Primarily, the scaling applied would be vertical scaling. That is, a change in the vertical scale factors of the display. In the early stages of data acquisition, wherein there are very few counts for the channels, the scale on which the channel counts are presented is scaled down. As the logging operation proceeds and channel counts increase, the vertical scaling of the display is scaled up. Preferably, scaling is accomplished by the system operator inputting commands to the CPU, which cause the CPU to send out display commands that effect a change in the scale factor per vertical division on the CRT.

In addition to scaling accumulated channel counts data, MPU A may be commanded to execute one of the several other display commands set forth in Table II. For example, MPU A may be commanded to display regions of interest. That is, display on the CRT only a certain group of the channels. Another display command which can be executed after data is acquired is the intensification function. On the CRT, there will be a series of dots representing each channel of data. Certain dots can be made brighter to intensify certain channels. For example, if it were desired to see exactly where channel 100 is in relation to the spectrum, that point can be intensified via display command from the CPU. To provide the intensification, the data for a particular channel is held twice as long as normal at a particular screen spot during the horizontal deflection.

The spectrum display includes a second microprocessor, MPU B 576, which serves to output the data set-up by MPU A to the CRT driver circuits. Because MPU A and MPU B both access the same memories, the memory data and address lines must be capable of selective isolation from each microprocessor. This is accomplished through the use of tri-state output buss drivers. MPU A communicates bidirectionally with memory data buss D via bidirectional buss driver 578. Memory location addresses output by MPU A are applied to the memory address buss A via buss driver 580. In a similar fashion, MPU B communicates with data buss D via bidirectional buss driver 582, and memory location addresses output by MPU B are applied via buss driver 584 to address buss A.

Also, in order for MPU A and MPU B to share common memory, the microprocessors must operate on opposite phases of a two-phase, non-overlapping clock. FIG. 19 shows the clock phases, $\phi 1$ and $\phi 2$. It will be appreciated from the diagram in FIG. 19 that "non-overlapping" means that the $\phi 2$ phase clock does not at any time assume a "high" condition when the $\phi 1$ phase clock is "high". Each microprocessor utilizes both clock phases. On one clock phase, the microprocessor sets-up addresses and does other things preparatory to a read or write cycle. On the other clock phase, a read or write cycle, i.e., an input-output cycle is executed. Thus, each microprocessor has two cycles of operation, one a preparatory cycle and the other a memory access cycle, each of which is controlled by a separate clock phase. Accordingly, one microprocessor can be executing a preparation cycle while the other is executing a memory access cycle. In order to set-up the operation of MPU A and MPU B in this manner, the $\phi 1$ and $\phi 2$ clock phases are applied to opposite clock inputs of the two microprocessors. Then, while MPU A is accessing memory, MPU B will not be accessing memory, and vice versa. Also, buss drivers 578, 580 for MPU A must operate off the $\phi 2$ clock, and buss drivers 582, 584 for MPU B must operate off the $\phi 1$ clock pulse.

MPU B operates to continually read data for display left in output buffer locations of RAM 574. The data read from memory by MPU B is output to digital-to-analog converters (DAC) 588. The data output to DAC 588 comprises data for the horizontal axis (channel number) and for the vertical direction (counts). DAC 588 is continously updated at about a 40 microsecond rate. Selection between the vertical data digital-to-analog converter and the horizontal data digital-to-analog converter in DAC 588 is by decode logic 590.

Referring now to FIG. 20, circuitry for implementing CPU interface 554 is diagrammed. To determine when the CPU is trying to communicate to the spectrum display, a device address decoder circuit is required. This is provided by NAND gate 600. A combination of inverted and non-inverted signals from the computer data lines, specifically lines DC8–15, are applied as inputs to gate 600. DC15 is the lowest significant bit. Accordingly, only the lowest order byte of the 16 bits of a computer data word are used as the device address. The output of gate 600 will go "low" when all of its inputs are "high". In order for such input conditions to exist, the computer must send out a binary "00110011", which equals a hexadecimal "33".

The output of gate 600 is applied as an input to NAND gates 602 and 604. The second input to gate 602 is the output of gate 604, and the second input to gate 604 is an address line $\overline{ADRS}$ When the CPU sends the proper device address of 23, and the output of gate 600 goes low, the output of gate 602 changes from a low to a high state and releases the clear input on flip-flop 606.

When the CPU sends the $\overline{\text{ADRS}}$ signal, the output of gate 604 goes low, and flip-flop 606 is set. The output of gate 604 is also applied as an input to NAND gate 608. A low output from gate 604 causes gate 608 to output a logic zero which is inverted by inverter 610 to produce a signal ACK acknowledging that the spectrum display has received the address code. Flip-flop 606 is cleared by application of the system clear signal SCLR, which occurs at CPU start-up, to the clock input.

The $\overline{Q}$ output of flip-flop 606 is applied as an input to each of gates 612, 614 and 616. Thus, the $\overline{\text{ADRSA}}$ signal serves as an enabling input to each gate, and once the display has been addressed by the CPU, the gates will be enabled.

After addressing the display and receiving an acknowledgement from the display, the CPU will send a display command, send data, or send a status request. If the CPU sends a display command, a command pulse will be sent as a CMD input to gate 616. The CPU sends a status request over line $\overline{\text{SR}}$ to gate 612. Finally, when data to be transferred to the display is available, the CPU sends a data available signal $\overline{\text{DA}}$ to gate 614. Following receipt of any one of the signals, gate 608 and inverter 610 provide an acknowledgement signal back to the CPU.

Flip-flop 618 is provided to generate an indication to the CPU that MPU A is busy or available. As indicated in the block diagram of FIG. 18, a CLR BUSY signal is produced by peripheral interface adapter 558. This CLR BUSY signal is applied to the clear input of flip-flop 618 to maintain the device in a reset condition so long as MPU A is busy. When MPU A is available and the CPU wants to send data or display commands to the display, flip-flop 618 is set by a signal $\overline{\text{DSTR}}$ from gate 620. Inputs to gate 620 are obtained from the outputs of gates 614 and 616. When flip-flop 618 is set, the Q output generates a high condition to NAND gate 622. The second input to gate 622 is from inverter 624 which receives the status request signal from gate 612. The CPU sends status requests and monitors the line from the output of gate 622. When MPU A is available, such that flip-flop 618 is set, the output of gate 622 goes low and indicates to the CPU that the display can receive commands or data.

Figure 21:
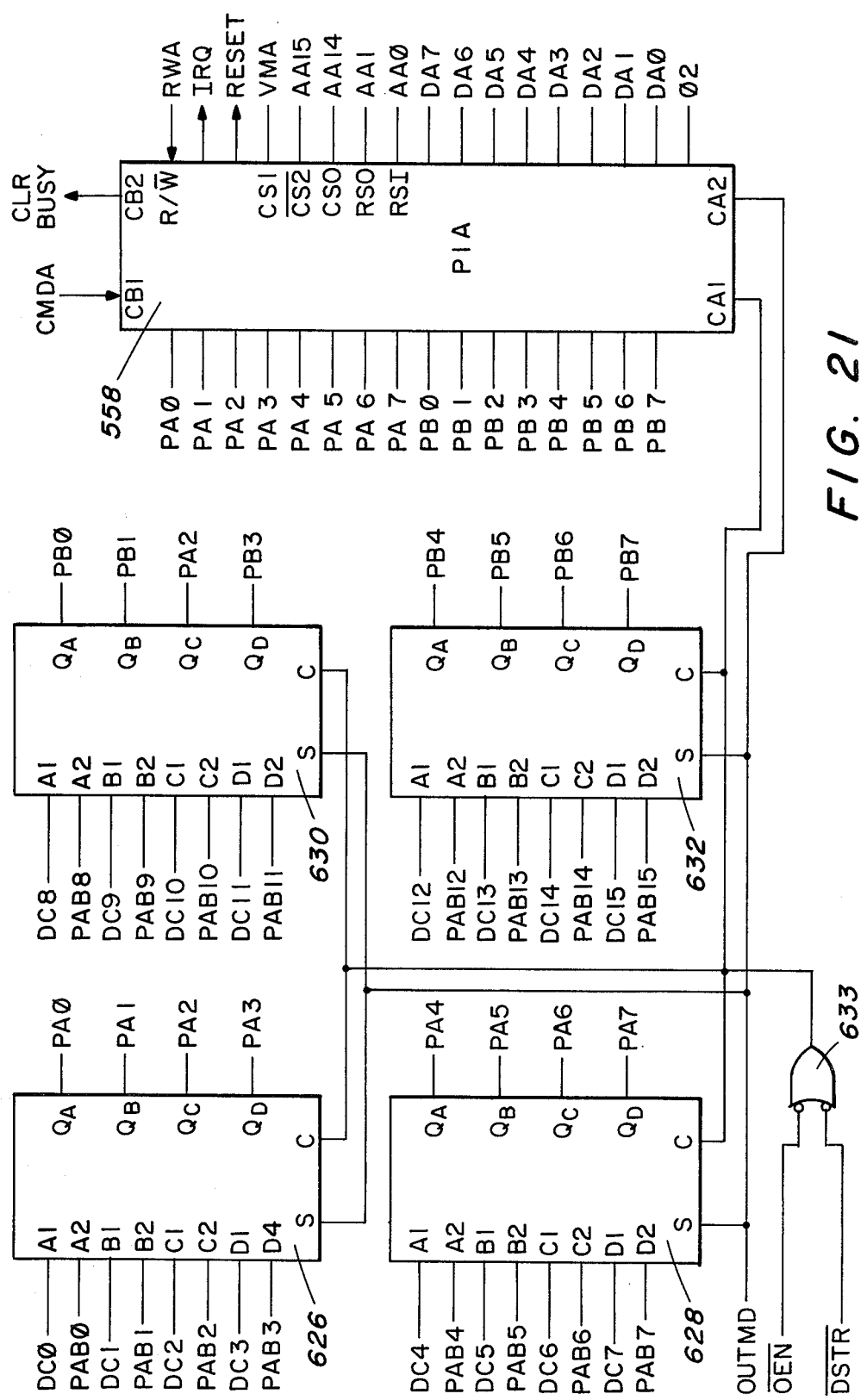
FIG. 21 is a schematic diagram of circuitry for implementing the multiplexer/latch and the peripheral interface adapter (PIA) in FIG. 18.

Referring next to FIG. 21, multiplexer/latch 556 is shown to be implemented with quad-2-input multiplexers (with storage) 626, 628 and 630, 632. The inputs to multiplexers 626, 628 are the computer buss lines DC0-7 and the signal recovery unit buss lines designated PAB0-7. Multiplexers 630, 632 receive the computer buss lines DC8-15 and the signal recovery unit buss line PAB8-15. Multiplexers 626, 628 provide the PA0-7 lines for a first of the 8-bit busses of peripheral interface adapter 558. Multiplexers 630, 632 provide as outputs PB0-7, the second 8-bit buss for PIA 558.

The peripheral interface adapter provides eight bits of data DA0-7, and receives chip select and read-write controls over MPU A address buss lines AA0, 1, 14 and 15.

Figure 22:
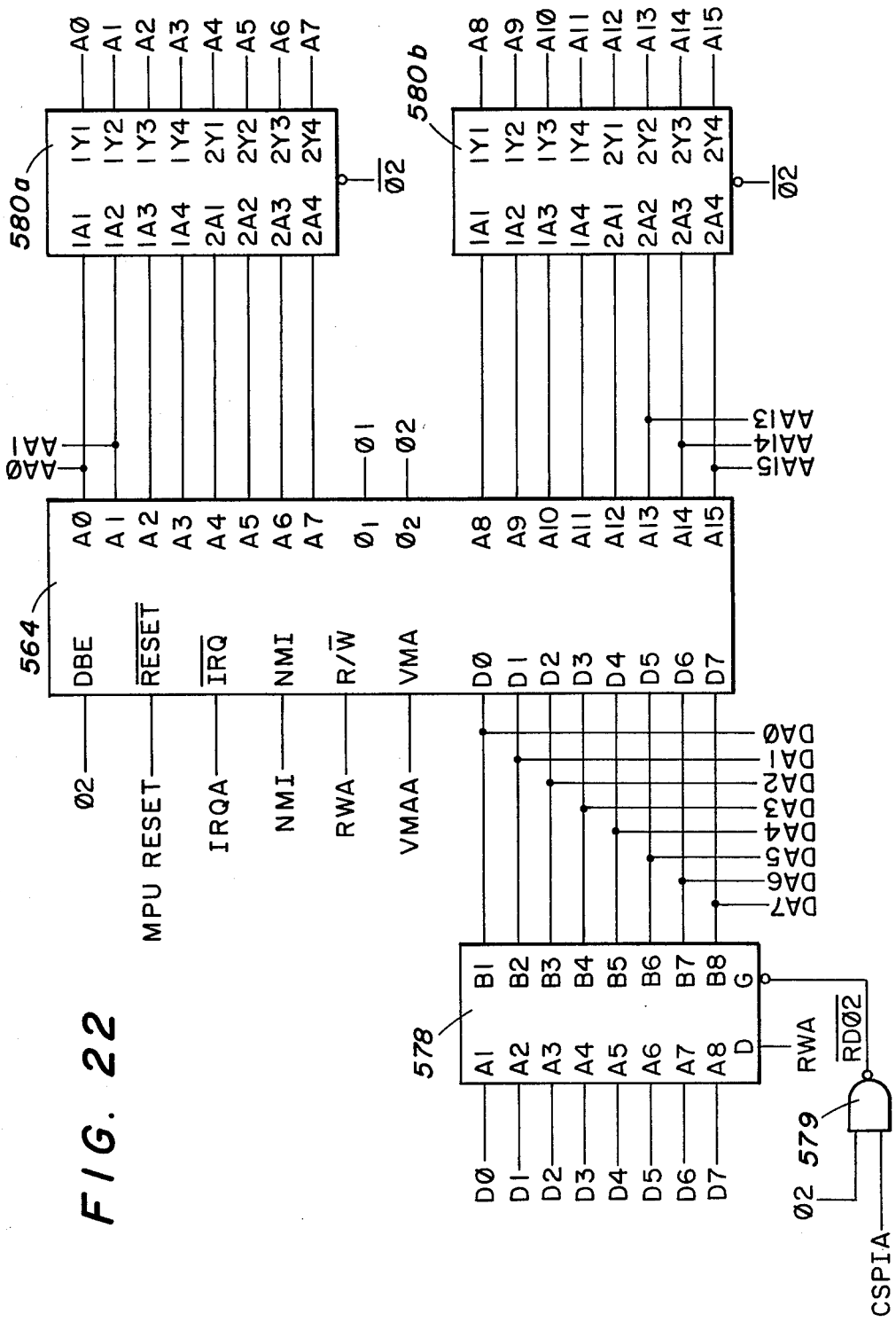
FIG. 22 is a schematic diagram of circuitry for implementing MPU A and the data and address buss drivers therefore in FIG. 18.

MPU A and associated buss drivers 578 and 580 are diagrammed in FIG. 22. Lines DA0-7 from PIA 558 are brought in directly to the data buss (D0-D7). The data buss is bidirectional, for transferring data to and from memory via buss driver 578. Buss driver 578 is an octal buss transceiver having non-inverting 3-state outputs. The buss driver isolates MPU A from the memory data buss designated D in the block diagram of FIG. 18.

MPU A outputs a 16-bit address (A0-A15). The A0, 1, 14 and 15 bits of the address buss are routed to the peripheral interface adapter over lines AA0, 1, 14 and 15. The A0-7 address bits go to line driver 580a, and address bits A8-15 go to buss driver 580b. The buss driver outputs, of course, are connected to the memory address buss designated A in FIG. 18.

Figure 23:
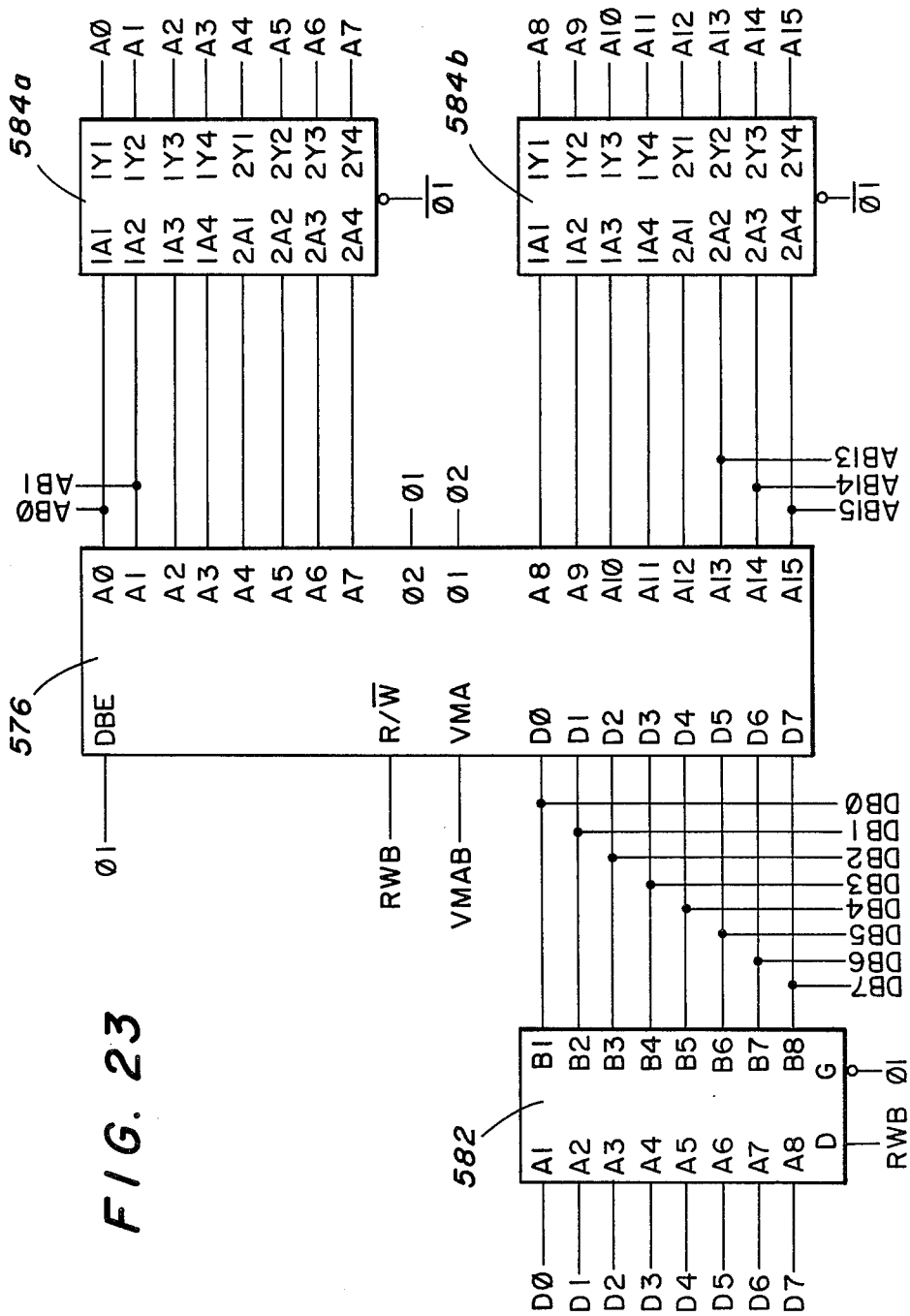
FIG. 23 is a schematic diagram of circuitry for implementing MPU B and the data and address buss drivers therefore in FIG. 18.

In FIG. 23, MPU B and associated buss drivers 582 and 584 are diagrammed. The data buss (D0-D7) of MPU B is connected to a local data buss designated DB which is connected to buss driver 582, which comprises octal buss transceivers having non-inverted 3-state outputs. The local buss DB is also routed to the digital-to-analog converters for the cathode ray tube display (see FIG. 18 and FIG. 27).

The address buss (A0-A15) of MPU B is connected to 3-state line driver devices 584a and 584b via lines AB0-15. The outputs of devices 584 are connected to the memory address buss designated A in FIG. 18. Two address lines, AB0 and AB1, are routed to the digital-to-analog converter decode logic.

Figure 24:
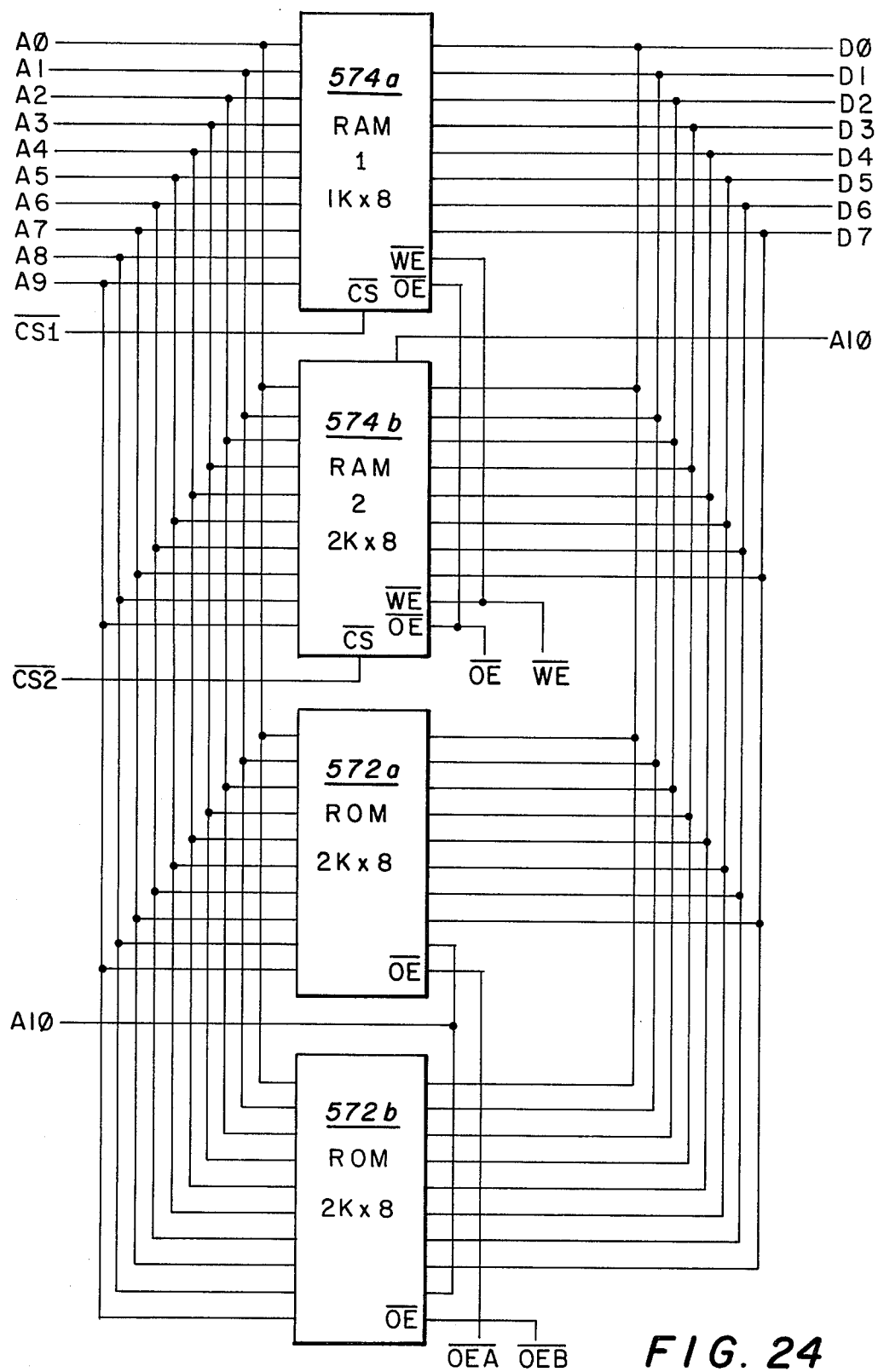
FIG. 24 is a schematic diagram of circuitry for implementing the random access memory (RAM) and read only memory (ROM) in FIG. 18.

In FIG. 24, a schematic diagram is provided for memories 572 and 574. As shown, the read only memory comprises ROM devices 572a and 572b, having memory data buss lines D0-7 connected to each of the memory chips. Similarly, memory address buss lines A0-9 are brought into each memory chip. In addition, for ROMs 572a and 572b, and for RAM 574b, an additional address line A10 is provided. The chip select (CS), output enable (OE) and write enable (WE) signal lines are also indicated in FIG. 24. These signal lines are obtained from clock generator and timing control circuitry diagrammed in FIGS. 25 and 26.

Referring to FIG. 25, a first three-to-eight line decoder 634 and a second three-to-eight line decoder 636 receive bits 13, 14 and 15 of the local address busses of MPU A and MPU B, respectively. Decoder 634 is enabled by a valid memory address (VMAA) output from MPU A, which indicates that there is a valid address on the MPU A address buss. In response, decoder 634 decodes the binary code established at the A, B and C inputs and places a low output condition on one of outputs $Y_6$, $Y_4$ or $Y_7$. If either of outputs $Y_4$ or $Y_7$ goes low, gate 638 produces a signal AROMCS. This signal is applied as an input to NAND gates 640 and 642.

The signal $\overline{\text{ARMCS}}$ is applied as an input to gates 644 and 646. MPU A address buss line AA11 is utilized as an additional decode line. Address line AA11 is applied directly as an input to gates 640, 642 and is inverted and applied as an input to gates 644, 646. The outputs of gates 640, 642, 644 and 646 are applied as inputs to line driver device 648. The line drivers in device 648 are divided into two groups of four line drivers. An active-low output control input is provided for each group. The control inputs are designated as 1G and 2G. As indicated, each control input receives a different one of the two-phase non-overlapping clocks.

The outputs of gates 640, 642, 644 and 646 are applied as inputs to the first group of line drivers controlled by input 1G. When the 1G control input is low, the 1Y outputs assume an output condition corresponding to the condition of the respective 1A inputs to the device. Since the 2G control input is out of phase, and therefore, high, the 2Y outputs of the device present open circuits by reason of the 3-state output of the line drivers.

The foregoing describes the manner in which MPU A makes a memory chip selection and output enable for the ROM 572 and RAM 574.

The chip select function for MPU B is accomplished in a similar manner using decoder 636. With an appropriate input code over address buss lines AB13–15, and a high condition on VMAB from MPU B, one of the decoder outputs will be low. A low condition on either decoder output Y4 or Y7, both of which are applied to gate 650, will result in the signal BROMCS being generated. If the Y6 output is selected, it will go low producing $\overline{BRAMCS}$ The signal BROMCS is applied as an input to NAND gates 652 and 654. The signal $\overline{BRAMCS}$ is applied as an input to gates 656, 658. MPU B address buss line AB11 is utilized as an additional decode line. Line AB11 is applied directly to gates 652 and 654, and it is inverted and applied to gates 656, 658.

The outputs of gates 652, 654, 656, and 658 are applied as inputs to the second group of four line drivers in device 648. When the 2G control input of device 648 is low, as determined by the condition of the $\phi 1$ clock, the memory chip select and output enable control lines will be established in accordance with the 2A inputs of device 648.

Figure 26:
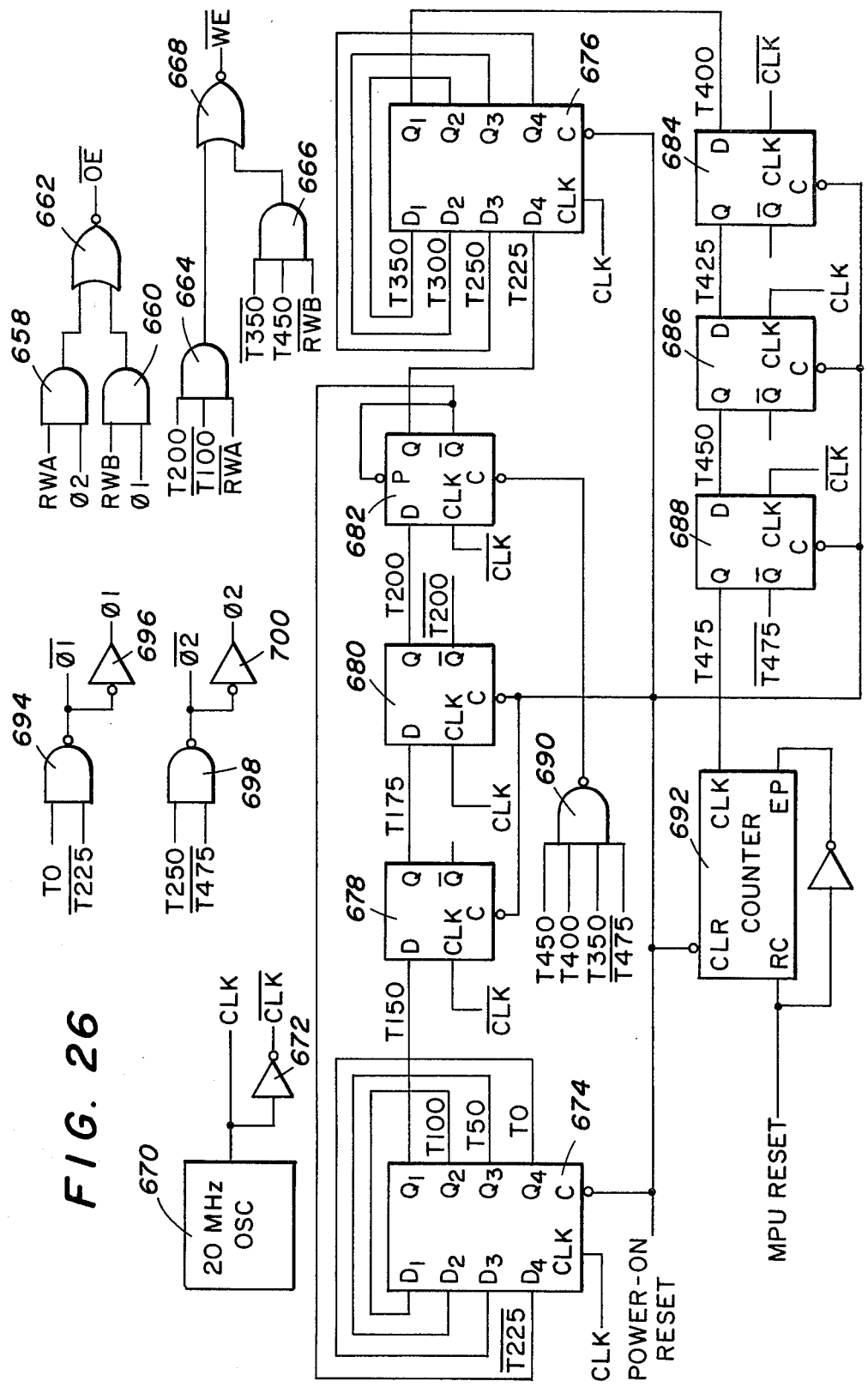
FIG. 26 is a schematic diagram of circuitry for implementing the clock generator in FIG. 18.

Referring next to FIG. 26, the output enable and write enable controls for RAM 574a and 574b are generated by logic shown therein. Specifically, the output enable $\overline{OE}$ signal is generated by the logic comprising AND gates 658, 660 and NOR gate 662. Inputs to gate 658 are the $\phi 2$ clock and RWA, which is the read/write signal from MPU A. Correspondingly, the inputs to gate 660 are the $\phi 1$ clock and RWB, which is the read/write signal from MPU B.

The logic for generating the write enable signal $\overline{WE}$ includes AND gates 664, 666 and NOR gate 668. The inputs to gate 664 includes the inverted read/write output from MPU A and the $\overline{T100}$ and T200 timing signals from the clock generator circuitry. Gate 666 receives as an input the inverted read/write signal from MPU B. Gate 666 also receives clock generator timing signals $\overline{T350}$ and T450.

Generation of the two-phase, non-overlapping clocks $\phi 1$ and $\phi 2$ is accomplished by the circuitry diagrammed in FIG. 26. Generation of the clock signals starts with a 20 MHz oscillator 670. The output of the oscillator is designated CLK. An inverted clock $\overline{CLK}$ is produced by inverter 672. Both CLK and $\overline{CLK}$ are applied to shift register circuitry comprising quad D-type flip-flop devices 674 and 676, and flip-flops 678, 680, 682, 684, 686, and 688.

The shift register flip-flops are initialized to zero; that is, all flip-flops are reset. The D4 input of device 674 is connected to the $\overline{Q}$ output of flip-flop 682, which is designated as $\overline{T225}$ Accordingly, when clocking of the shift register begins, ones are shifted in and carried through each flip-flop stage up to flip-flop 682, which is set 225 nsec later. At that point a zero is applied to the D4 input on device 674, and zeroes are shifted in at 250 nsec and carried through the shift register circuitry until 500 nsec has elapsed. A direct clear to flip-flop 682 at 450 nsec is provided by NAND gate 690. A counter 692 in FIG. 26 generates the MPU RESET signal which holds MPU A and B in a reset condition for sixteen cycles after a power-on reset command.

To produce the $\phi 1$ clock, timing signals $T_o$ and $\overline{T225}$ are combined in NAND gate 694 and inverter 696. The $\phi 2$ clock is generated by combining T250 and $\overline{T475}$ in NAND gate 698 and inverter 700.

Figure 27:
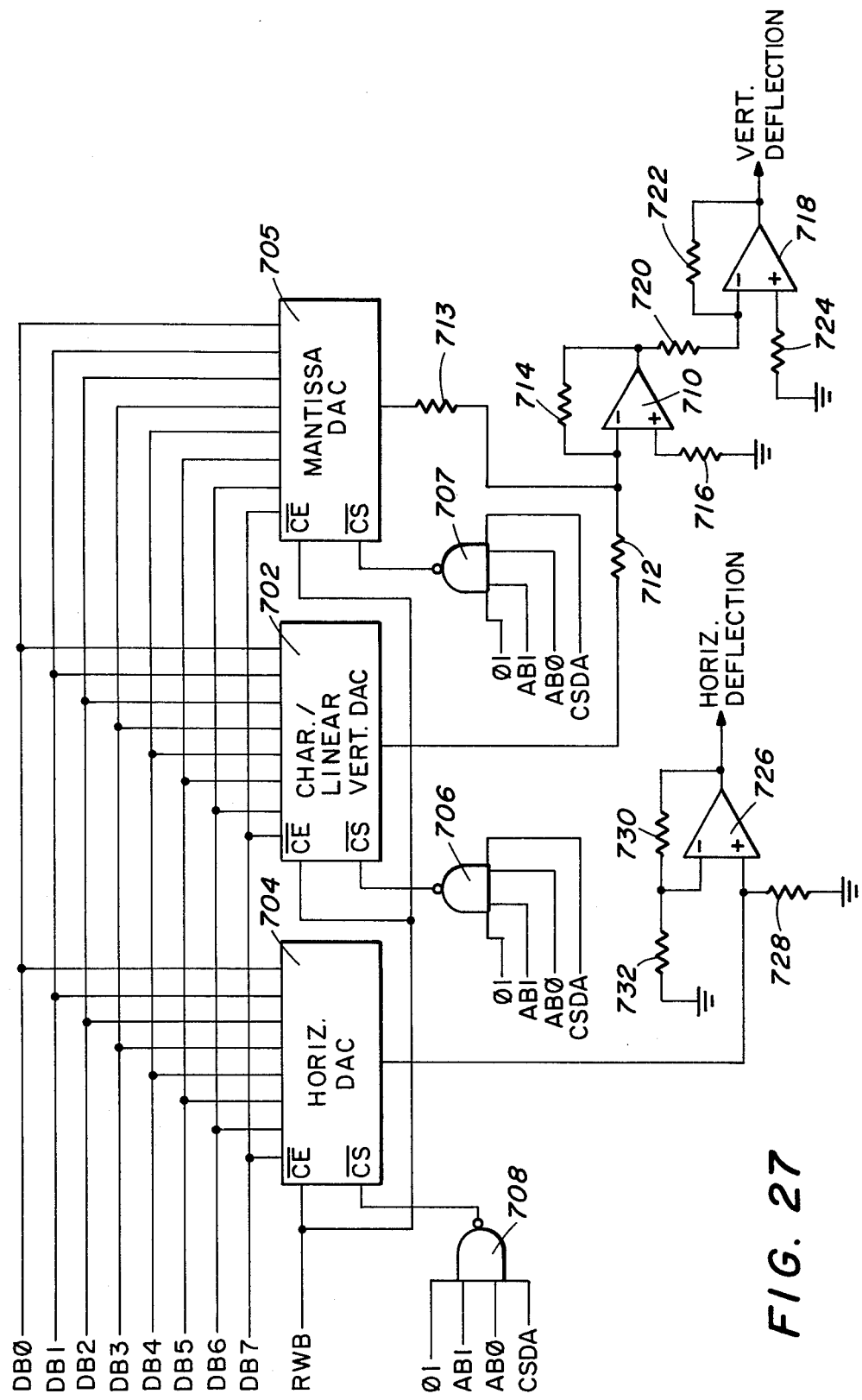
FIG. 27 is a schematic diagram of circuitry for implementing the digital-to-analog converter (DAC) block in FIG. 18.

Referring now to FIG. 27, the circuitry for deriving the analog vertical and horizontal deflection signals for the CRT is diagrammed. As indicated, a digital-to-analog converter (DAC) 704 is provided for generating the horizontal sweep portion. Both DAC 702 and 704 are connected to the deflection signal, DACs 702 and 705 are provided for generating the vertical deflection signal. DACs 702, 704, and 705 are connected to the MPU B data buss DB. The chip enable inputs (CE) on the DACs are connected to the RWB signal from MPU B. The chip select input (CS) on DAC 702 is connected to NAND gate 706. Similarly, the chip select (CS) input to DAC 704 is connected to NAND gate 708, and the chip select (CS) input to DAC 705 is connected to NAND gate 707. Gates 706, 707, and 708 serve as decode logic, for making the selection between the "vertical data" DAC and the "horizontal data" DAC.

The output of DAC 702 is applied to a summing junction at the inverting input of an amplifier circuit comprising operational amplifier 710. The signal is applied through input resistor 712.

The display is generated on a log scale. This is accomplished by using the sum of the outputs of DACs 702 and 705. The output of DAC 702 represents the characteristic (i.e., magnitude), and the output of DAC 705 represents the mantissa (i.e., fractional portion).

The characteristic data is generated by shifting a 16-bit data word until an overflow occurs. The number of shifts occurring by counting down from a binary 16 are counted. This count overflow represents the characteristic in base 2. A 4-bit word is output to the characteristic DAC in the higher order 4 bits of the byte.

The mantissa data is generated by using the next 5 bits after the overflow bit. These 5 bits are used to index a logarithmic look-up table. The look-up table is generated graphically using a scaled log curve from 0 to 1 and rescaled across 5 bits or 32 combinations. An 8-bit log equivalent for output can also be generated using this technique.

The analog characteristic signal is allowed to have the full scale voltage range of 0–5 VDC. The analog mantissa signal is allowed to have 1/32 of the full scale voltage range. The two signals are then summed with summing amplifier 710, which scales per the operational amplifier formula $A_v = Rf/Rin$. Operational amplifier 710 includes feedback resistor 714 and balancing resistor 716. The amplifier circuit has a gain of approximately one, and serves to sum and buffer the outputs of DACs 702 and 705. The analog output signal is applied to a second amplifier stage which includes operational amplifier 718, input resistor 720, variable feedback resistor 722, and balancing resistor 724. The output of the second stage amplifier is used as the vertical deflection signal for driving the CRT.

A single amplifier stage is connected to DAC 704. The amplifier includes an operational amplifier 726 and resistors 728, 730 and 732. The output signal from amplifier 726 provides the CRT horizontal sweep signal.

The display unit firmware provides for the function of calculating for each channel a logarithmic data word having a characteristic and a mantissa to be applied as vertical data, and the function of outputting a data word indicative of a horizontal data point. Also, when new incremental data is entered, the firmware directs a summing of the new data with the accumulating data. The firmware further provides for interpreting commands from the CPU, and provides for the generation of intensification points on the display medium.

V. Software Routines For Nuclear Well Logging

In general, software routines executed by the CPU in performing nuclear well logging using the described signal recovery unit include those for: obtaining data from the signal recovery unit memory and placing it in CPU memory, sending commands to the display unit, controlling signal conditioning gain, data processing (e.g., windowing, stripping, ratioing, etc.), outputting processed data to film and tape media, and system calibration.

There is, of course, a main operating program having a number of branches from a standby mode to routines for performing specific mode-related functions. In a spectral analysis mode, the program routine flowcharted in FIG. 28 is entered. Also, in the spectral analysis mode, a gain stabilization routine flowcharted in FIG. 29 will be entered from the standby mode before re-entry to the spectral analysis routine. In the neutron population decay rate analysis mode, the program routine flowcharted in FIG. 30 will be entered. Finally, in an induced gamma ray spectral analysis mode, the program routine flowcharted in FIG. 31 is entered.

In the spectral analysis mode, and with reference to FIG. 28, CPU sends the read command, which corresponds to the Set Output Mode command in Table I, over CPU I/O Buss 100 (see FIG. 6). The CPU then performs a read and buffer store operation, by sequentially addressing each memory location in the random access memory in the signal recovery unit. Based upon the data read from the signal recovery unit memory, gain and offset data are computed in accordance with the routine diagrammed in FIGS. 29A and 29B. The gain and offset data words are applied to the digital-to-analog converters 440 and 458 shown in FIG. 15. Next, the CPU sends a data acquisition command. This corresponds to the Set MCA Mode command in Table I. While the multichannel analyzer in the signal recovery unit is obtaining data for the next incremental movement of the subsurface logging instrument, the CPU is transferring data from the data buffer to the stabilization buffer, which holds the data during processing. CPU then computes the stripping and window sums for the potassium, uranium and thorium channels in the energy spectrum represented by the data obtained from the multichannel analyzer. The CPU then converts the computed sums to count rates, and puts them in an input buffer. At the conclusion of the routine, there is a branch to clear and a return to the main operating program.

Referring next to FIGS. 29A and 29B, the diagram routine is entered and executed during execution of the spectral analysis routines of both FIGS. 28 and 31. If an enabling flag is set, the routine proceeds with a check to determine whether a sufficient number of counts in the potassium, uranium, and thorium channels have been accumulated. If so, a flag is set for each of the channels having a sufficient number of counts.

The routine then proceeds to check each of the three flags to determine whether the particular flag is set. The program proceeds with a check first of the thorium (Th) flag, and goes next to the uranium (U) and potassium (K) flags.

If the particular flag is not set, the count is incremented and checked to see if it is over a prescribed count value. If the count is not over the prescribed value, the program directs the CPU to return to the main operating program. If it is found that all but the potassium are under the prescribed number of counts, the buffer storing the counts is cleared and the accumulation process is started over.

Upon finding a flag set, which indicates a sufficient number of counts in a potassium, uranium, or thorium channel in the energy spectrum, the routine in FIG. 29B is entered. In this routine, the CPU is directed to apply an operation to the data to effect a smoothing filter function. The peak channel in a given window is determined, with this channel value being compared against a desired channel for the peak. The difference between the desired and actual peak channels is divided by a shift factor expressed in channels per step, to give a certain number of steps. The old data gain setting has the number of steps determined by the division process added to it to yield a new gain setting value. On the next interrupt, the new gain setting is output to the signal conditioning circuitry. Finally, the stabilization buffer holding the channel data is cleared and the counters are reset to zero. There is, of course, a subsequent return to the main operating program.

The routine flowcharted in FIG. 30 provides for execution by the CPU of nuclear well logging data processing to produce a NEUTRON LIFETIME LOG well log. In this routine, the CPU first sends a read command to the signal recovery unit and performs a read of all data in the random access memory, which data is stored in a buffer memory. After all the memory locations are read, a data acquisition command is sent to place the signal recovery unit in the multichannel scaling mode of operation, to obtain further data as the subsurface logging instrument traverses the next incremental distance of the borehole. While additional data is being obtained, the CPU is directed to compute the capture cross-section parameter ($\Sigma$). Using the capture cross-section value, the ratio porosity is computed. There is then a branch in the routine to clear, and finally a return to the main operating program.

The routine for induced gamma ray spectral analysis is similar to that for naturally-occurring gamma ray spectral analysis (FIG. 28). However, after sending the data acquisition command, the routine of FIG. 31 proceeds with the steps of separating data relating to the gamma rays of capture from the spectrum collected to leave the data relating to measurements of the inelastic gamma rays of calcium and silicon. Then, the carbon/oxygen ratio is calculated. Also, a silicon/calcium ratio is calculated. Finally, the routine branches to clear and returns to the main operating program.

The foregoing description of the present invention has been directed to particular preferred embodiments for purposes of explanation and illustration. It will be apparent, however, to those skilled in the art that many modifications and changes in both the apparatus and the method of operation may be made without departing from the scope and essence of the invention. It is the applicant's intention in the following claims to cover all equivalent modifications and variations as fall within the scope of the invention.

What is claimed is:

1. Apparatus for acquisition of spectral gamma ray well logging data from electrical pulse signals produced by detection of gamma ray emmissions from a subsurface formation, comprising:
   a signal recovery unit for receiving electrical pulse signals indicative of the energy of detected gamma rays and producing digital data representative of the spectrum of the detected gamma ray energies, said signal recovery unit comprises a pulse height analyzer responsive to an electrical pulse signal for producing a digital code representative of the peak amplitude of the pulse signal, a random access memory for accumulating counts of detected gamma rays according to energy level in addressable locations therein said memory being coupled to the pulse height analyzer so as to be addressed by the digital code, and means for incrementing the count in a memory location addressed by the pulse height analyzer digital code and control logic coupled to the pulse height analyzer, the memory and the incrementing means for controlling the incrementing of a count in an addressed memory location;

a spectrum display coupled to the signal recovery unit for formating and processing for presentation of spectral gamma ray well logging data as a plot of relative gamma ray emissions activity versus energy level; and a central processing unit, for issuing control commands to the signal recovery unit control logic and the spectrum display to sequence the acquisition and presentation of spectral gamma ray well logging data.

2. The apparatus of claim 1 wherein the central processing unit issues control commands to sequence the acquisition and presentation of spectral data in accordance with a primary interrupt signal.

3. The apparatus of claim 1 wherein the pulse height analyzer comprises:
a sample and hold circuit, for producing a voltage level equivalent to the peak amplitude of a gamma spectrometer electrical pulse signal; and
an analog-to-digital converter for converting the voltage level to an equivalent digital code.

4. The apparatus of claim 1 wherein the incrementing means includes a counter coupled to the memory, said counter being loaded with count data from a location in memory addressed by the pulse height analyzer digital code and clocked so as to increment the count data value loaded therein by a value of one.

5. The apparatus of claim 1 further comprising:
said control logic producing memory control commands in response to the production of a pulse height analyzer digital code, to output the count in an addressed memory location and write an incremented count into the addressed memory location.

6. The apparatus of claim 1 wherein the incrementing means comprises a register coupled to the memory for loading therein the count from a location in memory addressed by the pulse height analyzer digital code and incrementing the loaded count by a value of one.

7. The apparatus of claim 6 further comprising:
said control logic producing memory control commands and register load and increment commands in response to the production of a pulse height analyzer digital code,
said control logic producing an output command to the memory to cause the count in an addressed memory location to be output to the increment register for loading,
said control logic producing a load command to load a count output from memory into the increment register,
said control logic producing an increment command to increment the loaded count in the register, and said control logic producing a write command to the memory to cause the incremented count in the register to be written into the addressed memory location.

8. The apparatus of claim 1 wherein the pulse height analyzer comprises:
a sample and hold circuit, for producing a voltage level equivalent to the peak amplitude of a gamma spectrometer electrical pulse signal;
a controlled switch element connected in series with said sample and hold circuit, for applying a gamma spectrometer electrical pulse signal to said sample and hold circuit;
a peak detector circuit, for receiving a gamma spectrometer electrical pulse signal and determining the occurrence of the peak in amplitude of the signal, and
said peak detector circuit producing a switch control signal in response to a pulse signal peak detection, for closing said switch element to apply the pulse signal to said sample and hold circuit.

9. The apparatus of claim 1 wherein the signal recovery unit includes:
a random access memory for accumulating counts of detected gamma rays per incremental energy level,
said memory having a plurality of addressable locations storing digital data representative of detected gamma ray counts, each memory location corresponding to a particular incremental gamma ray energy level band.

10. The apparatus of claim 9 wherein the signal recovery unit further includes:
an address generator operable under control of the CPU to sequentially address the memory locations;
means for generating an output enable command to said memory to read data out of an addressed location; and
means for placing data read out of memory onto a buss line to the CPU.

11. The apparatus of claim 1 wherein said spectrum display unit comprises means for presenting a visual representation of the spectrum of detected gamma rays in a format of detected gamma ray counts per incremental energy band.

12. The apparatus of claim 1 wherein said spectrum display comprises:
an interface for connection to the signal recovery unit to obtain the digital gamma spectrum data;
a first microprocessor for receiving digital gamma spectrum data and formatting the data for display;
a memory accessed by said first microprocessor, for storing formatted digital gamma spectrum data;
a second microprocessor accessing said memory to obtain digital gamma spectrum data for display; and
means coupled to said second microprocessor for providing a visual display of the gamma spectrum data.

13. The apparatus of claim 12 wherein said spectrum display further comprises:
digital-to-analog converter means connected between said second microprocessor and said display means, for converting digital gamma spectrum data to first and second analog signals, and wherein said display means comprises a cathode ray tube receiving said analog signals as vertical deflection and horizontal deflection signals.

14. The apparatus of claim 1 wherein said signal recovery unit comprises a multichannel analyzer, for measuring the amplitudes of electrical pulse signals to determine the energies of the detected gamma rays causing the pulse signal to be produced, and accumulating a count of gamma rays having energies in prescribed energy bands.

15. Apparatus for acquisition of induced gamma ray well logging data indicative of the macroscopic neutron absorption capture cross-section of a subsurface formation and based upon electrical pulse signals produced by detection of gamma ray emission from the formation following release of a burst of neutrons directed into the formation, comprising:
   a multichannel scaling unit for receiving electrical pulse signals, for producing digital data representative of neutron population decay rate;
   a display unit coupled to the multichannel scaling unit, for presentation of neutron population decay rate data as a plot of gamma ray counts versus time; and
   a central processing unit (CPU), for issuing control commands to the multichannel scaling unit and display unit to sequence the acquisition and presentation of neutron population decay rate data.

16. The apparatus of claim 15 wherein the multichannel scaling unit comprises:
   a random access memory for accumulating counts of detected gamma rays according to their time of occurrence following a neutron burst, said memory accumulating counts in addressable memory locations therein corresponding to specific incremental units of time following a neutron burst; and
   an address generator, for producing a sequence of memory address codes following each neutron burst, the address codes serving to address successive memory locations and define incremental time units.

17. The apparatus of claim 15 wherein the multichannel scaling unit comprises:
   a random access memory for storing in addressable memory locations counts of detected gamma rays according to time of occurrence following a neutron burst;
   an address generator, for producing a sequence of memory address codes following each neutron burst, the address codes being applied to said memory to address successive memory locations and define incremental time units; and
   means for incrementing the count in a memory location addressed by the address generator.

18. The apparatus of claim 17 wherein said incrementing means comprises:
   an increment register coupled to the memory, said register loading a count value stored in an addressed memory location and incrementing the count value by one upon command of a clock signal applied thereto.

19. The apparatus of claim 18 further comprising:
   control logic for producing control commands in response to a gamma ray detector electrical pulse signal, to read a count value out of an addressed memory location, to load the count value into the increment register, to clock the increment register to increase the count value by one, and to write the incremented value back into the addressed memory location.

20. The apparatus of claim 17 wherein the address generator comprises:
   a counter, for receiving clock pulses and in response counting up in increments of one, said counter producing a multiple bit code representative of the count value;
   means for producing clock pulses of predetermined spacing in time, for counting up said counter; and
   means responsive to a neutron source trigger signal, for initializing said counter and synchronizing said clock means.

21. The apparatus of claim 17 wherein:
   the address generator is operable under control of the CPU to sequentially address the memory locations; and
   wherein the multichannel scaling unit further comprises:
   means for generating an output enable command to said memory to read the gamma count out of an addressed memory location; and
   means for placing data read out of memory onto a buss line to the CPU.

22. The apparatus of claim 15 wherein said display unit comprises means for presenting a visual representation of the neutron population decay rate data produced by said multichannel scaling unit.

23. The apparatus of claim 15 wherein said display unit comprises:
   an interface for connection to the multichannel scaling unit to obtain the neutron population decay rate data;
   a first microprocessor for receiving digital neutron population decay rate data and formatting the data for display;
   a memory accessed by said first microprocessor, for storing formatted digital neutron population decay rate data;
   a second microprocessor accessing said memory to obtain digital neutron population decay rate data for display; and
   means coupled to said second microprocessor for providing a visual display of the neutron population decay rate data.

24. Apparatus for acquisition of spectral gamma ray well logging data from electrical pulse signals produced by detection of induced gamma ray emission from a subsurface formation and synchronizing signal pulses indicative of neutron source triggering producing a burst of neutrons to induce gamma ray emission, comprising:
   a pulse height analyzer for receiving electrical signal pulses indicative of the energy of detected gamma rays and producing a multiple bit digital code representative of the peak amplitude of each pulse signal;
   a sync generator responsive to synchronizing signal pulses for producing a single bit digital code to distinguish between electrical signal pulses attributable to inelastic gamma rays and electrical signal pulses attributable to capture gamma rays;
   a random access memory for accumulating counts to detected gamma rays according to the energy level in addressable locations therein, said accumulated counts providing digital data representative of the spectrum of detected gamma ray energies;
   said memory being coupled to the pulse height analyzer and the sync generator so as to be addressed by a digital code word comprising the multiple bit code from the pulse height analyzer and the single bit code of the sync generator;

means for incrementing the count in an addressed memory location;

control logic coupled to the pulse height analyzer, the random access memory, and the count incrementing means, for controlling the incrementing of a count in an addressed memory location;

a spectrum display unit coupled to said memory, for real-time presentation of spectral gamma ray well logging data as a plot of accumulated counts per incremental energy level; and means for issuing control commands to the control logic and the spectrum display to sequence the acquisition and presentation of well logging data.

25. The apparatus of claim 24 wherein the pulse height analyzer comprises:

a sample and hold circuit, for producing a voltage level equivalent to the peak amplitude of a detector electrical pulse signal; and an analog-to-digital converter for converting the voltage level to an equivalent digital code.

26. The apparatus of claim 24 wherein the incrementing means includes a counter coupled to the memory, said counter being loaded with count data from an addressed memory location and clocked as to increment the count data value loaded therein by a value of one.

27. The apparatus of claim 24 wherein:

said control logic provides memory control commands in response to the production of a pulse height analyzer digital code, to output the count in an addressed memory location and write an incremented count into the addressed memory location.

28. The apparatus of claim 24 wherein the incrementing means comprises a register coupled to the memory for loading therein the count from a location in memory addressed by the pulse height analyzer digital code and incrementing the loaded count by a value of one.

29. The apparatus of claim 28 wherein:

said control logic produces memory control commands and register load and increment commands in response to the production of a pulse height analyzer digital code, said control logic produces an output command to the memory to cause the count in an addressed memory location to be output to the increment register for loading, said control logic produces a load command to load a count output from memory into the increment register, said control logic produces an increment command to increment the loaded count in the register, and said control logic produces a write command to the memory to cause the incremented count in the register to be written into the addressed memory location.

30. The apparatus of claim 24 wherein the pulse height analyzer comprises:

a sample and hold circuit, for producing a voltage level equivalent to the peak amplitude of a detector electrical pulse signal;

a controlled switch element connected in series with said sample and hold circuit for applying a detector electrical pulse signal to said sample and hold circuit;

a peak detector circuit, for receiving a detector electrical pulse signal and determining the occurrence of the peak in amplitude of the signal, and said peak detector circuit producing a switch control signal in response to a pulse signal peak detection, for closing said switch element to apply the pulse signal to said sample and hold circuit.

31. The apparatus of claim 24 which further comprises:

an address generator operable under control of the CPU to sequentially address the memory locations;

means for generating an output enable command to said memory to read data out of an addressed location; and means for placing data read out of memory onto a buss line to the CPU.

32. The apparatus of claim 24 wherein said spectrum display unit comprises means for presenting a visual representation of the spectrum of detected gamma rays in a format of detected gamma ray counts per incremental energy band.

33. The apparatus of claim 24 wherein said spectrum display comprises:

an interface for connection to the pulse height analyzer to obtain the digital gamma spectrum data;

a first microprocessor for receiving digital gamma spectrum data and formatting the data for display;

a memory accessed by said first microprocessor, for storing formatted digital gamma spectrum data;

a second microprocessor accessing said memory to obtain digital gamma spectrum data for display; and means coupled to said second microprocessor for providing a visual display of the gamma spectrum data.

34. The apparatus of claim 33 wherein said spectrum display further comprises:

digital-to-analog converter means connected between said second microprocessor and said display means, for converting digital gamma spectrum data to first and second analog signals, and wherein said display means comprises a cathode ray tube receiving said analog signals as vertical deflection and horizontal deflection signals.

35. The apparatus of claim 24 wherein said sync generator comprises:

means for detecting synchronizing signals and producing a phase adjustable clock pulse signal;

a phase-lock loop device coupled to said detecting means, for multiplying the clock pulse signal by a prescribed factor to produce a square wave signal having one phase in time correspondence with inelastic detector signal pulses and the other phase in time correspondence with capture detector signal pulses.

36. Apparatus for acquisition of spectral gamma ray well logging data from electrical pulse signals produced by detection of gamma ray emission from a subsurface formation and transmitted over a logging cable, comprising:

signal conditioning means for receiving electrical pulse signals having amplitudes indicative of the energy of detected gamma rays and providing signal gain to compensate for logging cable attenuation losses;

said signal conditioning means being adjustable to provide variable signal gain in response to a control signal applied thereto;

a digital-to-analog converter, for producing an analog output signal representative of a gain control input digital value applied thereto;

circuit means interconnecting the digital-to-analog converter and said signal conditioning means, for applying the control signal to said signal conditioning means;

a signal recovery unit coupled to said signal conditioning means, for producing digital data representative of the spectrum of detected gamma ray energies; and a central processing unit (CPU), for accessing the signal recovery unit to acquire digital gamma ray energy spectrum data therefrom, for evaluating the acquired data to determine the location in the energy spectrum of a particular energy peak and comparing the actual location to a desired location, for computing a gain control input digital value based on the difference between the actual and desired energy peak locations, so as to automatically compensate for gain drifting.

37. The apparatus of claim 36, which further comprises:

a spectrum display unit coupled to the signal recovery unit, for real-time presentation of spectral gamma ray well logging data as a plot of relative gamma ray emissions activity versus energy level.

38. Apparatus for acquisition of spectral gamma ray well logging data, comprising:

a sample and hold circuit coupled to said logging cable, for producing a voltage level equivalent to the peak amplitude of a gamma spectrometer electrical pulse signal;

a successive approximation analog-to-digital converter for converting the voltage level to an equivalent digital code;

a random access memory for accumulating counts of detected gamma rays according to energy levels in addressable locations therein;

said memory being coupled to the analog-to-digital converter so as to be addressed by said digital code;

means for incrementing the count in a memory location addressed by said digital code;

a spectrum display unit coupled to the random access memory, for real-time presentation of accomulated counts as a plot of counts versus gamma ray energy level; and means for issuing control commands to sequence the acquisition and presentation of the detected gamma ray counts.

39. Apparatus for acquisition of nuclear well logging data from electrical pulse signals produced by a nuclear particle detector in a subsurface well logging instrument as it traverses a well borehole, and transmitted to the surface over a logging cable coupled to the logging instrument, comprising:

a pulse height analyzer (PHA) responsive to detector electrical pulse signals, for producing a digital code representative of the peak amplitude of a pulse signal;

an address generator, for producing a sequence of address codes, the address codes defining incremental units of time;

a multiplexer connected to said pulse height detector and said address generator, for selecting an output code from between the PHA and the address generator depending upon a selected data acquisition mode;

a random access memory connected to said multiplexer so as to be addressed by the selected output code, said memory accumulating counts of detected gamma rays according to energy level when operation is in a spectral gamma ray well logging data acquisition mode, and memory accumulating counts of detected gamma rays according to their time of occurrence when operation is in an induced gamma ray well logging data acquisition mode;

means for incrementing the value in an addressed memory location;

control logic, for producing a mode select signal for actuating said multiplexer to select between the PHA and the address generator, for producing memory control commands to output the value in an addressed memory location and write an incremented value into the addressed memory location, and for producing a series of clock pulses to step said address generator through the sequence of address codes upon command and provide for reading count values out of memory when operation is in a data output mode;

means for placing a count value read out of memory onto a buss line;

a display unit coupled to the buss line, for receiving count values read out of memory and providing a presentation of the count values as well logging data; and a central processing unit (CPU), for issuing commands to said control logic and said display to sequence the acquisition and presentation of nuclear well logging data.

40. Apparatus for acquisition of spectral gamma ray well logging data, comprising:

subsurface well logging instrument to traverse a well borehole, the instrument including a gamma spectrometer, for detecting gamma ray emission from subsurface formations and producing electrical pulse signals indicative of the energies of detected gamma rays;

a logging cable coupled to the subsurface well logging instrument, for providing a transmission medium to the surface for gamma spectrometer electrical pulse signals;

a signal recovery unit coupled to the logging cable for receiving gamma spectrometer electrical pulse signals and producing digital data representative of the spectrum of detected gamma ray energies;

a spectrum display unit coupled to the signal recovery unit, for presentation of spectral gamma ray well logging data as a plot of relative gamma ray emissions activity versus energy level; and a computer, for issuing control commands to the signal recovery unit and the spectrum display to sequence the acquisition and presentation of spectral gamma ray well logging data.

41. The apparatus of claim 40 wherein said signal recovery unit includes:

signal conditioning means coupled for applying signal gain to compensate for logging cable attenuation losses.

42. Apparatus for acquisition of gamma ray well logging data including data indicative of the macroscopic neutron absorption capture cross-section of a subsurface formation and data indicative of the energy spectrum of gamma ray emission from a subsurface formation from electrical pulse signals produced by detection of gamma ray emission from a subsurface formation, comprising:

a pulse height analyzer for receiving an electrical pulse signal having an amplitude indicative of the energy of a detected gamma ray producing the pulse and producing a digital code representative of the peak amplitude of the pulse signal;

an address generator, for producing a sequence of address codes following a neutron burst into a subsurface formation, the address codes serving to address successive memory locations and define incremental time units;

means for selecting between the codes available from said pulse height analyzer and said address generator;

a random access memory coupled to said selecting means to receive the selected code, said random access memory for accumulating counts of detected gamma rays according to energy levels in addressable locations therein when addressed by the pulse height analyzer code, so as to produce digital data representative of the spectrum of detected gamma ray energies;

said random access memory for accumulating counts of detected gamma rays according to their time of occurrence following a neutron burst, said memory accumulating counts in addressable memory locations therein corresponding to specific incremental units of time following a neutron burst, when addressable by the address generator address codes, so as to produce digital data representative of neutron population decay rate in the formation;

a display coupled to said memory for presentation of the digital data in said memory; and a central processing unit (CPU), for issuing control commands to sequence the production and presentation of digital data in said memory.

* * * * *